(12) United States Patent
Nye

(10) Patent No.: US 7,685,224 B2
(45) Date of Patent: Mar. 23, 2010

(54) METHOD FOR PROVIDING AN ATTRIBUTE BOUNDED NETWORK OF COMPUTERS

(75) Inventor: Timothy G. Nye, Guelph (CA)

(73) Assignee: TrueLocal Inc. (CA)

( * ) Notice: Subject to any disclaimer, the term of this patent is extended or adjusted under 35 U.S.C. 154(b) by 1057 days.

(21) Appl. No.: 10/044,291

(22) Filed: Jan. 10, 2002

(65) Prior Publication Data

US 2002/0156917 A1    Oct. 24, 2002

Related U.S. Application Data

(60) Provisional application No. 60/265,024, filed on Jan. 30, 2001, provisional application No. 60/261,025, filed on Jan. 11, 2001, provisional application No. 60/267,508, filed on Feb. 8, 2001, provisional application No. 60/268,060, filed on Feb. 13, 2001, provisional application No. 60/282,124, filed on Apr. 9, 2001.

(51) Int. Cl.
*G06F 15/16* (2006.01)
*G06F 7/00* (2006.01)

(52) U.S. Cl. .......................... 709/201; 709/204; 707/3; 707/102

(58) Field of Classification Search ......... 709/201–205, 709/226, 224, 245; 707/3, 4, 203, 6, 102, 707/10; 342/451; 701/300
See application file for complete search history.

(56) References Cited

U.S. PATENT DOCUMENTS

| | | | |
|---|---|---|---|
| 4,974,170 A | 11/1990 | Bouve et al. | |
| 5,375,235 A | 12/1994 | Berry et al. | 707/5 |
| 5,469,354 A | 11/1995 | Hatakeyama et al. | 707/3 |
| 5,546,578 A | 8/1996 | Takada | 707/5 |
| 5,659,617 A | 8/1997 | Fischer | |
| 5,682,525 A | 10/1997 | Bouve et al. | |
| 5,685,003 A | 11/1997 | Peltonen et al. | 707/531 |

(Continued)

FOREIGN PATENT DOCUMENTS

WO    WO 00/27091    5/2000

OTHER PUBLICATIONS

Vicinity.com, Oct. 12, 2000, http://web.archive.org/web/20000511195011/www.vicinity.com/vicinity/services/sitemaker.html, p. 1-2.*

(Continued)

*Primary Examiner*—Ario Etienne
*Assistant Examiner*—Gregory G Todd
(74) *Attorney, Agent, or Firm*—Hamilton, Brook, Smith & Reynolds, P.C.

(57) ABSTRACT

An attribute bounded network of computers is created. Computers in the distributed computer network are identified by specific attributes (e.g., a geographically bounded region) and a server is used to distribute processing assignments (e.g., addresses of electronic documents to be indexed) based upon the identified attributes. A peer-to-peer computer network is also provided based upon geographically bounded regions, the peer-to-peer computer network can be used to share electronic documents. A virtual community can be created within a peer-to-peer computer network by identifying peer computer connections based upon associated attributes (e.g., a geographically bounded region). The attribute bounded network of computers provides indexes having fresher data by allowing spidering of electronic documents more often than can be done by a central server indexing site.

23 Claims, 20 Drawing Sheets

U.S. PATENT DOCUMENTS

| | | | | |
|---|---|---|---|---|
| 5,748,954 | A | | 5/1998 | Mauldin ................... 395/610 |
| 5,787,295 | A | | 7/1998 | Nakao ....................... 707/500 |
| 5,787,421 | A | | 7/1998 | Nomiyama ................... 707/5 |
| 5,799,184 | A | | 8/1998 | Fulton et al. .................. 707/2 |
| 5,813,006 | A | * | 9/1998 | Polnerow et al. ............. 707/10 |
| 5,832,479 | A | | 11/1998 | Berkowitz et al. ............. 707/3 |
| 5,839,088 | A | | 11/1998 | Hancock et al. |
| 5,845,273 | A | * | 12/1998 | Jindal ........................... 707/1 |
| 5,845,305 | A | | 12/1998 | Kujiraoka ................... 707/532 |
| 5,848,409 | A | | 12/1998 | Ahn ............................. 207/3 |
| 5,848,410 | A | | 12/1998 | Walls et al. .................... 707/4 |
| 5,852,810 | A | | 12/1998 | Sotiroff et al. |
| 5,884,038 | A | | 3/1999 | Kapoor |
| 5,890,172 | A | | 3/1999 | Borman et al. |
| 5,924,090 | A | | 7/1999 | Krellenstein |
| 5,930,474 | A | * | 7/1999 | Dunworth et al. ........... 709/217 |
| 5,944,769 | A | | 8/1999 | Musk et al. |
| 5,948,061 | A | | 9/1999 | Merriman et al. |
| 6,029,165 | A | | 2/2000 | Gable |
| 6,070,157 | A | | 5/2000 | Jacobson et al. |
| 6,078,914 | A | | 6/2000 | Redfern |
| 6,094,649 | A | | 7/2000 | Bowen et al. .................. 707/3 |
| 6,182,068 | B1 | * | 1/2001 | Culliss ........................... 707/5 |
| 6,202,065 | B1 | * | 3/2001 | Wills ............................. 707/5 |
| 6,216,130 | B1 | * | 4/2001 | Hougaard et al. ............. 707/10 |
| 6,275,820 | B1 | | 8/2001 | Navin-Chandra et al. |
| 6,295,528 | B1 | | 9/2001 | Marcus et al. |
| 6,321,158 | B1 | * | 11/2001 | DeLorme et al. ............ 701/201 |
| 6,324,645 | B1 | | 11/2001 | Andrews et al. |
| 6,324,646 | B1 | | 11/2001 | Chen et al. |
| 6,434,548 | B1 | * | 8/2002 | Emens et al. .................. 707/3 |
| 6,523,021 | B1 | * | 2/2003 | Monberg et al. ............... 707/2 |
| 6,594,682 | B2 | * | 7/2003 | Peterson et al. ............ 718/102 |
| 6,665,659 | B1 | * | 12/2003 | Logan ............................ 707/3 |
| 6,677,894 | B2 | * | 1/2004 | Sheynblat et al. ......... 342/357.1 |
| 6,691,105 | B1 | * | 2/2004 | Virdy ............................. 707/3 |
| 6,707,421 | B1 | * | 3/2004 | Drury et al. .............. 342/357.1 |
| 6,732,141 | B2 | * | 5/2004 | Ellis .......................... 709/201 |
| 6,735,585 | B1 | | 5/2004 | Black et al. |
| 6,757,730 | B1 | * | 6/2004 | Lee et al. .................... 709/226 |
| 6,775,831 | B1 | * | 8/2004 | Carrasco et al. ............ 707/200 |
| 6,954,764 | B2 | * | 10/2005 | Biswas et al. ............. 707/104.1 |
| 6,963,897 | B1 | * | 11/2005 | Hubbard .................... 709/201 |
| 6,976,053 | B1 | * | 12/2005 | Tripp et al. ................. 709/202 |
| 7,089,301 | B1 | * | 8/2006 | Labio et al. ................. 709/224 |
| 7,124,148 | B2 | | 10/2006 | Sauermann |
| 7,233,942 | B2 | | 6/2007 | Nye |
| 7,376,640 | B1 | * | 5/2008 | Anderson et al. .............. 707/3 |
| 7,493,565 | B2 | * | 2/2009 | Parupudi et al. ............. 715/744 |
| 2001/0011270 | A1 | * | 8/2001 | Himmelstein et al. .......... 707/3 |
| 2001/0037332 | A1 | | 11/2001 | Miller et al. .................... 707/4 |
| 2001/0039592 | A1 | | 11/2001 | Carden |
| 2002/0029162 | A1 | | 3/2002 | Mascarenhas |
| 2002/0038348 | A1 | * | 3/2002 | Malone et al. .............. 709/217 |
| 2002/0062310 | A1 | * | 5/2002 | Marmor et al. ................ 707/3 |
| 2002/0152222 | A1 | | 10/2002 | Holbrook |
| 2002/0156917 | A1 | | 10/2002 | Nye |
| 2002/0184059 | A1 | * | 12/2002 | Offutt et al. .................... 705/5 |
| 2003/0088562 | A1 | | 5/2003 | Dillon et al. |
| 2003/0163466 | A1 | | 8/2003 | Rajaraman et al. |
| 2004/0260677 | A1 | | 12/2004 | Malpani et al. |
| 2005/0120006 | A1 | | 6/2005 | Nye |
| 2005/0149507 | A1 | | 7/2005 | Nye |
| 2006/0026152 | A1 | | 2/2006 | Zeng et al. |
| 2007/0156677 | A1 | | 7/2007 | Szabo |
| 2007/0208740 | A1 | | 9/2007 | Nye |

OTHER PUBLICATIONS

Retrieved from the Internet <URL:http://www.hyperbee.com/>[retrieved on Dec. 11, 2001].

Kelsey, D., HyperBee Search Engine Follows Seti@Home Model [online], [retrieved on Dec. 11, 2001]. Retrieved from the Internet <URL:http://newsbytes.com/cgi-bin/udt/im.display.printable?client.id=newsbytes&astory.id=172049>.

Retrieved from the Internet <URL:http://www.microsoft.com/streets/> [retrieved on May 23, 2002].

"Location Intelligence Solutions",Retrieved from the Internet <URL:http://www.geotouch.com/content/solutions/li_solutions.html> [retrieved on May 23, 2002].

"Google searches more sites more quickly, delivering the most relevant results", Retrieved from the Internet <URL:http://www.google.com/technology/index.html> [retrieved on May 23, 2002].

thinkstream, welcome to thinkstream technology, Retrieved from the Internet <URL:http://www.thinkstream.com/> [retrieved on Oct. 27, 2000].

looksmart help, Retrieved from the Internet <URL:http://www.looksmart.com/r?page=/help/main.html> [retrieved on Aug. 9, 2000].

Gnutella News, What is Gnutella?, Retrieved from the Internet <URL:http://www.gnutellanews.com/information/what_is_gnutella.shtml> [retrieved on Nov. 13, 2000].

Moritz, G., "SETI and Distributed Computing," Retrieved from the Internet <URL:http://www.gtexts.com/college/papers/s7.html> [retrieved on Oct. 26, 2000].

About the Open Directory Project, Retrieved from the Internet <URL:http://dmoz.org/about.html> [retrieved on Aug. 9, 2000].

Press Releases, milestones and achievements, Retrived from the Internet <URL:http://corp.oingo.com/Press_Releases/PR_Releases/DS_pr_102400.html> [retrieved on Jan. 12, 2001].

raging search, What is Raging Search?, Retrieved from the Internet <URL:http://ragingsearch.altavista.com/cgi-bin/query?pg=acc&v=about> [retrieved on Aug. 9, 2000].

NeGeo Products, Products, Retrieved from the Internet <URL:http://www.netgo.com/product.html> [retrieved on Aug. 15, 2000].

Vivísimo. [online], [retrieved on Oct. 22, 2004]. Retrieved from the Internet, URL: http://www.vivisimo.com/search?query=houseplans&v%3Asources=Web.

"Geo tags for HTML Resource Discovery," http://geotags.com/geo/, downloaded May 25, 2000 (23 pp.).

"Enhance your business listing in Yahoo! Yellow Pages," http://yp.yahoo.com.com/featured, downloaded May 16, 2000 (1 p.).

"Where in the World is netgeo.caida.org?" http://www.caida.org/outreach/resources/papers/inet_netgeo, downloaded May 18, 2000 (14 pp.).

"GeoTrust—Building Trust," http//www.geotrust.com/building_trust/, downloaded May 19, 2000 (1 p.).

"Geo-Trust—Magazine Have You Been Spoofed?" http://www.geotrust.com/e_mag/feature_editorial, downloaded May 19, 2000 (2 pp.).

"Authentication Service Bureau," http://www.verisign.com/products/asb/_index.html, downloaded Mar. 20, 2001 (1 p.).

"dot com directory," http://www.dotcomdirectory.com/nsi/basic.hm, downloaded May 22, 2000 (1 p.).

"GeoSearch—Localizing Web Searches," http://www.vicinity.com/vicinity/services/GeoSearch—wp.pdf, downloaded Mar. 27, 2001 (6 pp.).

"Dogpile Catalog: Search Results {}", http://catalog.dogpile.com/texis/catalog/about/html, downloaded Jun. 20, 2000 (3 pp.).

"whereonearth.com—software demons," http://www.whereonearth.com/prod_info/geozip.htm, downloaded Jul. 6, 2000 (1 p.).

"TraceWare™ 3.0:Geographic Intelligence for E-Business," downloaded from www.digitalisland.net/common/pdf/traceware_ds.pdf(2 pp.).

"dot com directory: About the dot corn directory™," http://www.dotcomdirectory.com/nsi/about.hm, downloaded May 22, 2000 (1 p.).

"Geotouch," http://www.geotouch.com/content/home.html, downloaded Jun. 19, 2000 (2 pp.).

Shi, Zhongzhi, et al. "IDSIS: Intelligent Document Semantic Indexing System." Intelligent Information Processing. IFIP 17th World Computer Congress—TC12 Stream on Intelligent Information Processing, Montreal, Que., Canada, Aug. 25-30, 2002.

Peng, Xiaogang and Choi, B. "Automatic Web Page Classification in a Dynamic and Hierarchical Way." Data Mining, 2002. ICDM 2002. Proceedings. 2002 IEEE International Conference on Dec. 9-12, 2002 pp. 386-393.

Chekuri, Chandra, et al. "Web Search Using Automatic Classification." Feb. 6, 1997.

Franklin, Curt. "How Internet Search Engines Work." Apr. 16, 2003.

Florida State University, "Standard Industrial Classification (SIC) Codes" (http://web.archive.org/web/20021106150435/http://garnet.acns.fsu.edu/~tchapin/urp5261/topics/sic.htm), Nov. 6, 2002, 1-3.

* cited by examiner

GEOSIGN

O Map view
O Directory view

My community is
"City of Guelph & Rockwood"

[Search] [Change community]

---

GEOSIGN

O Map view
O Query view

My community is
"City of Guelph & Rockwood"

O Toggle URLs off

Automotive

Accountants

Bakers

Butchers

Associations

Computers

METHOD FOR PROVIDING AN ATTRIBUTE BOUNDED NETWORK OF COMPUTERS

RELATED APPLICATION(S)

This application claims the benefit of U.S. Provisional Application No. 60/265,024, filed on Jan. 30, 2001, U.S. Provisional Application No. 60/261,025, filed on Jan. 11, 2001, U.S. Provisional Application No. 60/267,508, filed on Feb. 8, 2001, U.S. Provisional Application No. 60/268,060, filed on Feb. 13, 2001 and U.S. Provisional Application No. 60/282,124, filed on Apr. 9, 2001. The entire teachings of the above applications are incorporated herein by reference.

BACKGROUND OF THE INVENTION

This invention relates generally to computer networks, and more specifically to providing an attribute bounded network of computers.

Two of the major challenges facing the World Wide Web ("Web") are the freshness of data (frequency of update) and depth (quality of coverage) of indexes on data. When a search engine spiders a Web site to update an index, the index is fresh at that time. However, the search engine may not visit that Web site again for several weeks or months, so if the site contains time-sensitive content, such as weekly specials at a grocery store, or events happening around town this weekend, the data may not be indexed until after the data is no longer relevant. Also, search engines' indexing capabilities only manage to reach a percentage of the data on the Web. At best, the majority of Web content is not being indexed.

General purpose search engines present several problems when attempting to relate their indexing activity to any one person's needs. Firstly, the search engines lack depth, as they do not index all the sites that any one user is interested in, but rather follows a structured methodology to choose which pages are indexed. The indexing technique often used is "spidering", whereby a software process follows ("crawls") links in Web pages and indexes the linked Web pages. Google™, a popular search engine, advertises over one billion Web pages indexed, but most of these indexed Web pages are not relevant to any one person. Google™ attempts to provide indexing for Web pages that would interest the Web page viewers as a whole, looking at all the viewers as belonging to a single common set. This can benefit viewers who have very common interests that match closely the needs of the single, global set of index entries, because popular Web sites will get indexed more often, thus providing fresher data. But, viewers have no control of what Google™, or any other search engine, spiders and indexes, therefore most of the index data is not relevant to any one viewer.

Additionally, general purpose search engines offer viewers no control over how often a Web site will be indexed, thus effecting the freshness of the index data. When a viewer finds a particular Web site of interest, they cannot influence the spidering schedule of Google™ to keep the Web page index data fresh. It is up to the viewer to visit the Web page each day in order to insure they are aware of updates. Microsoft has offered support for a limited feature inside of Internet Explorer that allows a viewer to have certain "bookmarks" of Web sites automatically reloaded periodically, or on demand, and report any content changes. This technique only works on Web pages that viewers specifically bookmark and does not address relevant content on Web pages the viewer does not know exist. Any search engine can only spider a limited number of pages every day, and the search engine has no idea which Web pages have changed since the last update, so it must spider all the Web pages to detect new data. This results in some Web (popular) pages being spidered daily, and some (less popular, but very relevant to a particular user) spidered weekly, monthly, or not at all.

The second challenge presented to search engines is that much of the content that is available on the Web is stored in databases and not static pages, so that when the search engines spiders the page, they only collect the static page, and not the much larger set of data stored in the database which can be accessed by the static page. Some people have estimated that the information available in databases and custom served pages, is five hundred times larger than the static size of the Internet (see www.brightplanet.com). Therefore search engines only scratch the surface of the potential content available to the user, and thus depending on the search, may be missing the majority of data available.

In order to solve the problems of freshness of data, and depth of data, inherent in general purpose search engines, companies have attempted to use peer-to-peer ("P2P") and distributed computing technologies. Although these technologies have been successful in other areas, major Web page index companies are not fully utilizing these technologies for indexing and searching the Web. Some companies (e.g., ThinkStream and GoneSilent) have suggested that they will be releasing products using peer-to-peer and distributed computing technologies to perform Web site indexing.

One example technology employs a pre-distributed computing model, in which a central server computer collects a list of all electronic document addresses (URLs) on the Web, and assigns the spidering and indexing of those pages to thousands of client computers connected to the network. With a large enough network of client computers, the entire Web can be effectively spidered daily, or even more frequently. The client computers are each given one or more URLs to spider. As index data is generated, it can then be sent to the central server.

Web page indexing is just one of the areas that suffer from a lack of effective and efficient distributed processing systems. Other systems can benefit from an attribute bounded approach to distributed computing. For example, the Search for Extra Terrestrial Intelligence ("SETI") project uses spare CPU cycles belonging to Internet volunteers to analyze a block of recorded radio signals for variations that may indicate another source of intelligence within the universe. This is known as the SETI@home project. Once a block of recorded radio signals is processed by a member of the SETI@home network it can be returned to the centralized SETI server. This process, when replicated tens or hundreds of thousands of times, has the capacity to analyze data more closely than is currently possible with existing SETI computers.

Napster is an online file sharing coordination system that allows client computers to search for and transfer files using a peer-to-peer network mechanism over the Internet. Clients of Napster connect to the Napster central server and upload information about files (typically .MP3 music files) located on the client's computer. This information can include the file's name, a description of the file, a location of the file and some information about the transmission speed of the client computer's connection to the network. The uploaded information is indexed in a searchable database on Napster's central server. A client can then access the index and search for a particular file (e.g., song). If a match is found, information on the location of the file and transmission speed of the connection is made available to the client. The client then uses software to initiate a direct transaction with the computer having the file in order to download the file to the requesting computer. This peer-to-peer file transfer with central server coordination does not allow attribute bounded regions as part of the process.

Another peer-to-peer system, Gnutella, provides fully distributed information sharing without the use of a central server. Gnutella client software creates a mini search engine and file sharing system between computers connected on a network. Computers in a Gnutella network are identified by an IP address, each computer has a list of "first degree" IP addresses, these are the computers that the software will contact in order to execute a search. Each of these first degree computers also have a list of IP address that they can contact ("second degree") IP addresses. This process can repeat until all the contacted computers have exhausted their lists, but the system allows a "time to live" setting to limit the degree of contact (e.g., 5 levels). Connecting to subsequent computers in a Gnutella network is based upon accessing computers that others have already accessed. Any search is influenced by the previous activity of computer contacted during the search.

SUMMARY OF THE INVENTION

The prior art present many problems when attempting to provide a network of computers, specifically a network of computers for distributed processing. Pre-distributed computing models present problems in that the user of the client computer has no control over what pages his computer spiders. Often his computing power will be used to spider pages that are of no interest to him. In fact, a client computer could end up spidering pages of Web sites that are against the users direct beliefs, values, or affiliation. For example, a vegetarian may not want his client computer to be used to index pages on preparing meat products. SETI@home also suffers from problems in allocating distributed computing resources, it does not have the capability to assign blocks based upon any attributes defined by the client computers.

Existing centralized control type peer-to-peer systems, such as Napster, do not have a way to limit the results of a search to a specific geographic region (e.g., "Stairway to Heaven, located on computers in Boston, Mass."). Existing pure peer-to-peer systems, such as Gnutella, do not provide a mechanism to limit the breath (i.e., the set of computers to contact at a specific level) or the depth (i.e., the number of levels) based upon an attribute bounded region.

Thus, in accordance with an aspect of the present invention, a method, apparatus and article or manufacture for creating an attribute bounded network of computers is provided. In particular, the computers within the attribute bounded network can perform distributed indexing of electronic documents stored on computers within the network. The resulting index can be accessed from the distributed computers or uploaded to a computer server.

In one embodiment computers in a distributed computer network are identified by a specific attribute (e.g., a geographically bounded region) and a server is used to distribute addresses of electronic documents to be indexed based upon the attribute. For example, a user of a computer identified as located in Boston, Mass., USA can connect to a server, identify a physical location (attribute) and be assigned a group of electronic document addresses associated with Boston in order to spider (fetch and index). The resulting index information can be stored locally on the computer and/or uploaded to a server for network-wide access. In this embodiment, a method for creating an attribute bounded network of computers comprises creating, on a server computer, a list of attribute bounded electronic addresses representing the indexable electronic documents on the computer network. Then, assigning an electronic address from the attribute bounded list based upon an attribute bounded request from a requesting computer by matching at least one of the electronic addresses in the attribute bounded list to at least one attribute from the attribute bounded request. An assigned electronic address is distributed to the requesting computer and processed to create a processed result based upon the distributed electronic address.

One example of an attribute is a geographically bounded region, the geographically bounded region can be automatically generated based upon the requesting computer's physical address (e.g., Boston, Mass.) or computer's network address (e.g., IP address). An attribute can also describe a topical boundary, such as interests, careers, or associations with specific brands. For example, a computer can be identified as being associated with "dancing", "lawyers" or "Nike". In these cases an attribute bounded request can be matched to electronic document addresses (e.g., URLs) on the server computer that are also associated with those attributes. An attribute bounded request can result in the same electronic document addresses being assigned to multiple computers in the computer network. This redundancy provides improved reliability and timeliness to the processed results. The system also has the ability to assign electronic document addresses outside of the attribute bounded specified. This is useful when certain electronic document addresses remain unassigned after a certain period of time.

Geographically bounded regions may be defined using existing city, zip code, longitude/latitude/altitude, telephone area code and/or informal (e.g., "greater Boston") designations. Additionally, ad hoc geographically bounded regions can be designated, for example a point can be defined and a region bounding that point can be designated (e.g., "within a five mile radius of Boston"). In one preferred embodiment geographically bounded regions are used for distributing the processing for spidering Web pages stored on the World Wide Web. Automatic geographically bounded region designations can be generated during the installation of an embodiment of the present invention on peer computers. Typically a machine's physical location can be ascertained and used as its geographically bounded region. Alternately, the computer's geographically bounded region can default to an operating system (e.g., Microsoft Windows) defined country, or a reverse DNS lookup can be used to generate the geographically bounded region.

In another embodiment of the present invention a method, apparatus and article of manufacture for sharing an electronic documents located on a computer in a peer-to-peer computer network is provided based upon geographically bounded regions by establishing a session between a first computer and a server computer, transferring a bounded attribute indicator from the first computer to the server computer and transferring an electronic document address representing the electronic document, along with an index for the electronic document, from the first computer to the server computer. Searching, by a second computer, for the electronic document, on the server computer by matching a bounded attribute indicator from the second computer is performed. Notification is received on the second computer, from the server of the electronic document address of the electronic document and the second computer initiates, a request to transfer the electronic document from the first computer to the second computer.

In yet another embodiment of the present invention a virtual community is created within a peer-to-peer computer network by identifying peer computer connections based upon a geographically bounded region. Geographically bounded regions can be identified by simply specifying a certain predefined geographic region (e.g., Boston, Mass.) or the region can be defined using existing geographic techniques, including specifying longitude/latitude/altitude, specifying a point and a radius or other known methods of defining a bounded geographic region. A method for creating a virtual community within a peer-to-peer computer network by identifying peer computer connections based upon a bounded attribute indicator comprises defining the bounded attribute indicator for a computer and identifying peer computers associated with the bounded attribute indicator. A list of identified peer computers is on the computer network that are associated with the bounded attribute indicator is created. The list of identified peer computers is used to communicate with peer computers within the peer-to-peer network to create the virtual community.

Using one technique a network request message, including a geographically bounded region identifier, is sent from one peer computer to a second peer computer. If the second peer computer is associated with the same geographically bounded region identified in the network request message then the second computer responds with a network reply message. Peer computers that do not send network reply messages (i.e., are not associated with the same geographically bounded region) are not placed on the list of identified computers.

The virtual community can host a searchable index of electronic document addresses stored within the peer-to-peer computer network. Each peer computer within the peer-to-peer computer network can also provide an index of electronic documents available locally on that computer. Each peer computer's list of identified computers can contain identifiers associated with multiple geographically bounded regions. The list of identified computers can be aggregated with lists on related peer computers by using a peer computer bridge, the peer computer bridge being capable of summarizing information represented by the aggregated related peer computers and communicating with other peer computer bridges.

The present invention provides fresher data by allowing spidering of electronic documents more often than can be done by a central server indexing site (e.g., Google).

In the prior art, identification and allocation of distributed processing resources is somewhat arbitrary (e.g., SETI@home) and/or subject to hardcoded limits (e.g., the latency time of network transfers used by Napster). The present invention achieves a more flexible and effective identification and allocation of distributed processing resources through the use of attributed bounded requests. This allows a requester to identify certain attributes of a processing task that the requestor is particularly suited to perform. For example, a requestor may identify their computer as being located in Boston, Mass. and identify a topic of interest as "dancing". A server allocating processing tasks (e.g., electronic document indexing) can now better target computers based upon matching attributes. The assumption being that requesters within a certain attribute bounded region will be more willing to allow their computers to be used for tasks (e.g., indexing) on electronic documents associated with their identified bounded attribute. Additionally, users within a geographically bounded are more likely to receive better response times from other computers within their geographically bounded region. All other things being equal, a computer located within the same geographically bounded region is more likely to physically closer than a randomly chosen computer within the network and therefore able to transfer data faster.

The present invention also reduces network traffic in a peer-to-peer computer network. In the prior art every peer computer that receives a network request message (i.e., a ping) will respond with a network reply message (i.e., a pong). This results in much, untargeted network traffic. The present invention allows for less overall network traffic by targeting network reply messages to those peer computers associated with a attribute bounded request (i.e., only pong to pings from computers that match your attributes).

The present invention differs from the Microsoft (Subscription) methods in that it will allow a user to be notified of changes in Web sites that the user has not visited, or does not know exist, but rather exist inside an identified geographically bounded region.

The present invention allows clients within the distributed computing model to have control over how their computing time is being used, and more specifically, to do this by defining an attribute bounded region which allows them to allocate time to both Web sites they know, as well as web sites they do not know, but are associated with an attribute that the user considers a community. The results from these searches are much fresher since the data is spidered more often, especially as more machines are added to the network.

In launching a peer to peer network for any application, there are issues of scale surrounding the way and method in which a network evolves, and if not properly managed, how it can quickly grind to a halt from a variety of problems. One problem that can occur is propagation of pings. If there is no timeout mechanism, or method of causing a ping to decay, then network performance will degrade as a result of excessive traffic from all the machines pinging each other. If the timeout mechanism is set to an aggressively short period, then the opposite effect may occur and any given machine does not find the information sought before the ping decays. Another example of a problem occurs while using peers to index the entire Internet.

Imagine a system where peers on a network maintain and store an index of Web sites. When any given peer initiates a search, it would send out a request to all the peers on the network, and each peer would check its local files stored, and return matches. Without some form of organization, the number of random pings required to perform an effective search could be greater than the network could handle. As well, certain sites could end up being indexed by so many peers that the normal operation of that Web site might be affected. To avoid this problem, an effective mechanism of organizing peers is needed. By organizing peers into a network where geography (proximity) is used to select connecting peers, you establish some order into a much larger network, so that users cluster together first by geographic parameters and then by theme, latency and other factors as secondary ordering or selection mechanisms.

In physical communities, people share common interests closely related to the geographical and social conditions that shape their daily lives. Local media (newspapers, TV, radio, etc,) reinforce this "local bias". For example, people living in cold Northern climates such as Scandinavia or Canada are far more likely to be interested in skiing, skating, ice hockey, and bobsledding than people living in warmer climates such as the Caribbean. On the Internet, a file about ice hockey should be cached on a computer in Canada rather than on a computer in Jamaica. An even stronger argument can be made that a Web site about a local sports team such as the Toronto Maple Leafs, should be cached on a computer in Toronto, while a Web site about Sweden's national hockey team should be cached in Stockholm. There are many Web sites that have a natural geographic affinity. These include Web sites that represent merchants, (where consumers want to feel, taste or smell the goods before purchase) and Web sites that represent service providers such as dentists, doctors, lawyers, auto repair shops that require the user to visit the establishment to receive the service or to establish a trust relationship. This predicates a natural sense of geographic order. Of course there are information type Web sites that have fewer or no geographic restrictions, such as a Web site about global warming. Even for this type of Web site, the language it uses is a geographic and social modifier. Uni-lingual Chinese users will avoid English language Web sites. This invention also does not presume that everyone will only have interests in their local geography, and someone living in Jamaica could be an avid ice hockey fan. The invention employs methods based on the fact that in any given sample of 100 Canadians versus 100 Jamaicans, more Canadians will indicate an interest in Ice Hockey than Jamaicans.

Find three sample groups of Internet users, 100 in Canada, 100 in Jamaica, and 100 randomly chosen from throughout the world. Each and every one of these users have 100 "URL bookmarks" of their popular Web sites, totaling 10,000 from each sample. After removing any duplicates, there is a high probability that we are left with a number less than 10,000 from each sample group. It is our belief that the number of unique URL bookmarks in both the Canada sample and the Jamaica sample will be less than the number of unique URL bookmarks in the random group sample. This is because local users from the same geographic community have similar interests, shop at similar stores, and are influenced in similar ways. 93% of consumer commerce takes place locally, and 58% of Iternet users perform some form of geographic searching online. Both of these statistics prove geographic bias.

Other systems of propagation involve themes so that two people who both like Britney Spears connect without geography as a factor. This is a very good method for association, as two people liking Britney Spears might also like Teen magazines, makeup or other teen rock singers. However, as this group increases to the point when a network contains 10,000 Britney fans, two Britney Spears fan living in the same community, are far more likely to share other common interests than two fans that live far away from each other.

A large mature network may be difficult to reorganize and re-order after it has grown to a large size. A geographic ordering mechanism provides a natural method for organizing the network as it propagates and supports large scale growth without problems. There are many examples of techniques being used to improve network performance, including super peers, bridges and caching. An embodiment of the invention describes a method of using geography to organize a large scale peer to peer network. Despite the fact that Internet routers get faster, we ultimately face the restriction of the speed of light, and two machines that are closer will always communicate faster, all other things being equal. During the early stage of the Internet, cable infrastructure and other issues have made proximity less significant, but that will soon change.

The viability of distributed network governed by a central server, where tasks can be assigned to multiple machines (clients) on that network, is affected by issues of management relating to scalability. The networks' viability is measured by the degree of freshness of data, user satisfaction, and targeted results.

Imagine a network where thousands of computers survey (spider) the Internet and index each page found in a central database. Google works this way. However, Google, like any search engine, cannot index every page on a periodic basis, let alone every day due to the practical limitations of their resources. It has been proposed that a network of users on the Internet, could index the entire Internet every day. SETI@home is a project that has over a million users searching for extra-terrestrial life in a distributed fashion. The combined CPU cycles being used for this one task, turns this network of peers into the largest computer in the world. If these million users each indexed 10 web pages a day, then they could index the entire Internet every 200 days (based on the Internet having an estimated 2 billion pages). With one hundred million users you could do this task every 2 days, although likely by the time you had that many users, the Internet would be much larger. The point is, that for any firm or network it is a Sisyphean task. A very important note is that on all the above cases, the web sites are all known due to the fact that Web site addresses must be published and lists are publicly available. There is no method of knowing which sites have changed, and therefore the entire web must be surveyed and indexed constantly to ensure freshness of data. Prioritizing which sites get surveyed is a function of the search engine. Google uses links to determine popularity of sites and likely indexes the more popular sites more often.

Imagine a search engine based on a distributed topology, that wanted to sign up users to spider the Web. Imagine they have 10,000 users, and they have purchased a list of twenty million URLs representing all the URLs that are active and live on the Internet at that given time. These 10,000 users are randomly distributed around the world, with concentration higher in the US, where Internet usage is higher. Three possible implementations of this network:

1) In an unordered system, the central computer randomly picks Web sites from the list and starts assigning them to the 10,000 users to index. Each user spiders a site and sends the index record to the central computer which date stamps the index record, stores it and issues the user another web site to spider. After the first day, the network has spidered 10,000 web sites, which is a small fraction of the total Internet. The next day, every user performs a query of the search engine based on a topic of interest to that user. It is very likely, in fact a statistical certainty, that several queries will match pages that have not been indexed. Another way of saying it, is that no results will be returned because the desired results are in the pages that are not indexed.

2) A better implementation involves providing some order. One logical choice would be to index the most popular web sites first, assuming you knew the popularity of the web sites. This means that the first 10,000 Web sites indexed would be the most popular web sites accessed. This presents several problems: The most popular Web sites are extremely large, and therefore a machine could not on its own spider the entire Web site, so likely many computers would spider portion of the Web site, so 10,000 users may only be able to spider the top ten Web sites. The most popular web sites are those that most of the 10,000 users have likely visited, bookmarked, or even have high degree of knowledge about the content. While very important, this ignores the unpopular Web sites, and provides biased results to any query. In fact on the Internet today, the popular sites get spidered and indexed the most, and this has created a system where smaller less popular Web sites are not easy to find. At some point in time a self re-enforcing loop is created in that only popular Web sites get returned as matches to queries, so they get more visitors and thus become more popular and in turn show up more often as matches to queries, and so on. Before the list of URLs is finished being spidered, the central computer resets itself to the more popular computers to avoid staleness of the original popular Web sites. Note that this method also imposes global web habits on a smaller group of users.

3) A third method which improves upon the first and second methods, is to use a list of URL bookmarks from the users, so that the list of URLs to be indexed becomes the list of the sum of all the bookmarks, and this reduces any global bias by ensuring that each user is spidering on the pages that one of the users uses. So if each user had an average of 100 bookmarks, the million Web sites (less any duplication) would be spidered first. In fact, after spidering the one million Web sites, the central computer could start the indexing of the one million bookmarked sights over again, to avoid staleness but this would ignore other sites. This method is very good as it ensures that the users are indexing sites of relevance to the community. However, this has three weaknesses: with a large number of users, and a large number of bookmarks, there becomes an issue of order or priority.

The second problem is that any one user may be spidering a site which is not one that they themselves may have interest in, and the user may take offense to this. Both of these problems are addressable.

The third problem with bookmarks is that it only spiders URLs known to the user, and not URLs likely to be of interest but unknown to the user. It can be argued that sites that are bookmarked by a user are not sites they want returned when they do a search, but rather sites they do not know about. The counter argument, is that the community of bookmarks representing sites that are of value to the community contain matches from other users that would be relevant and unknown to any one user. This is a correct statement, but the counter counter argument is that it biases the results towards the collective communities bookmarks, so that sites that may exist, but not be bookmarked get missed, and these missed sites are the hardest ones to find.

The method which this invention provides improves upon the first three methods and specifically the third method by using geography as a predictor of unknown Web sites that may be of interest to the user. This addresses some of the problems outlined in the third method. The user, when connecting to the system, specifies a bounded region and a set of themes and if desired their current bookmarks. A routine working with a database that contains the geographic location of URLs in the physical world, returns a set of all URLs in the bounded region, and reduces that set by eliminating those sites that do not match the desired themes or other filters specified by the user. The routine then adds bookmarks of sites that may exist outside the bounded region, to create a list of user identified URLs. These URLs become the list of URLs that this user will spider, although because of the geographic overlap of users' regions, there will be many URLs that are reported in many users lists, so any one user may only spider a small portion of their URL list. As the number of users increases, there is more overlap and less work for the user to do to have all their URLs covered. The advantage of this method is that is allows the user to be satisfied that they are only having their computer used to spider their URLs, and therefore provides value to them. Also, it identifies URLs that are not known to the user but may be of interest to them due to their geographic proximity. For example, if the theme was restaurants and arts sites, then in addition to their bookmarks, all local restaurants, and art gallery, art supply stores etc. would be added as URLs. The user may already have bookmarked several local restaurants, but now they have all of them (that have URLs), so new ones are introduced to the user, and if the user queries for local restaurants serving prime rib, then they get a search of all the local restaurants serving prime rib, and because the other URLs were added to the users list, the content should be relatively current, so that the information can be trusted. If the information that the restaurant serves prime rib is one year old, the user likely will call the restaurant to confirm the information is valid or disregard it. The issue of priority of web sites is resolved as outlined in method 3, because only sites in the URL list are spidered, so if one user in Toronto submits 1000 URLs and never logs on or allows his computer to be used for indexing then any URLs unique to him would not get spidered. The more users in an area contributing to a project the faster that data is collected, and the data will be more current, and therefore of more value. If the information is of more value then it gets to be known to others that they should join this distributed network and help their community, and get current information, and this encourages the viral growth of the network.

In conclusion of the distributed processing section, while there are methods of sharing resources over many computers to search the web, the method of geographically organizing the users has intrinsic benefits to address the problems outlined, and can provide a better organized method that currently exists for organizing a network of users with the intent of indexing web pages on the internet. This method can be imposed on top of, or in parallel with, other methods of ordering as someone skilled in the art could do with the above information. This is not designed to address all applications, and may not apply to someone sharing resources for finding the cure for cancer, but has merit for applications where geography is a factor or when other methods of organizing a large network are not available.

The indexing of URLs on the Internet is influenced by two factors: the number/percentage of URLs that are indexed and the user acceptable refresh-rate (freshness) of the indexing. In a perfect world, every URL on the Internet would be indexed within a user acceptable time-frame. Since resources currently do not exist to provide this, compromises are made. For example, Google concentrates on indexing the most popular Web sites of general interest. An alternate is to index a subset of the URLs within a user acceptable time-frame, providing fresher indexes than are possible from a general purpose indexer such as Google. The subsets can be defined by the geographically bounded regions of the users, allowing users to index sites within their geographically bounded region. This allows users to influence the freshness of URLs of most interest to them by providing processing for indexing of URLs within their geographically bounded region. These URLs may, or may not, be the most popular to the general population, but may be very popular within their geographically bounded region. The indexes created by this geographically bounded process can be uploaded to augment a central search engine site (e.g., Google) or they can be stored separately creating a specific geographically bounded index.

The improved scalability of the network can be illustrated by the following example. Assume a first user defines a geographically bounded region (e.g., Boston) and submits a request to a central URL list server to index all URLs associated with Boston. The user specifies a limit 100 URL per week to index. There may be 50,000 URLs associated with Boston. So on the first week the user indexes the first 100, on the second week the user indexes the second 100, and so on. It will take the single user 500 weeks to completely index all 50,000 URLs. If 500 users define a geographically bounded region of Boston and request URLs to index, then the full set of 50,000 URLs can be indexed in 1 week. This refresh-rate can be reduced as more users join the geographically bounded region. In this way the indexing task scales as the number of users increases.

While there are methods of sharing resources over many computers to search the Web, the method of geographically organizing the users has intrinsic benefits to address the problems outlined, and can provide a better organized method that currently exists for organizing a network of users with the intent of indexing web pages on the internet. This method can be imposed on top of, or in parallel with, other methods of ordering as someone skilled in the art could do with the above information. This is not designed to address all applications, and may not apply to someone sharing resources for finding the cure for cancer, but has merit for applications where geography is a factor

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

Attribute Bounded Network

Figure 1:
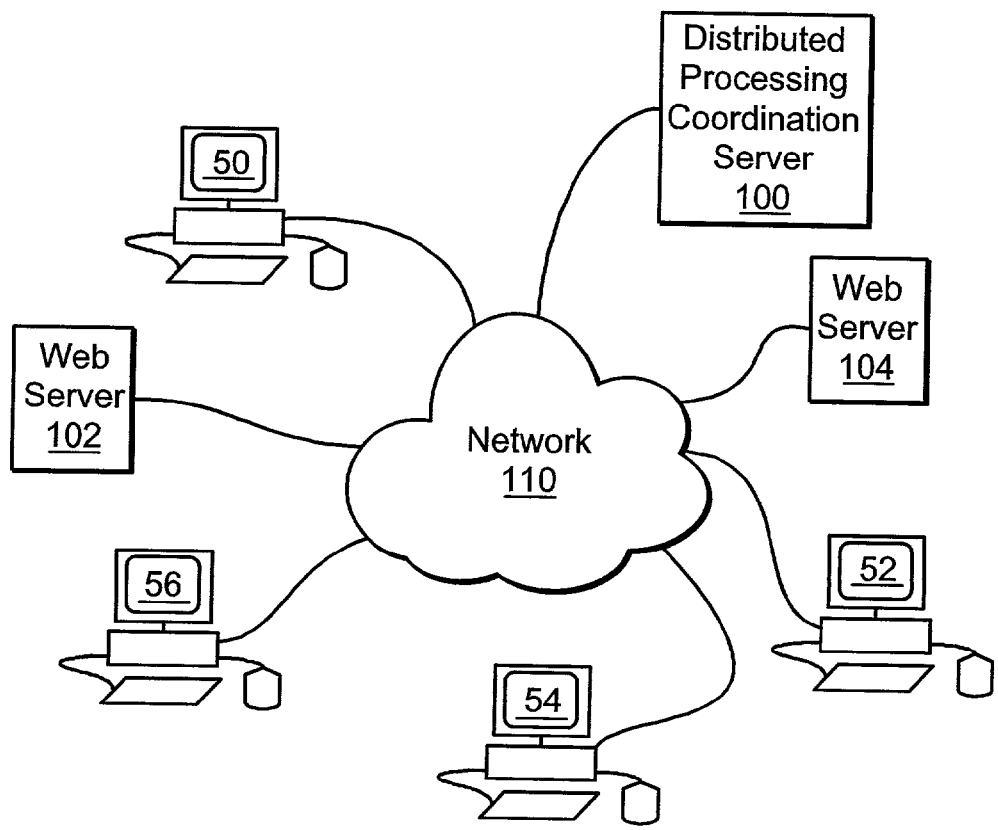
FIG. 1 illustrates an attribute bounded distributed indexing system using a server coordinated computer network on which an embodiment of the present invention is implemented.

FIG. 1 illustrates an attribute bounded distributed indexing system using a server coordinated computer network on which an embodiment of the present invention is implemented. Computers 50, 52, 54, 56 are connected to network 110. Web servers 102, 104 are also connected to network 110. In one embodiment computers 50, 52, 54, 56 are personal computers running Web browsers connected to the World Wide Web via network 110. Each computer 50, 52, 54, 56 has a program running that enables the computer to perform distributed processing (e.g., indexing) based upon assignments (e.g., a list of attribute bounded electronic addresses) issued from distributed processing coordination server 100. In this embodiment, distributed processing coordination server 100 contains a list of electronic document addresses representing electronic documents accessible by network 110. The list is attribute bounded by associating various attributes to specific electronic addresses. In one embodiment the electronic document addresses can be associated with geographic regions. For example:

| | |
|---|---|
| www.redsox.com | Boston, Massachusetts |
| www.harvard.com | Cambridge, Massachusetts |
| www.geosign.com | Guelph, Ontario |
| www.fidelity.com | Boston, Massachusetts |
| www.loganairport.com | Boston, Massachusetts |

Electronic document addresses on the list can be assigned to various computers 50, 52, 54, 56 within the network 110 for processing. In this way, processing of the electronic document addresses can be assigned based upon commonly identified attributes. A computer 50, 52, 54, 56, located in Boston, Massachusetts will be assigned "www.redsox.com", "www.fidelity.com" and "www.loganairport.com" for performing processing. Electronic document address "www.harvard.com" can be assigned to a computer 50, 52, 54, 56, located in Cambridge, Mass. and "www.geosign.com" can be assigned to a computer 50, 52, 54, 56, located in Guelph, Ontario. The computers 50, 52, 54, 56 matching attributes associated with the electronic document addresses can better perform processing (e.g., indexing) for their associated electronic document addresses as they are more likely to be interacting with electronic document addresses associated with their geographic region. This leads to fresher indexing that can be uploaded to the distributed processing coordination server 100, or any other network server, for searching by all computers connected to network 110. Additionally, computers 50, 52, 54, 56 can add electronic document addresses to the list maintained by distributed processing coordination server 100, thus increasing the effective domain of indexed electronic documents.

Figure 2:
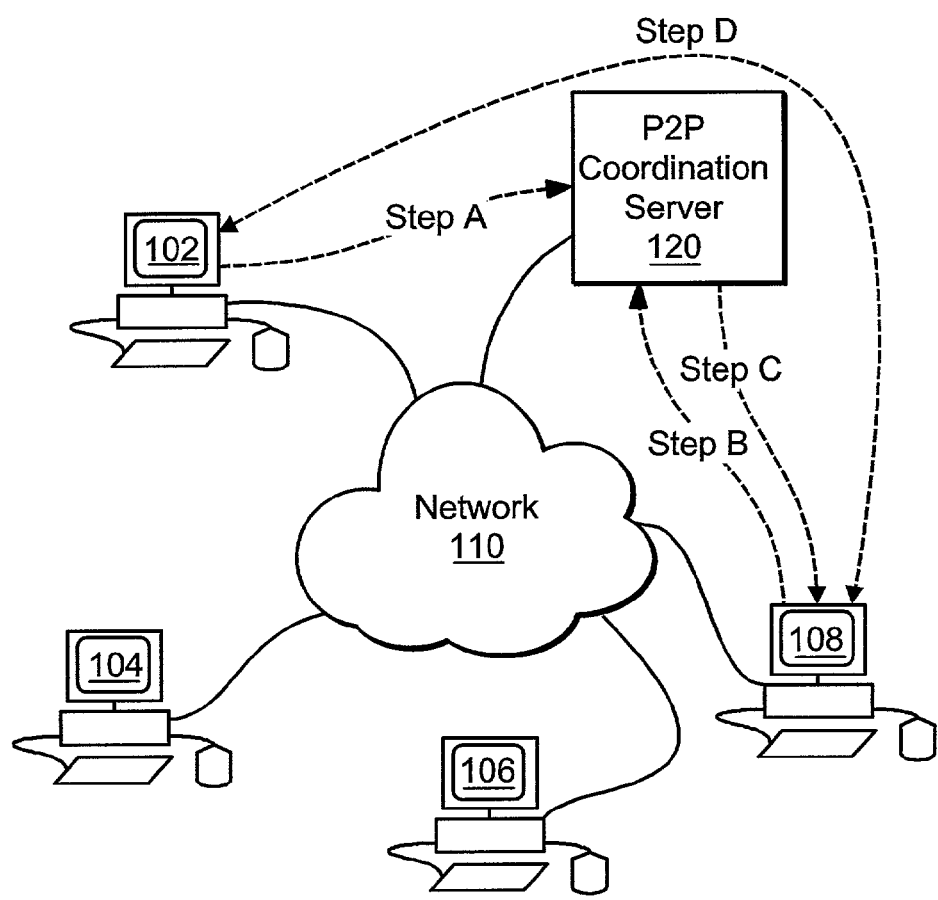
FIG. 2 illustrates an attribute bounded peer-to-peer computer network using a coordination server on which an embodiment of the present invention is implemented.

FIG. 2 illustrates an attribute bounded peer-to-peer computer network using a coordination server on which an embodiment of the present invention is implemented. Computers 102, 104, 106 and 108 are connected to network 110. Peer-to-peer (P2P) Coordination server 120 is also connected to network 110 and acts to manage distributed processing tasks among computers 102, 104, 106 and 108. In one embodiment, computers 102, 104, 106 and 108 are personal computers running software to upload/download files and query a central file index stored on P2P Coordination server 120. In an example application using this embodiment, a user of computer 102 connects to network 110 and uploads information (Step A) to P2P Coordination server 120 about a file that the user of computer 102 is willing to share. The information sent to P2P Coordination server 120 includes attribute information that is bound to the electronic address representing the file that the user of computer 102 is willing to share. The attribute information can be related to the geographic location of computer 102, and thus would be geographically bounded region information. A user of computer 108 can also connect to network 110 and query P2P Coordination server 120 (Step B), looking for a specific file or a specific class of files. The connection process for the user of computer 108 also sends attribute information to P2P Coordination server 120. P2P Coordination server 120 can then use its list of attribute bounded electronic addresses to match the attribute bounded query from computer 108 to produce a list of matching files for the user of computer 108 to download. Once the user of computer 108 selects a specific file, information can be transferred to computer 108 (Step C), enabling it to initiate a download of the specific file (Step D) directly from the computer on which the desired file is stored (e.g., computer 102) without the file ever passing through P2P Coordination server 120. Steps A through D, as shown on FIG. 2, are logical connections for illustration purposes, since computer 102, 104, 106 and 108 are connected via network 110 all physical connections would utilize network 110.

Information about the attributes of a specific electronic document or a specific query/user can be conveyed to P2P Coordination server 120 in a variety of ways. In one embodiment a user initiates a logon session with P2P Coordination server 120 and during the logon negotiation, attribute information about the user and/or computer is passed from the user's computer to P2P Coordination server 120. In another embodiment each specific query carries attribute to P2P Coordination server 120. The present invention is not limited by the format of the attribute information, nor is it limited by the specific query strategy employed by P2P Coordination server 120 in matching the query to electronic document addresses. For example P2P Coordination server 120 might first process an attribute bounded file query against the names of known files indexed on P2P Coordination server 120, then filter using the attribute supplied. Alternatively, P2P Coordination server 120 might first filter the names of known files indexed on P2P Coordination server 120 using the supplied attribute, then search using file names in the query.

Since querying on P2P Coordination server 120 involves matching attribute bounded files to attribute bounded queries, the results received are more likely to represent the files a user actually wants. For example if a querying user is from Boston, Mass. and requests files about "subs", meaning "submarine sandwiches" then that user is more likely to find the desired information in files uploaded by users in the Boston area. Otherwise, a non-attribute bounded query on "subs" might match files about "navel submarines" uploaded by a user in Groton, Conn. This is an example of a phrase having different meanings among various groups (e.g., geographically, age, or culturally diverse groups. The present invention provides improved distinction among phrases with dual meaning. Attribute bounded queries, processed by P2P Coordination server 120, therefore allow for higher quality search results. Attributed bounded queries can also produce fresher query results because users associated with specific attribute groups are often more likely than a "general" user to access files associated with the specific attribute.

Figure 3:
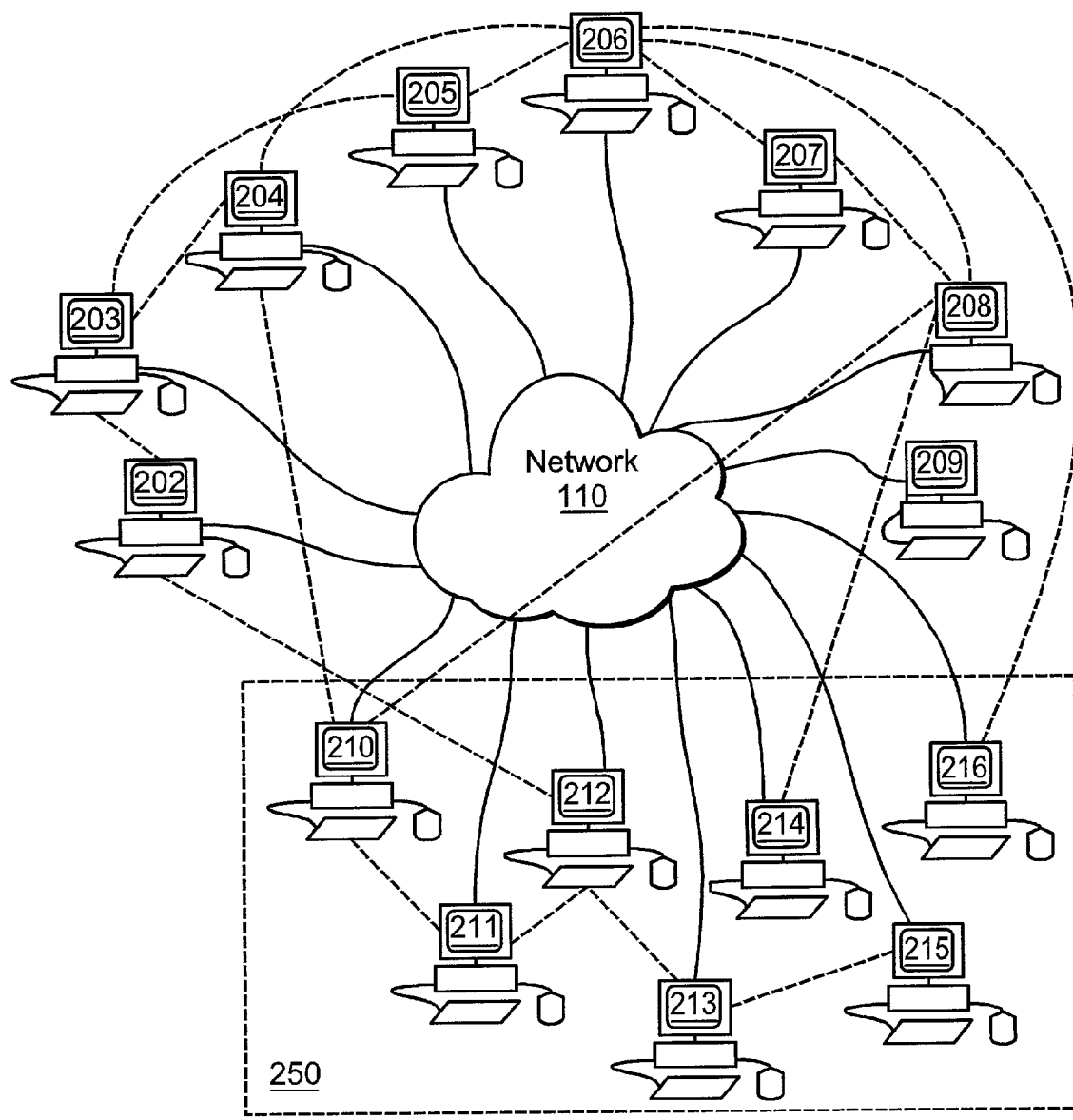
FIG. 3 illustrates an attribute bounded peer-to-peer computer network on which an embodiment of the present invention is implemented.

FIG. 3 illustrates an attribute bounded peer-to-peer computer network on which an embodiment of the present invention is implemented. Computers 202-216 are connected to network 110. In one embodiment computers 202-216 are personal computers running Web browsers connected to the World Wide Web via network 110. Each computer 202-216 has a program running that enables the computer to perform some distributed processing task (e.g., searching). Each computer 202-216 also has at least one bounded attribute associated with it. The attribute may be geographically or topically bounded. Computers with the same, or similar, bounded attributes are said to form a virtual community. For example, computers 210-216 are defined as having the same attribute (e.g., they are geographically bounded to Boston, Mass.) and form a virtual community 250 representing Boston, Mass. When a message is sent through network 110 looking for nodes associated with Boston, Mass., only computers 210-216 will respond, computers 202-209 will not respond.

In an embodiment of the present invention each computer 202-216 maintains an index of electronic documents stored locally and each computer 202-216 has the ability to initiate a query to locate electronic documents stored on computers 202-216 connected to network 110. These queries specify a bounded attribute and a time-to-live ("TTL") indicator. The bounded attribute is used to direct the query to the most appropriate target computers. The time-to-live indicator is used to restrict the number of levels the query will propagate within the network before terminating.

Computers in a peer-to-peer network communicate by storing a list of computer addresses which can be used to send request messages, the computers receiving these messages also store a list of computers addresses. This scheme allows messages to propagate throughout the network, eventually reaching enough computers that one is found that can satisfy the request within the message. In one specific example represented in FIG. 3 the following table describes the interrelationships of computers 202-216:

| Computer: | List of peer computers: |
|---|---|
| 202 | 203, 212 |
| 203 | 202, 204, 205 |
| 204 | 203, 206, 210 |
| 205 | 203, 206 |
| 206 | 204, 205, 207, 208, 216 |
| 207 | 206, 208 |
| 208 | 206, 207, 210, 214 |
| 209 | N/A |
| 210 | 204, 208, 211 |
| 211 | 210, 212 |
| 212 | 202, 211, 213 |
| 213 | 212, 215 |
| 214 | 208 |
| 215 | 213 |
| 216 | 206 |

An initial request message from computer 216 can specify a geographically bounded attribute region of "Boston, Mass." and a time-to-live indicator of five. The initial request message (ping) from computer 216 will travel to computer 206, since computer 206 is not associated with the geographically bounded attribute region of "Boston, Mass." it will not send a response message (pong), but will propagate the request message to its known peers (i.e., computers 204, 205, 207 and 208). In passing the request message on, computer 206 will reduce the time-to-live indicator by one to a value of four. Computer 206 will generate four request messages to four separate computers within the network (i.e., computers 204, 205, 207, 208), thereby creating four parallel request message paths. Note that the processing described in the following separate path descriptions (i.e., FIGS. 4, 5, 6 and 7) can occur in parallel.

Figure 4:
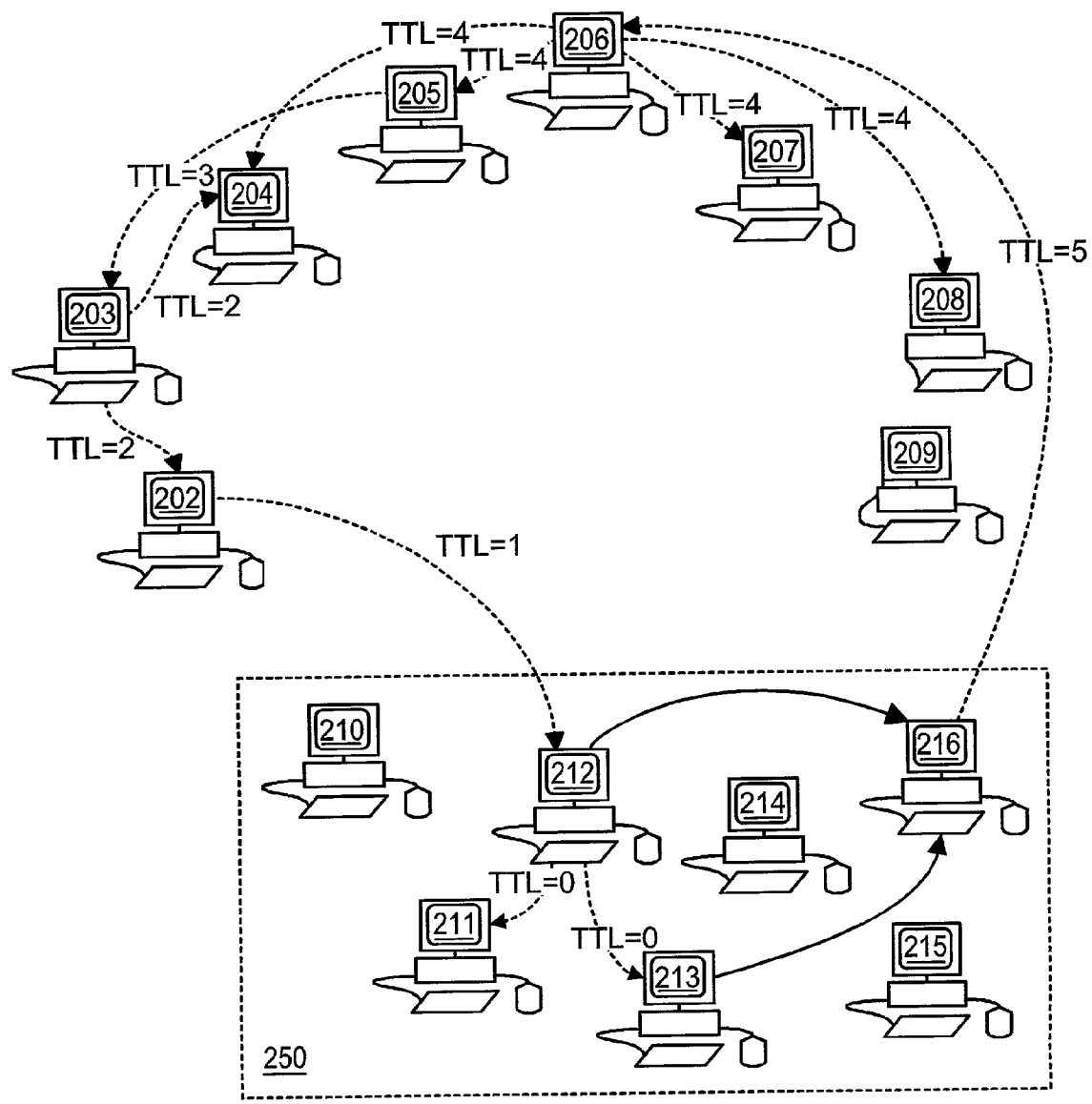
FIG. 4 illustrates an example request message propagating along a path from computer 205.

FIG. 4 illustrates a request message path starting at computer 205. Computer 205 receives the request message (ping) and compares it to its bounded attributes. Since computer 205 is not associated with any bounded attribute of the request message, computer 205 does not send a response message (pong). Computer 205 now reduces the time-to-live indicator to three and prepares to send the request message to its associated peer computers (i.e., computers 203 and 206). Since computer 205 can tell that computer 206 is in its list of peer computer, it can perform an optimization and not propagate the request message back to a previous sender, thus computer 205 only sends the request message on to computer 203.

When a request message (ping) is generated by a peer computer (in this example, the request message that originated with computer 216), one of the pieces of information included in the request message is a globally unique identifier ("GUID"). This GUID stays with the request message as it is propagated throughout the network. Computers maintain a list of GUIDs for request messages that they have "seen". The list is used to identify duplicates and avoid recursive loops, without such a mechanism, any pure peer-to-peer model would very rapidly collapse as traffic would multiply until tim-to-live indicators expired. The concept of a time-to-live indicator in a routed network (like TCP/IP) stems from the need to prevent a network from looping request messages forever. The concepts used to prevent duplicate processing and recursive loops in a peer-to-peer network are common knowledge to one skilled in the art.

Computer 203 receives the request message (ping) and compares it to its bounded attributes, since computer 203 is not associated with any bounded attribute of the request message, computer 203 does not send a response message (pong). Computer 203 now reduces the time-to-live indicator to two and prepares to send the request message to its associated peer computers (i.e., computers 202, 204 and 205). Again ignoring the peer computer which sent the request message (i.e., computer 205) computer 203 sends the request message on to computers 202 and 204. Computer 204 can immediately discard the request message, as it has previously received the same request message directly from computer 206, (see FIG. 5). Computer 202 receives the request message (ping), and compares the attribute bounded region to its bounded attributes, since computer 202 is not associated with any bounded attribute of the request message, computer 202 does not send a response message (pong). Computer 202 now reduces the time-to-live indicator to one and prepares to send the request message to its associated peer computers (i.e., computers 203 and 212). Again ignoring the peer computer which sent the request message (i.e., computer 203), computer 202 sends the request message on to computer 212. Computer 212 receives the request message (ping) from computer 202 and compares the attribute bounded region to its bounded attributes. Since computer 212 is associated with the bounded region defined by the request message, it sends a response message (pong) to computer 216. The response message can simply indicate that an attribute match has occurred and identify the address of the matching computer, or the response message can contain results of processing (e.g., indexing) performed on the matching computer. Computer 212 now reduces the time-to-live indicator to zero and prepares to send the request message to its associated peer computers (i.e., computers 202, 211, 213, 216). Again ignoring the peer computers which sent the request message (i.e., computer 202 and computer 216) computer 212 sends the request message on to computer 211 and computer 213. Computer 211 receives the request message (ping) from computer 212 and immediately discards it as it has previously received the same request message (ping) from computer 210 (see FIG. 5). Computer 213 receives the request message (ping) from computer 202 and compares the bounded attribute to its bounded attributes. Since computer 213 matches an attribute in the request message from computer 216, it sends a response message (pong) to computer 216. Computer 213 identifies that the time-to-live indicator is zero, so it does not propagate any further message requests to its associated peer computers.

From FIG. 3, it can be seen that computer 215 is within the bounded region 250, but is only connected to computer 213. As computer 213 is not forwarding the request message request due to the expiration of its time-to-live indicator, computer 215 will not be visible to computer 216. Thus, computer 215 will not be able to process the request from computer 216 contained in the request message sent. A time-to-live value can cause a peer computer within an attribute bounded region not to be identified. In a preferred embodiment of the present invention this scenario does not occur, as computer 215 would be configured to be connected to more than one peer computer in network 110. A network using the present invention can grow in an inherently well organized manner as knowledge of which peers are associated with which attributes is discovered.

Figure 5:
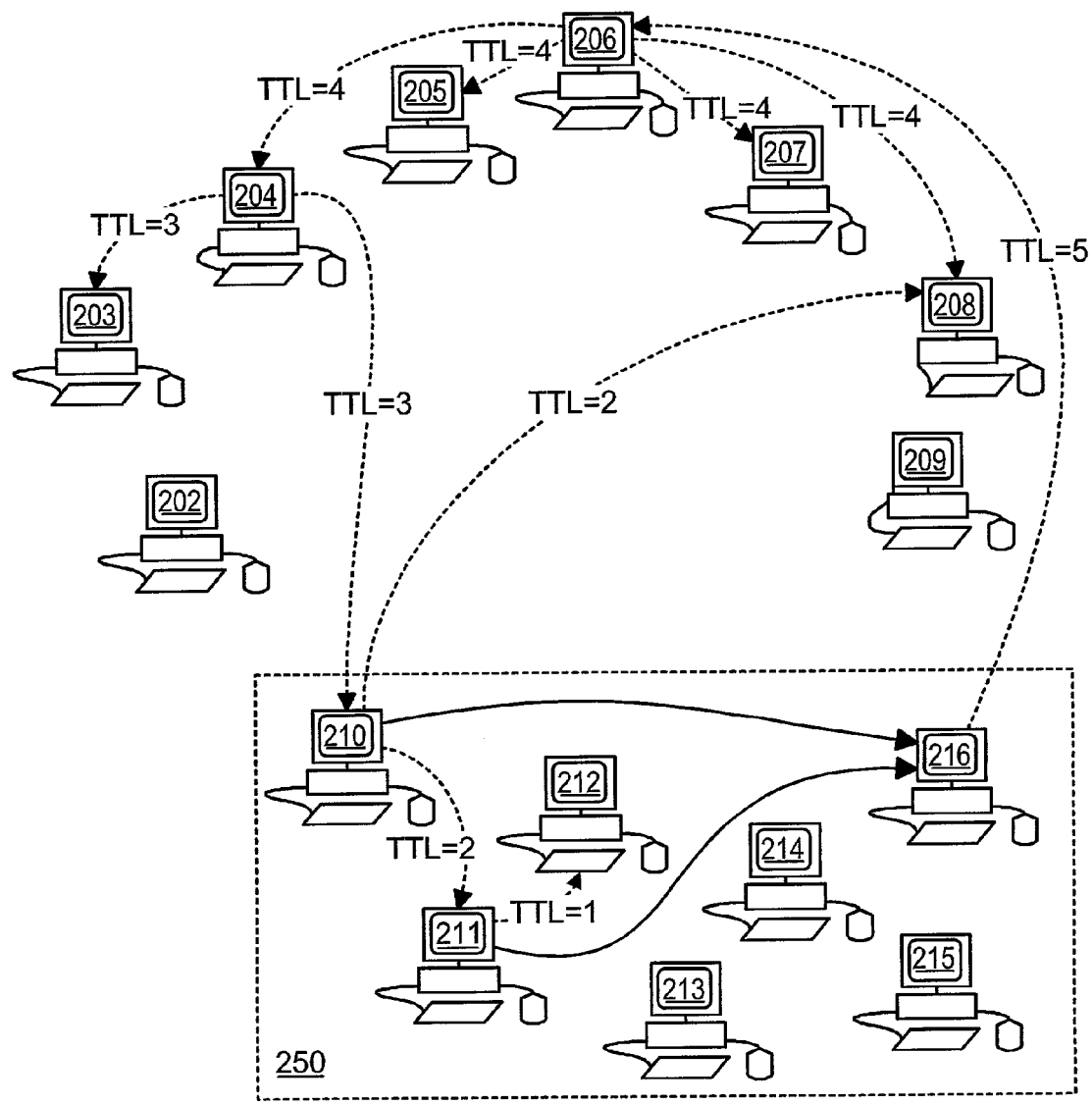
FIG. 5 illustrates an example request message propagating along a path from computer 204.

FIG. 5 illustrates a request message path starting at computer 204. Computer 204 receives the request message (ping) and compares it to its bounded attributes. Since computer 204 is not associated with any bounded attribute of the request message, computer 204 does not send a response message (pong). Computer 204 now reduces the time-to-live indicator to three and prepares to send the request message to its associated peer computers (i.e., computers 203, 206 and 210). Since computer 204 can tell that computer 206 is in its list of peer computers, it can perform an optimization and not propagate the request message back to a previous sender, thus computer 204 only sends the request message on to computer 203 and computer 210. Computer 203 receives the request message (ping) and immediately discards it as it has previously received the same ping from Computer 205 (see FIG. 4). In practice, whether 203 receives a ping from computer 205 or computer 204 first is dependent on the aggregate connection speed between the computer 206/205/203 path and the computer 206/204/203 path. For example it is assumed that a message gets to 203 faster via computer 206/205/203 path than it does via computer 206/204/203 path. Computer 204 now reduces the time-to-live indicator to three and prepares to send the request message to its associated peer computers (i.e., computers 203, 206 and 210). Computer 210 receives the request message (ping) from computer 204 and compares the bounded attribute to its bounded attributes. Since computer 210 matches an attribute in the request message from computer 216 it sends a response message (pong)

to computer 216. Computer 210 now reduces the time-to-live indicator to two and prepares to send the request message to its associated peer computers (i.e., computers 204, 208 and 211). Again ignoring the peer computers which sent the request message (i.e., computer 204) computer 210 sends the request message on to computer 208 and computer 211. Computer 208 receives the request message (ping) from computer 210 and immediately discards it as it has previously received the same ping from computer 206. Computer 211 receives the request message (ping) from computer 210 and compares the bounded attribute to its bounded attributes. Since computer 211 matches an attribute in the request message from computer 216 it sends a response message (pong) to computer 216. Computer 211 now reduces the time-to-live indicator to one and prepares to send the request message to its associated peer computers (i.e., computers 210 and 212). Again ignoring the peer computers which sent the request message (i.e., computer 210) computer 211 sends the request message on to computer 212. Computer 212 receives the request message (ping) from computer 211 and immediately discards it as it has previously received the same ping from computer 202 (see FIG. 4). Although the time-to-live indicator in the request message has not expired, no further request messages (pings) are propagated on this path because all peer computers have discarded the request message (ping) due to duplication.

Figure 6:
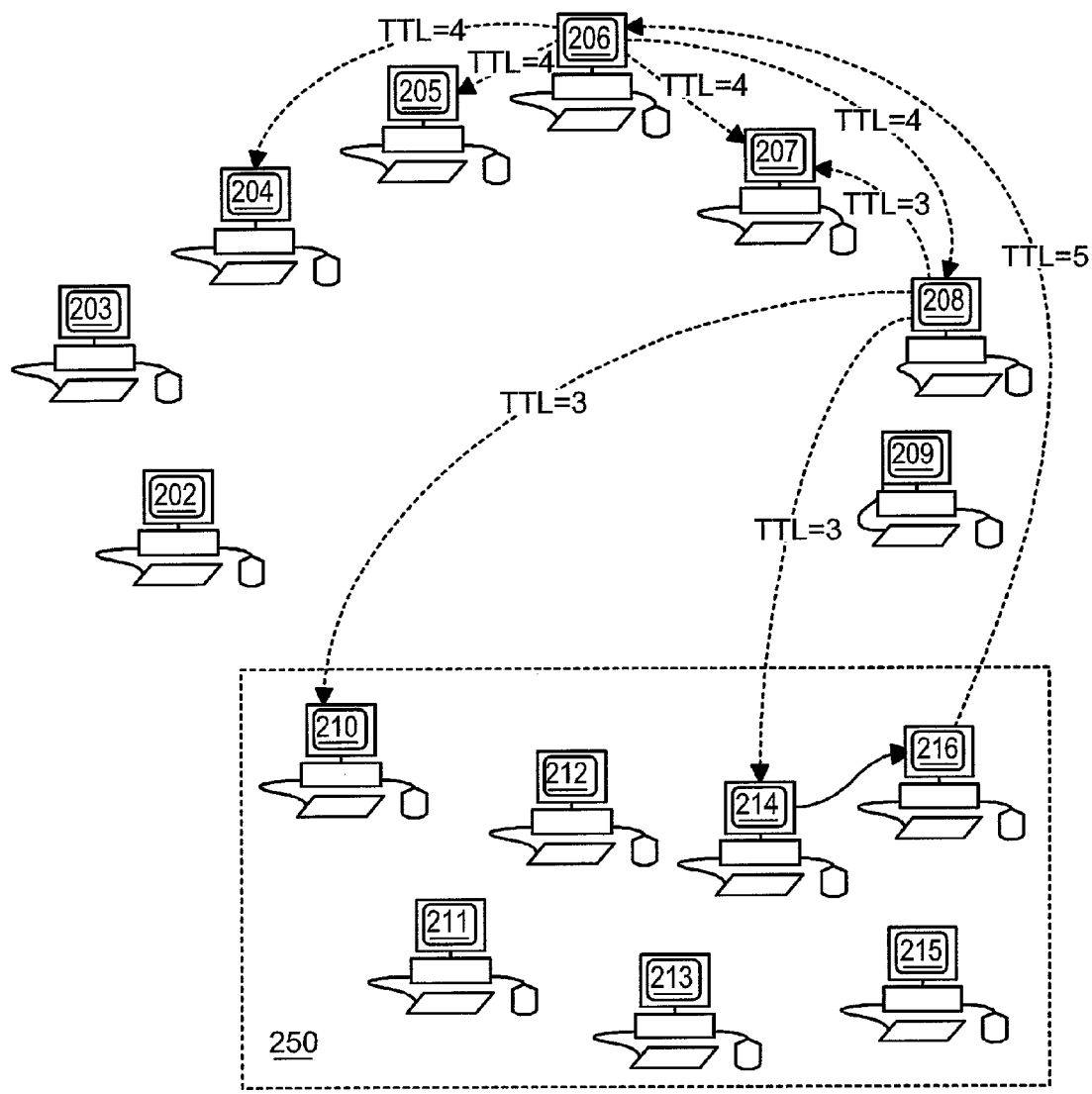
FIG. 6 illustrates an example request message propagating along a path from computer 208.

FIG. 6 illustrates a request message path starting at computer 208. Computer 208 receives the request message (ping) and compares it to its bounded attributes. Since computer 208 is not associated with any bounded attribute of the request message, computer 208 does not send a response message (pong). Computer 208 now reduces the time-to-live indicator to three and prepares to send the request message to its associated peer computers (i.e., computers 206, 207, 210 and 214). Since computer 208 can tell that computer 206 is in its list of peer computers, it can perform an optimization and not propagate the request message back to a previous sender, thus computer 208 only sends the request message on to computers 207, 210 and 214. Computer 210 receives the request message (ping) and immediately discards it as it has previously received the same request message from Computer 204 (see FIG. 5). Computer 207 receives the request message (ping) and immediately discards it as it has previously received the same request message from Computer 206. Computer 214 receives the request message (ping) from computer 208 and compares the bounded attribute to its bounded attributes. Since computer 214 matches an attribute in the request message from computer 216 it sends a response message (pong) to computer 216. Although the time-to-live indicator in the request message has not expired, no further request messages (pings) are propagated on this path because all peer computers have discarded the request message due to duplication.

Figure 7:
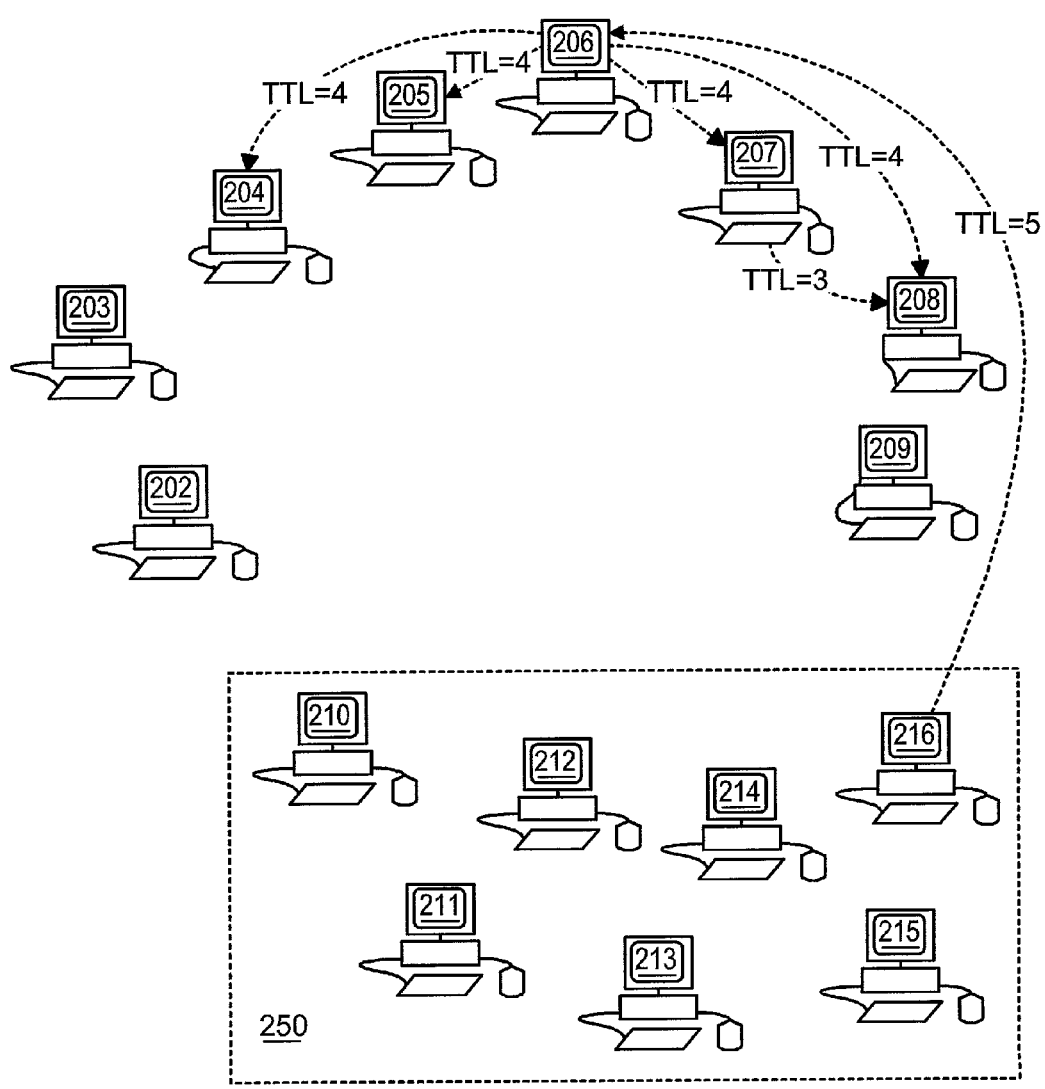
FIG. 7 illustrates an example request message propagating along a path from computer 207.

FIG. 7 illustrates a request message path starting at computer 207. Computer 207 receives the request message (ping) and compares it to its bounded attributes. Since computer 207 is not associated with any bounded attribute of the request message, computer 207 does not send a response message (pong). Computer 207 now reduces the time-to-live indicator to three and prepares to send the request message to its associated peer computers (i.e., computers 206 and 208). Since computer 207 can tell that computer 206 is in its list of peer computers, it can perform an optimization and not propagate the request message back to a previous sender, thus computer 207 only sends the request message on to computer 208. Computer 208 receives the request message (ping) and immediately discards it as it has previously received the same request message from Computer 206. Although the time-to-live indicator in the request message has not expired, no further request messages (pings) are propagated on this path because all peer computers have discarded the request message due to duplication.

Once all paths have been exhausted or all time-to-live indicators have expired, computer 216 will have received response messages from computer 210, computer 211, computer 212, computer 213 and computer 214. Computer 215 did not respond, as it never received a request message due to time-to-live expiration.

In this way requests from computer 216 are processed by computers in the peer-to-peer network 110 which are associated with a common bounded attribute of computer 216, thus allowing for more effective and efficient processing. For example, indexing of electronic documents associated with a specific bounded attribute can be performed on computers associated with that bounded attribute.

Figure 8:
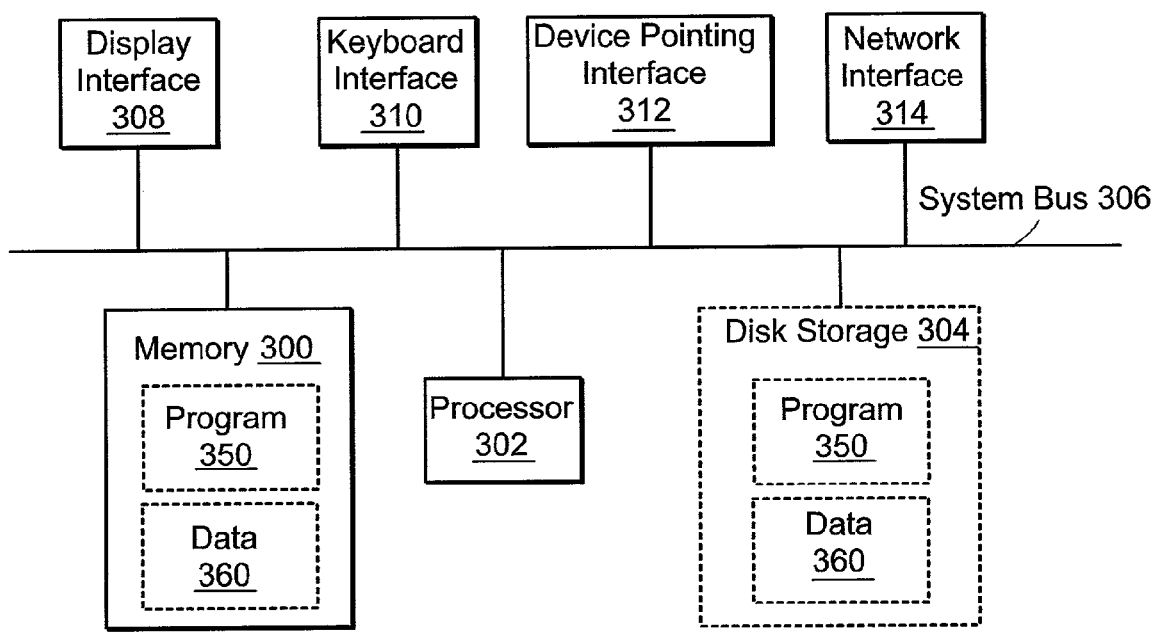
FIG. 8 illustrates the internal architecture of a computer connected to a computer network according to an embodiment of the present invention.

FIG. 8 illustrates the internal architecture of a computer connected to the computer network. Computers 202-216 are connected through network 110. Each computer contains a system bus 306; a bus is a set of hardware lines used for data transfer among the components of a computer system. A bus is essentially a shared channel that connects different parts of the system (e.g., processor, disk-drive controller, memory, and input/output ports) and enables the different parts to transfer information. Attached to system bus 306 is display interface 308, which allows display devices to communicate with other components on system bus 306. Keyboard interface 310 and pointing device interface 312 are also attached to system bus 306 and allow various input devices to communicate with other components on system bus 306. Network interface 314 provides a link to an external network (e.g., network 110) allowing communication among processes running on computers 202-216.

Each computer 202-216 also contains a memory 300 for storing computer software instructions (e.g., program 350) and data structures (e.g., data 360) used to implement an embodiment of the present invention for providing an attribute bounded network of computers. A disk storage device 304 is provided for non-volatile storage on computers 202-216 to store, for example program 350 and data 360. A processor 302 executes instructions and accesses data stored in memory 300, allowing the networked computers 202-216 to provide an attribute bounded network of computers according to an embodiment of the present invention.

Figure 9:
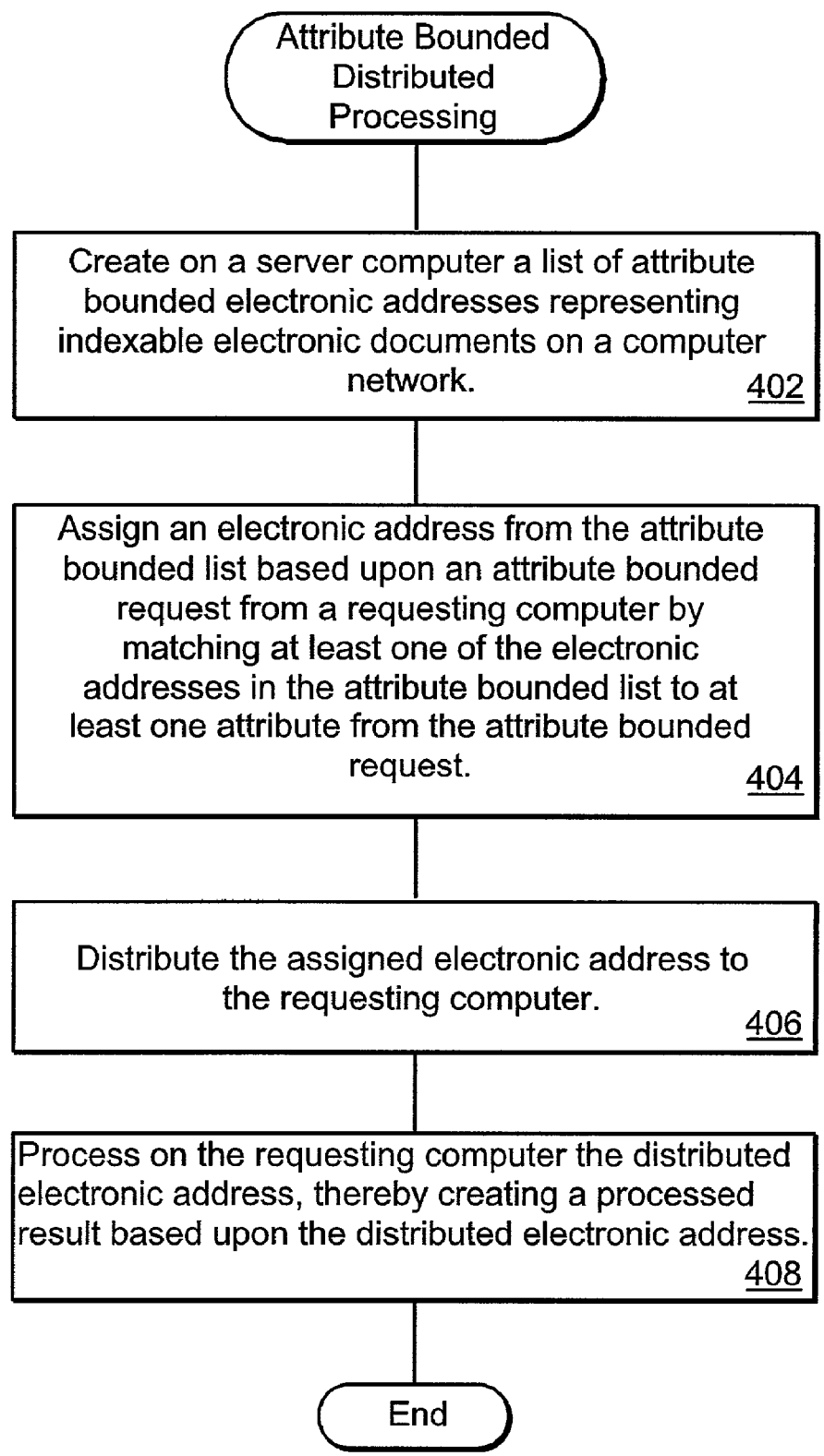
FIG. 9 is a flowchart of attribute bounded distributed processing as provided by an embodiment of the present invention.

FIG. 9 is a flowchart of attribute bounded distributed processing as provided by an embodiment of the present invention. In a network containing electronic documents it is desirable to provide an index to search for specific electronic documents. Since generating such an index is resource intensive, using multiple computers to generate the index can improve both its freshness and depth. In an embodiment of the present invention a list of attribute bounded electronic addresses representing the indexable electronic documents on the computer network is created on a network server computer (Step 402). This list contains addresses for accessing the electronic document and a set of attributes associated with electronic documents (e.g., a geographically bounded region). When a computer within the network requests an indexing assignment from the server, the attributes of the requestor are matched to the attributes of the listed electronic documents such that electronic documents associated with the requestor's attributes are assigned to the requestor (Step 404). The assigned electronic document addresses are then distributed to the requestor's computer (Step 406). In this way requesters perform processing and create results for electronic documents associated with there own attributes (Step 408). The results can be transmitted back to the server for access by other computers on the network. Associating distributed tasks to those requesting computers with similar attributes allows for more targeted processing which results in more effective and efficient processing results.

Figure 10:
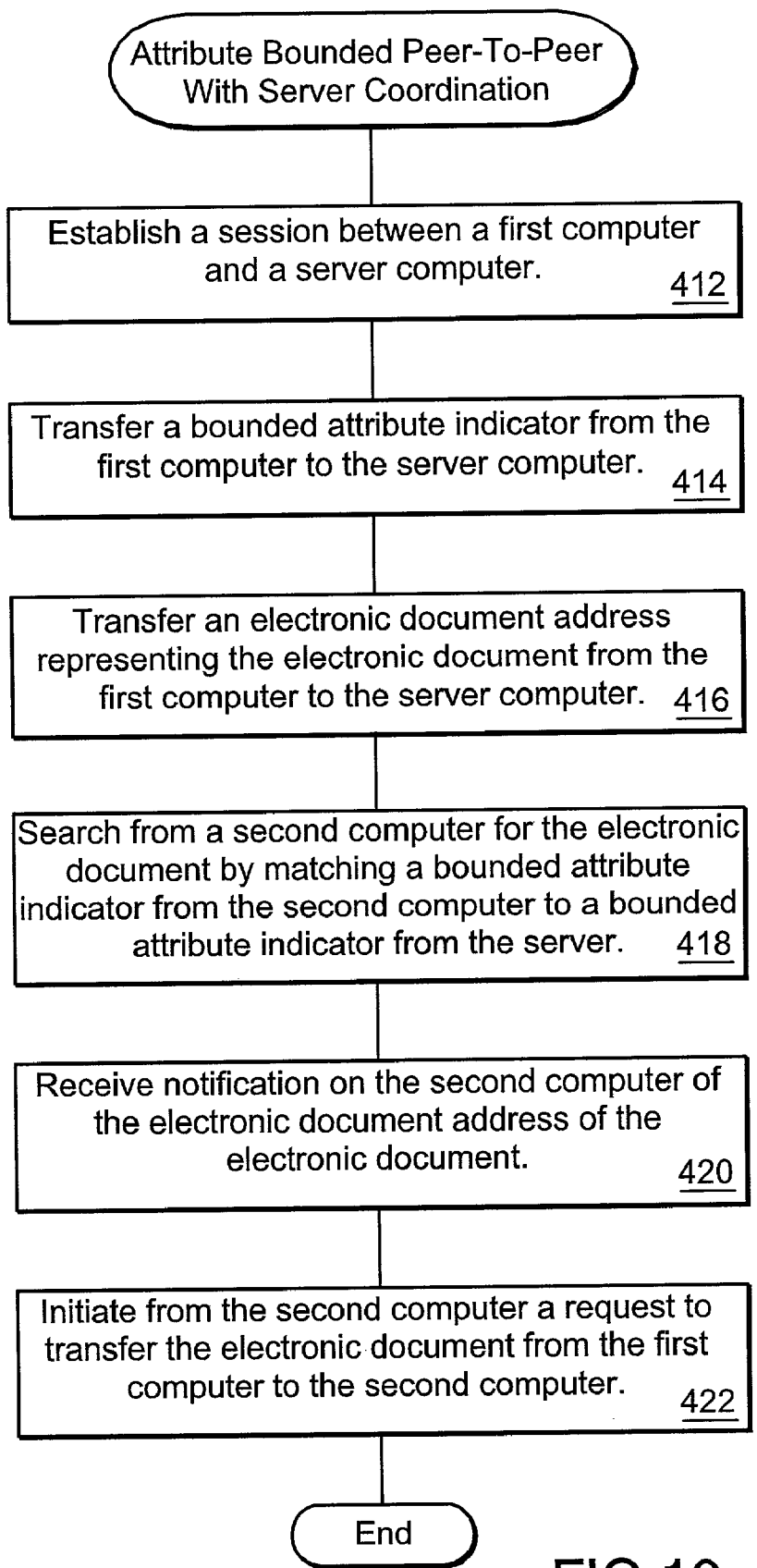
FIG. 10 is a flowchart of attribute bounded peer-to-peer processing with server coordination as provided by an embodiment of the present invention.

FIG. 10 is a flowchart of attribute bounded peer-to-peer processing with server coordination as provided by an embodiment of the present invention. In a peer-to-peer network, effective processing for file sharing is important, as network messages become more costly as they propagate in search of a desired file. In an embodiment of the present invention a first computer establishes a session with a server computer (Step 412). The first computer transfers a bounded attribute indicator to the server computer (Step 414). The bounded attribute indicator identifies attributes of the first computer (e.g., a geographically bounded region associated with the first computer). The first computer also transfers an electronic document address representing a desired electronic document to the server computer (Step 416). The electronic document address can be a direct link to the document on a specific type network (e.g., a URL on the Internet), other indications that identify the electronic document (e.g., a name, number or description of the electronic document) can also be sent to the server computer.

A second computer connected to the network searches for the electronic document on the server computer by matching a bounded attribute indicator from the second computer to the bounded attribute indicators of the transferred electronic document addresses (Step 418). The second computer receives notification from the server of electronic document addresses matching the attributes (Step 420). The second computer then initiates a request to transfer the electronic document directly from the first computer to the second computer (Step 422). In this way a computer on a peer-to-peer network can obtain addresses of electronic documents hosted on other peer-to-peer network computers that are associated with similar attributes. Computers with similar associated attributes are better equipped to provide more accurate results from a search for electronic documents.

Figure 11:
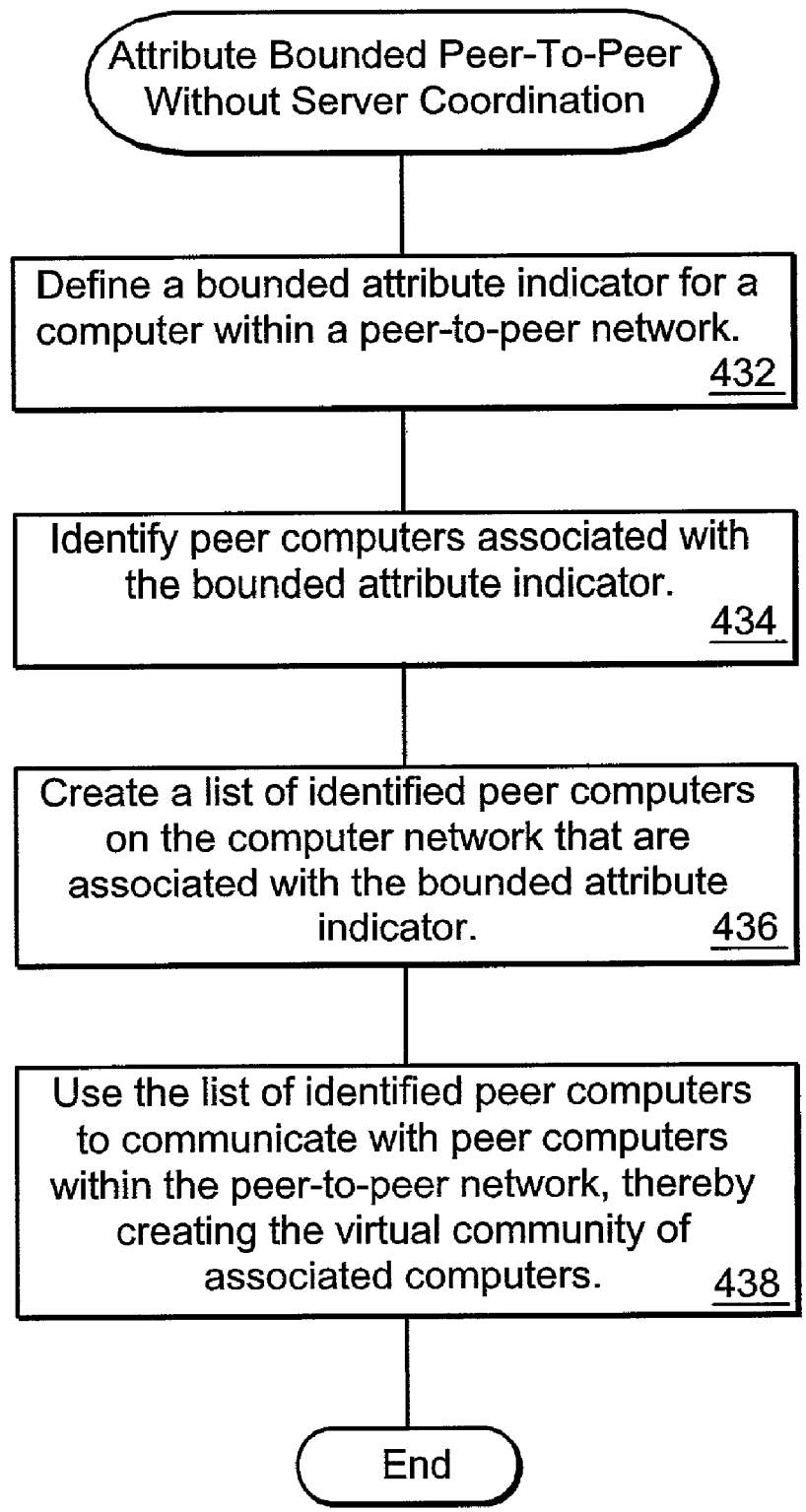
FIG. 11 is a flowchart of attribute bounded peer-to-peer processing without server coordination as provided by an embodiment of the present invention.

FIG. 11 is a flowchart of attribute bounded peer-to-peer processing without server coordination as provided by an embodiment of the present invention. Cost effective message propagation in a peer-to-peer network is important for providing effective and efficient processing services. Communicating with other computers that are associated with similar attributes avoids sending messages along non-productive paths. In an embodiment of the present invention a virtual community is created within a peer-to-peer computer network by identifying peer computer connections based upon a bounded attribute indicator. A bounded attribute indicator is defined for a computer on the network (Step 432). This indicator associates certain attributes with the computer, other peer computers are also associated with certain bounded attribute indicators. Peer computers associated with the same, or similar, bounded attributes can then be identified (Step 434). A list of identified peer computers on the computer network that are associated with the bounded attribute indicator is then created (Step 436). The list of identified peer computers can be used to communicate with associated peer computers within the peer-to-peer network, thereby creating a virtual community (Step 438).

Searching Techniques in an Attribute Bounded Network

Searching for content stored on nodes defined in an attribute bounded network is enhanced using techniques to 1) modify search terms to increase the relevancy of the search results as well as 2) to alter searches to eliminate very popular results.

The current state of search technology is increasing inadequate for locating information given the amount of information that is available. A simple search query such as, for example, "shoes" on an Internet search engine may produce hundreds if not thousands of matches. Whether a search is performed for Internet web sites or for a particular document in a database, the amount of available information in electronic form is growing exponentially. This problem is further compounded because Internet search engines classify a match by Universal Resource Locator (URL) or web page, and not by website. Having to deal with an overwhelming number of query matches is a common problem. Two of the solutions are: 1) ranking the results by relevance, and 2) adding additional keywords.

By using a ranking system, an overwhelming list of matches is effectively reduced by only reviewing the top few matches. To determine the relevancy or ranking of a page of a match, most or all ranking systems use two criteria: occurrence of keywords in the content of the page (such as common text, headlines and words in the meta tags), and popularity of links to and from the page. Unfortunately, these algorithms are well known to website operators whose income is dependent on the amount traffic to their web sites. A common method for a match to be ranked in the top twenty is to just replicate the meta tag keywords until the necessary match relevancy is achieved. These algorithms are also easily spoofed by changing the content of the page to use certain misleading words in the heading. It is a constant challenge for search engines to increase the relevancy of matches by mitigating the effect of spoofing without penalizing legitimate content.

Another solution is to use additional keywords (herein referred to as "positive keywords") to limit the matches to a more manageable number. For example, a query for "shoes" becomes a query for "running shoes". This method is referred to in this document as APK (Additional Positive Keywords). Most search engines insert a Boolean "AND" between each search term in the query, which mean that all of these keywords must be present on the page to produce a "match".

With each additional keyword entered, the set of matches becomes smaller, and more usable. However, a potential problem is created in that pages may be eliminated that do not match all the keywords, but may be very valid matches for a searcher. There are many ways that a valid page can be eliminated such as, for example, when the query uses "sneaker", "athletic footwear" or "Nike Air" instead of "running shoes"; "men" instead of "men's"; and the abbreviation "T.O." instead of Toronto". The risk of eliminating valid matches increases with each additional keyword used. It is therefore an aspect of an object of the present invention for providing a method and system of increasing relevancy of search matches.

As previously noted, the fundamental problem is how to reduce an overwhelming number of matches to a more manageable number while maintaining or increasing relevancy. In reviewing typical query matches, it was noted that the majority of matches were irrelevant and which contained keywords that should not be present in relevant matches. By eliminating matches based on the presence of certain keywords (herein referred to as "Anti-Keywords" or "negative keywords"), the relevance of matches could be increased with a lower chance of eliminating relevant matches than the APK method.

For example, in a query for "shoe and stores", the following matches could be eliminated: books on shoes, marathon tips, reviews on shoes, shoe horns, devices for dealing playing cards, university articles on shoes, and adult entertainment night clubs that use the keyword "shoe" to attract web traffic (spoofing), but which would also have the keyword "sex". A set of Anti-Keywords for this query might be "books or marathon or reviews or horns or cards or sex". The APK method has difficulty eliminating these matches, because these non-relevant matches have similar positive keywords to relevant matches. By using elimination based on what should not be present in relevant matches, the problems of the APK method can be reduced as negative keywords can eliminate non-relevant matches while not eliminating potentially relevant matches. Anti-Keywords are particularly effective against a spoofing tactic of including large numbers of keywords as the chances of having Anti-Keywords are also increased. Another factor to increase the number of relevant matches is the inclusion of synonyms of positive keywords and, in the case of keywords like "shoes", the addition of brand names for shoes.

Figure 12:
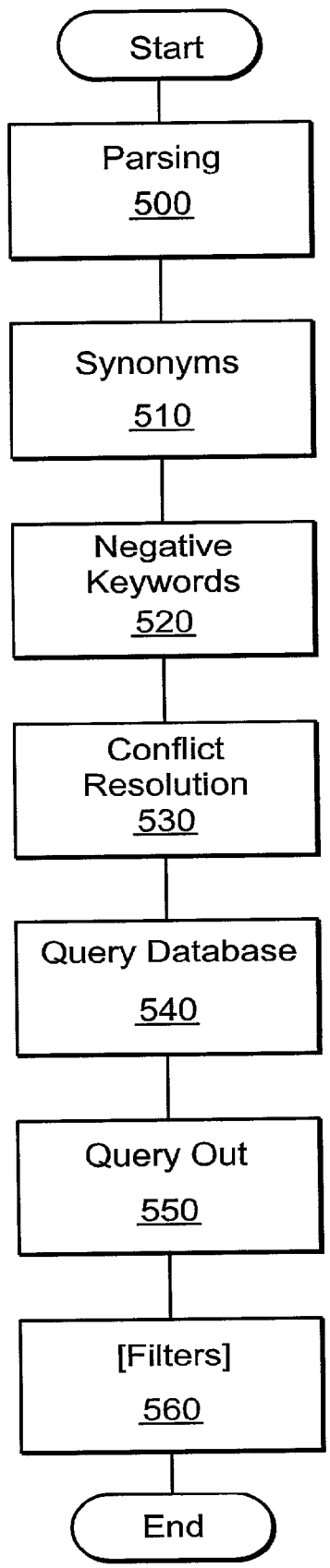
FIG. 12 is a flowchart of a method of increasing relevancy of search matches, including alternate steps, in accordance with one embodiment of the invention.

Referring to FIG. 12, there is shown a flowchart of a method to increase the relevancy of search matches. The method comprises parsing a query for keywords 500, synonym modifiers 510, look-up additional negative keywords from table for each positive keyword 520, eliminate negative keywords which conflict with positive keywords 530, and perform query on database with revised positive and negative keywords 540, and query out search matches 550.

Typically, a query statement for a search comprises both positive and negative keywords. In 500, the query is parsed to determine each keyword. In 510, the search is expanded by creating a "Boolean OR" query statement using common synonyms and related brand names. Databases of synonyms and related brand names for common goods and services are publicly available or can be constructed. For example, the term "running shoes" would have synonyms of "sneakers", "athletic shoes", "runners", "tennis shoes", and the related brands of Nike, Adidas and Brooks. A query of "running shoes" becomes "running shoes OR sneakers OR athletic shoes OR runner OR tennis shoes OR Nike OR Adidas OR Brooks".

In 520, negative keywords for each positive keyword of a query statement are retrieve from a negative database of negative keywords and their associated positive keywords and added to the query statement, where negative keywords have been assigned to the particular positive keywords. The negative database can be easily constructed such as, for example, by reviewing search matches and formulating holistic negative keywords accordingly. For example, negative keywords for "shoe" include "sex" and "university". On the Internet, sex and sex related sites represent a large number of web sites, and many of these use advanced spoofing techniques to attract visitors including using the word "shoe" on their site. The logic is that when a shoe buyer clicks on this, they will be lured by provocative images of naked men and women. However, these sites also clearly want to attract the person who enters "sex" into the search engine, so the word "sex" is prominently displayed on their web site. Such web sites can be easily eliminated by using "sex" as a negative keyword. University is a negative keyword for shoes, because there is a lot of academic material published on a variety of subjects and these sites make up a large portion of the matches. The fact that they are an educational institution practically eliminates them from a query for shoe stores. The keyword "shoes" returns 2.7 million matches on Google (a particular search engine www.google.com) on its own. By using "university" as a negative keyword, Google returns 1.7 million matches. The difference of over a million pages represents 37% of the matches. Chat rooms, directories of multiple products, and dual meaning keywords (shoe-running, horse, gambling, fly) can thus also be eliminated.

Further, keywords are not just single words, but include phrases such as, for example, the phrase "tennis elbow" is not the same as "tennis balls". The negative database is checked for negative keywords associated with the phrase. However, the phrase is also is broken into its individual words, in this case, "tennis" and "balls", so that negative keywords are not retrieved which match the individual words. In 530, the positive and negative keywords of the query statement are compared to ensure that none of the negative keywords are the same as any of the positive keywords. If any of the negative keywords match any of the positive keywords then it is eliminated unless such negative keyword is a part of the original query statement.

In 540, the query statement as revised is performed on a database of web pages, and a set matches are returned 550. In an alternate embodiment the set of matches of 550 is further filtered 560 to eliminate irrelevant matches. An exemplary filter is a geographic filter for searches having a geographic component such as a search for local products or services, and the location of the user is known or can be determined, a reasonable and adjustable search zone is then settable. All of the matches that are outside the search zone are eliminated from the set of matches. This is accomplished by cross referencing the matches against an index that contains the geographic locations of the physical entities represented by the matches and performing a place name match or proximity calculation.

In a server side embodiment of the present invention, after a user submits a query to the server, the server modifies it by applying the appropriate positive and negative keywords, and furthermore filters are applied to search matches before the set of matches is returned. Under a server side implementation, no special software is required by searchers, and they may not even be aware that search enhancements are being used except from the quality of the matches.

In a client side embodiment of the present invention, it is assumed that the database of web pages or search engine is not enhanced. A client computer has a program installed, (a browser plug-in), that intercepts a users' keyword queries at any popular search engine, and changes the query statement accordingly. This modified query statement is then submitted to the search engine. Synonym modifiers are used to modify the query before it is sent, and filters are applied to the set of matches returned from the search engine. Alternatively, the query is run in parallel so that the user receives the regular matches from the search engine, but also receives the enhanced set of matches in a separate window. This is accomplished by submitting the modified query statement as well to the search engine.

In a further alternative embodiment, a client computer has a set of matches (URLs) that need to be reduced by the use of anti-keywords. The client computer, being part of a P2P (peer to peer) network, sends a request to a peer on the network to perform a query on a search engine asking for the existence of a keyword in a particular site. Some search engines have syntax to allow that function. Matches for negative keywords are thus removed from the set of original matches. By distributing the queries to individual machines on a P2P network, the anti-keyword operations is performed in parallel. Thus for an original set of 1000 URLS this generates 1000 P2P requests. In a further alternative, a single machine issues all of the anti-keyword. Thus for an original set of 1000 URLs this generates 1000 direct queries to a search engine.

There are 3 different novel methods outlined within which all speak to a single concept, idea, method, practice, that of using popularity to include, exclude, or influence a record. Specifically the preferred method would refer to the Internet, and web pages. Thus rephrased, using the popularity of a URL to determine whether a URL should be included or excluded in a set of search results, and if included should the order of the URL's provided in a set of search results be modified and redisplayed in a different order based on this popularity.

Popularity could be determined by page views, hits to a web page or web site, unique visitors, unique sessions, numbers of reviews, amount of data downloaded, the number of search engines the url is already listed in, or other methods that a person skilled in the art may use. The term URL and website is used somewhat intermittently with a website meaning a collection of URL's under one primary domain, and a URL referring to a single URL, whether a primary domain or sub page located under a primary domain. All the methods can be implemented at a web page or URL level, without substantially changing the definition. Popularity of a site or URL by some means needs to be known or determined.

All these methods, except option 3b require the popularity of a website or URL to be known and this information may be stored in a database. Search results refers to a set of URLS returned from a internal or third party search engine (database) of indexed records based on a user query that could either be entered by a user, or provided by another computer program.

Method 1 (a) involves eliminating a set of matches from a search result based on a adjustable threshold, where the threshold refers to a certain amount, type or percentage of popular sites. Thus a user could specify a threshold of 20% which would eliminate the top 20% most popular sites from the set of search results so that if 100 matches were in the original set of results, then only 80 matches would remain.

Method 1 (b) is the same as method 1 a and the likely preferred embodiment, but where the threshold refers to the popularity in reference to the entire Internet, so if a user specified the top 20% of popular web sites to be removed, and the Internet was determined to have 5,000,000 active sites, the top 1,000,000 sites would be excluded. If the original search results were 100, this could remove all the results or none of them, depending on the popularity of the 100 urls in the original search and whether they were part of the top 1,000,000.

In both Method 1a, and 1b, the popularity could be restricted to an extension or classification system, so a user could remove the top 60% of NET, or 100% of any XXX classified sites, or the top 20% excluding XXX sites, or any combination thereof.

It is recognized that excluding domains based on their extension alone is not novel, but combining this with percentages is, especially when tied to popularity although it could also be another metric. It is mentioned to show the novelty of the combination.

Method 2 involves not eliminating any results from the search query, but rather changing the order of the search results by placing the most popular sites, as determined by the external database, at the bottom of the list and placing less popular sites at the top of the list. This would result in a complete re-ordering of the search results, and since search results are often only displayed 10 or 20 results at a time, the URLS listed on the first page or screen would likely be very different from the original search results. This differs substantially from Method 1, in that Method 1 does not affect the relevancy of the order of the results, as determined by the original search engine, but simple removes popular results reducing the size of the list but not the order of relevancy assigned by the initial search engine, whereas this method actually changes the order and thus the relevancy can be affected. This method would likely be used with filters as described in method 1 to remove popular sites of a certain type.

Method 3 may appear like a very different invention but in fact, is very similar, if you consider popularity as being defined as relating to which search engines you appear in. Method 3 involves a set of indexed files (independent of the source of the search results) that are obtained by spidering the urls of the Internet, ordered by starting at the least popular URL, and moving upwards. This process is accomplished by using a complete list of the Internet domains, which can be obtained from the registrar databases or purchased from various sources. By loading each URL and first determining if the url is live or not, a list of active urls is created.

Method 3a works from this list of active websites, if the popularity of these urls is known, the least popular site would be indexed entirely and then the second least popular etc. Thus if resources were not limited, the entire Internet would be indexed. Since this may take sometime to index the entire web, a decision may be made to stop at a certain point (for example: urls in the bottom 20% of popularity) and repeat the process to maintain freshness of data.

Method 3b (this method does not require the popularity database) has the URLs submitted one by one starting at the beginning of the active list, until done. With each URL, prior to indexing, the URL is submitted to a set of known search engines (likely the most popular ones) and the inclusion of the URL in each of the these search engines is recorded. Based on a certain threshold, or set of criteria, this would determine if the URL or website is indexed. Certainly if none of the other search engines had indexed the site, then the URL would be indexed for sure. However, even if certain or all of the search engines had previously indexed the site, then factors such as freshness, prevalence of search engine, and method of indexing may play a factor in determining if the URL is indexed. Thus in this method, after going through all the domains, the results should overlap those obtained in Method 3a but not entirely, as some sites may be unpopular but highly indexed, thus likely including them in method 3a's list but not in Method 3b's list.

When a user types in a query either directly or as a link from another search engine, or from a program that captures a search result, the search engine the user came from and the query is recorded, or if this is not known, examine any cookies or use other methods to determine the users most used or preferred search engine. From this answer, or from user input, a set of search engines and a query is determined.

The set of indexed files are then referenced using the original query, with the search results modified by removing any matches that existed in the list of search engines selected or determined above. Thus if a user did a search on one search engine and immediately did a search on the indexed files, the results from the indexed files would contain completely different or new results from the search engine they just came from.

All 3 methods or parts thereof could be used in combination or offered as choices, without affecting the novelty or functionality of the results. The method allows users to remove results of a list based on the level of popularity that can be defined in many ways. The only services which are remotely similar exclude by language, or extension, or country (extension) and some sites remove identical matches or matches for the same site, but none offer percentage removal or are linked to popularity. Our methods allows for removal of any or all records from a list based on popularity of each record. Our methods allow a variable threshold on multiple variables, allowing a user to remove the top x % where x is adjustable from 0 to 100%. Percentages can apply to the entire list or a partial list. Our method allows one to change the order of the set of results based on popularity or possibly any other criteria, thus (in the case of popularity) showing the most obscure results first.

These methods allow you to remove results from a list or not display results if the results are in another search engine already, and allow the user to select which search engine. The concept and method are very novel in that they are designed and deliver the functionality of allowing obscure less popular sites to be found using current search methods with our enhancement. While all other search engines use various methods to determine which set of results to return, our method specifically uses methods to eliminate further sites in such a way that a very different set of results is obtained that using any other method. For users who are looking for less popular sites which are often local sites, independent merchants, obscure sites etc, this invention provides huge benefits.

There are already methods to find popular web sites, and those firms with lots of money can easily spend the money to build a high traffic site, buying advertising, or even pay to be ranked high on a set of search results. A program which may be a search engine or may be a meta search engine which combines data from other search engines, exists and supports queried input from a user, as a typical search engine would. When the user enters a query consisting of keywords, the search engine returns a set of results. These results are based on matching the query's keyword with the URL's (web pages) indexed by the search engine, and these results are displayed to the user often in groups of 10 to 20 urls at a time, with a button to continue viewing the list. Each search engine employs various methods for determining how one page is ranked. Methods include number of times a keyword appears, number of links on a page, number of words, number of time the keyword appears in graphics, inclusion of keywords in metatags. These methods are known to web designers, and there are programs that modify the content of a page to allow it to be ranked higher than it otherwise would. In reality, the small web sites that are not well versed in these techniques often rank much lower than sites that are far less relevant, simply because these smaller web sites lack the skills to modify their web page. As well, larger firms have much larger design budgets and can afford to pay for these ranking techniques to be used, as well as having much larger advertising budgets so that the URL's of these larger sites become far more popular in search engines, even when not relevant.

There is a large frustration with search engines not providing accurate results for the user, and partly this is the cause of web sites that appear high on search queries when in reality have very little to do with the topic or query desired. Popularity of a web site or url is stored in a database and can be determined by various methods, including buying this data.

A novel result of using a third party database when ranking the sites in reverse popularity is that the results are very difficult to spoof. If a developer wants to rank very high in the obfusious search engine, they would create a new domain, which by nature of being very new, would have little traffic. This would rank them very near the top. Any attempts to improve the traffic to the site that were successful would result in the third party database seeing this increased traffic and thus the web site would rate lower the next time viewed in the obfusious database. This sites which make little or no effort to be found will be found near the top of searches, while sites that spend a lot of effort to promote traffic to their web site will not be found near the top of searches.

The reasons for this benefit are clear when you examine the nature of the Internet. There are many businesses that build their revenue model on people visiting their web site (traffic or hits or page views). This firms spend money to attract people to their web sites using various methods. Some of these methods result in legitimate traffic, while other methods mislead the customer into visiting, or encourage people to visit who have no desire to visit that site. This is referred to as spoofing, and occurs both intentionally and unintentionally. When a user types in a keyword with a geographic component to it, such as "Chicago Music store", or "Where in Chicago are the Music stores", the search engines end up displaying many matches from hundreds of online music stores because Cleveland may be used as a keyword, or because they sell music of the band Chicago, or the single "The night Chicago died". There are many similar examples. Operators of adult entertainment sites use keywords to obtain high listings. Knowing that Chicago and Music are both popular keywords, they include these in their pages, so a XXX adult site shows up ahead of a local music store online. A local music store may have gotten a free web page, or may have paid for one, but has a small marketing budget and does not have all the sophisticated tools to improve its ranking, nor may they want to. Using this novel approach of clipping the popularity, or displaying the sites in order of popularity, whenever someone types "Chicago Music Store" or "Cleveland book store" they receive the local sites at the top of the list since these web pages are smaller. National chains that have large websites would still show up on the list, but lower down, and users likely know the web address for Chapters, or Barnes and Noble already, or would certainly recognize it if they saw it on the page. The bottom line is that if users click on the first sites at the top of the list, they are very likely to find accurate sites to their query. If however, an adult site, or other vendor is able to appear on the top of the list for queries that are not relevant, they likely will appear on many queries resulting increased traffic which will either remove them from future searches, or rank them much lower down the list of results.

This obfusious search engine method also provides that the most obscure results become the most accurate. The less popular a site is the faster it is found for people looking for that site. A site that is not popular has few traffic visitors because it has a highly focused audience. For example, a store selling "British religious antique books" would have a smaller number of users than a "Barnes and Noble". If someone was looking for this book store online, and typed "British religious antique books" they may never find the above mentioned site because of all the other sites that selling books, art, religious supplies, etc. that happen to show up in the search results because of their keywords. If "Barnes and Noble" was one of these listings, and this was considered a high traffic site. Removing this listing from the returned results would move the above store one result closer to the top. Removing other popular results would continue to move it closer to the top. This effect is very well suited to local commerce where current searches tend to larger more popular national sites and not the smaller independent sites. A search on Pizza is more likely to show Pizza Hut than small independent Pizza stores. This method is not suited to every search, and does not guarantee that results that the user may want to see do not get removed. It does guarantee that a different set of results will be seen, which can be equally valid based on the query, and also may work very well for certain types of searches. As a secondary resource for any search, or a primary resource for geographic, local or other specialized searches, the obfusious methods provide an improved functionality and different results. A person skilled in the art could implement the above ideas using database commands, and sort routines.

Community Bulletins Defined Within An Attribute Bounded Network

In an embodiment of the present invention information transfer is provided and in particular information related to a community bulletin for information including advertisements is provided.

There are several ways for a company or a person to advertise or to serve notices. Some of the more popular vehicles include newspaper, radio, TV, and billboards. The Internet also has become a vehicle for advertising, but is still ineffective due to its inability to target users based on geography.

In the physical world, when one places an advertisement in a newspaper, a circulation of readers is known, as well as the addresses of the subscribers, if not individually, certainly by region. Newspapers tend to be centralized around a local geographic region, with the exception of some national newspapers such as the Wall Street Journal, or USA Today. For example, a newspaper, the Kitchener-Waterloo Record, has the majority of its readers living in the Kitchener-Waterloo area. A small business that operates only in the Kitchener-Waterloo area and services the local community would likely not advertise in a national paper as the majority of the readers would not be potential customers.

Radio and TV are also localized. Radio stations broadcast radio waves using a broadcast tower has a fixed broadcast range. Some radio stations transmit further than others do. Listeners must be within the range of the broadcast tower to receive the radio signals. As such the majority of listeners tend to be local to the region where the broadcast tower is located.

In respect of TV, there are many local stations, often all affiliated with larger national networks. When the network runs a commercial, the local TV station typically blocks the signal and runs a commercial for a local business. In this way a local business can appear to be advertising on a national station when in fact only the viewers receiving the feed from the local TV station (cable station) receive the ad. Billboards are also regional in that you cannot see the ad unless you are physical near the sign such as a car driving along a street.

The reason that regionalized advertising exists is because each region has unique businesses and unique messages for their region. Even companies that have locations in every major city or country need localized advertising to reflect the different cultural atmosphere, or slight modifications in product offerings, pricing, or other differences. On the Internet, there are several ways to advertise. The most common method is to display an advertisement as a fixed or animated banner that is displayed to a user when they visit a web site. This banner can be clicked on in which case the user is linked to another web site, usually relating to the ad that they clicked. This has several flaws in that it is difficult to determine the active location of the person who is viewing the ad. If you are a local pizza store in Toronto, you do not want people in Chicago seeing your ad, or certainly do not want to pay for those people to see your ad.

In the case of large portals where traffic is from all over the world, the advertiser is advertising to the world, so less than one percent would even be remotely located near Toronto. This makes banner advertising ineffective for small businesses that want to target a local audience, and commands very low advertising rates.

To counter this problem, many web sites insert cookies into the browser or analyze the data packet to perform a reverse DNS or reverse IP lookup. The objective of both these methods is to determine the address of the user. Based on this address you can then serve up an advertisement for a local business. If someone lives in Toronto and goes to a large portal web site, an ad for a Toronto business is presented, whereas another person who lives in Chicago visiting the same web site would see different ads. In fact the cookies go beyond geographic location, and can track sex, income, sites visited, buying preferences, and other indicia. With such information, when someone visits a web site that is male, high income, and single, they may be targeted with ads for expensive sports cars. From past research, that person is more likely to buy a sports car, than an unemployed male who might be served up an ad for a job web site.

There are several drawbacks to these methods including improper results from a reverse DNS lookup, where a user appears to be from Maryland because they connect through AOL, or appear to be from Montreal because they use the Freedom privacy plug in browser. As well, the cookies can be easily erased making it virtually impossible to determine the location of the user. Also, many users are offended by being tracked by cookies.

With the Internet, there are major concerns about privacy. A number of jurisdictions also have laws about handling and use of personal information. The concerns of users and of legal obligations must be taken into account. The above methods have not been designed to deal with privacy issues. Another form of advertising is push advertising, where a user has a product on their desktop, which could display sport scores, stock quotes, weather, or all of these. When the viewer uses this product such as pull down a menu, or watching a ticker across the top of the screen, they may be served an ad. These products must collect personal information in order to serve up ads of interest. The problem is that often the user may not want to see these ads, and resent their information provided for information purposes being used to serve them ads. For example, someone may indicate they own stocks in several companies, in order to see a ticker of stocks sent to them daily, and then find out that they are seeing ads for online brokerage houses.

Another challenge that exists in the Internet advertising market is deciding when to serve an ad. When someone is reading a newspaper they see ads, when someone watches a TV show there are commercials. In both cases, the ads are tolerated and accepted because they can be ignored. Likewise when we are driving in the car, and listening to the radio, we hear ads during the airplay. However, with the Internet they are several ways to serve ads that are not obvious, and the timing is also important. An ad that is served to one person at a particular time may be offensive, while to another person it may be useful. It is not determined what styles bothers which people, except that the ability to control the distribution of ads is critical to its success.

It is recognized that when someone is seeking information then a topical ad is likely far more acceptable. For example, if someone goes to a website looking for Guelph restaurants, they are happy to see banner ads for Guelph restaurants. However, if a Toronto restaurant banner were displayed, they would be far less happy if not annoyed. In the same way that the Yellow pages places ads for businesses near the phone number listings since a person actually wants to see the ad for a business when they are looking up a phone number, as they can gleam additional information from this ad. In the web world, this is equally true. However, in the yellow pages, you do not see ads for businesses placed randomly. They are placed within or near to the category headings.

In the Internet world, it is also a truism that if the information is not conveyed within a few seconds then it may never be conveyed. There is also too much information available on the Internet to be easily conveyed. The current means of conveying information in text form and by banners or icons are inefficient methods of conveying information in bulk. If a picture is worth a thousand words, then there is a need for better graphical, instead of textual, methods of displaying of information. For the purposes of this document; ads, advertising and advertisements include, for example, ads, advertisements, advertising, coupons, legal notices, notices, classifies, personal ads, and informational notices in general.

For the purposes of this document; businesses include, for example, businesses, retail operations, government offices, law offices, manufacturing operations, police stations, and any entity which needs to provide information to others.

According to an aspect of the invention, there is provided a method for displaying advertising on a local basis which can target local users in an environment that is conducive to advertisement acceptance, relating to privacy, timeliness, and geographic distance. A consumer has four major modifiers that affect the effectiveness of advertisements that are not related to the ad's content, design, style, and the like. The modifiers are (1) serving advertisements only when the users are interested in such advertisements, (2) serving advertisements for locations that are within the users' traveling distance, (3) serving advertisements that contain useful information to the users, and (4) assuring the users of privacy, such as, without being subsequently pestered by further advertisements. According to another aspect of the invention, there is provided a method for addressing these modifiers in a delivery mechanism that is customizable to each of the users.

According to another aspect of the invention, there is provided a client-side application, such as, a browser plug in, or a stand-alone application, that is connectable to the Internet. The client-side application having the ability to display a map of a region and to display various advertisements around this map, or as icons on the map to reflect advertisements being available coded by at least one of color, size, and graphic. The client-side application also has window boxes for display of messages and information.

According to an embodiment of the present invention, there is provided a server-side application for connecting with businesses and receiving their particulars and their advertisements.

Figure 13:
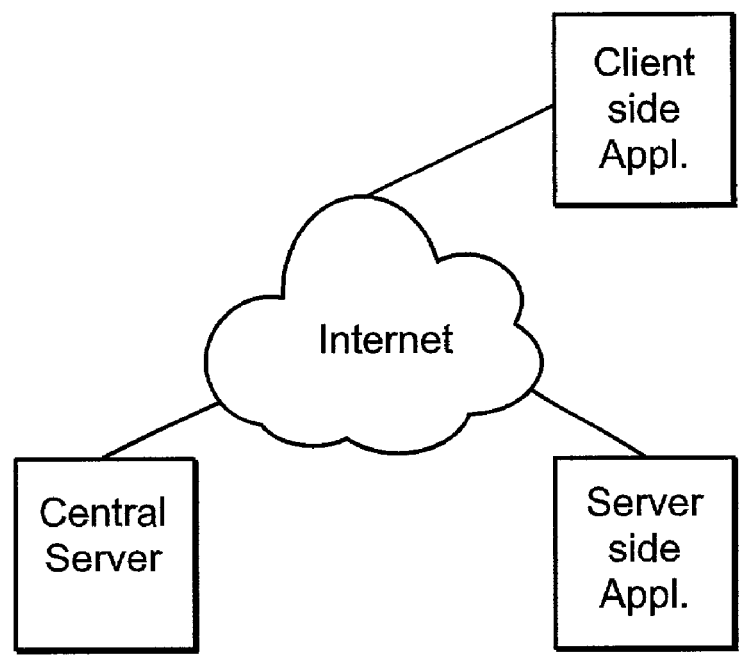
FIG. 13 is a system view of a community bulletin in accordance with a preferred embodiment of the present invention.

According to a preferred embodiment of the present invention, there is illustrated in FIG. 13 a system view of a community bulletin comprising a central server having a database of advertisements, user information, and information on businesses for providing support to a client-side application and a server-side application over the Internet. The client-side application collects preferences from a user and displays advertisements to the user based on the preferences. When the client-side application is first installed, a postal code, zip code or other regional locator is requested from the user. The name, address, phone number or any other personal information is not requested, but the user may optionally provide such. Privacy of the user is enhanced in that the client-side application does not need to know personal information of users to carry out its purpose. When such information is collected, it is kept confidential, and only released by the user upon their authorization. Any necessary legal consents or authorization from the user are also obtained at this time. An identifier is, however, assigned to each registered user in order to track their preferences and to tell them apart.

When the client-side application is first loaded, or evoked, it provides the user with several common categories such as restaurants, hotels, businesses, fast food, and entertainment, broken down into sub categories. The user is also provided with an option to add keywords to this list. The user indicates the categories that are of interest and the geographic area of interest relating to the categories. Each geographical area is referred to as a "zone of influence", "circle of interest", or "stomping ground". For example, with pizza delivery, a ten mile radius may be appropriate as one would not order pizza from a place further away as the pizza would always be cold. Likewise, the user may be willing to drive only 60 miles for a restaurant or movie theatre, but 300 miles for a deal on an antique sports car.

After completing this list, the user has created a personal set of profiles that are geographically specific. The user is also able to globally set these zones of influence in a number of ways: as latitude and longitude entries, as a radius from a central point, as a driving distance from a central point, as a zip or an area code, and as a city, town, state or province. The user is also able to draw a free flowing bounded region on a map. The user is also able to add or subtract in combination or on their own using Boolean operators. For example, where the user lives in Niagara Falls Canada, which is across the border from Niagara Falls USA, the user may have an entry for hotels that is "All hotels in Niagara Falls, or a 100 mile radius but must be in Canada".

In another embodiment of the present invention, the client-side application may be used to collect data for other Internet applications in which case the largest circle specified becomes the perimeter of the bounded region defined as their community. For this document, the term community refers to businesses within a user's zones of influence.

In another embodiment of the present invention, there is provided a client-side application having an advertisement in the form of a coupon that a user is able to "clip". Using known means, the client-side application is able to track the coupons which have been printed (i.e. clipped) and prevent further printing of these coupons. Alternately, each coupon may have a security code in the form of a bar code for easy scanning to uniquely identify a coupon so that a business is able to control the number of valid coupons in circulation per user. At the point of sale, the coupons are scanned and the bar codes read and verified to ensure that only valid coupons are provided value.

In another embodiment of the present invention, there is provided a central server where each ad is wrapped before being sent to a client-side application via IM (ICQ). The client-side application is a 24*7 application that receives the wrapped ads, and processes them as follows:
  (a) If an ad is in a category that the user wants to always see immediately, it alerts the user (ICQ beep), and pushes the ad for immediate viewing or else sends it to adbin (file where ads are stored),
  (b) If the ad does not meet user preferences (due to error or user changing preferences) then the ad is discarded,
  (c) Otherwise the ad is sent to adbin for later viewing.

Figure 14:
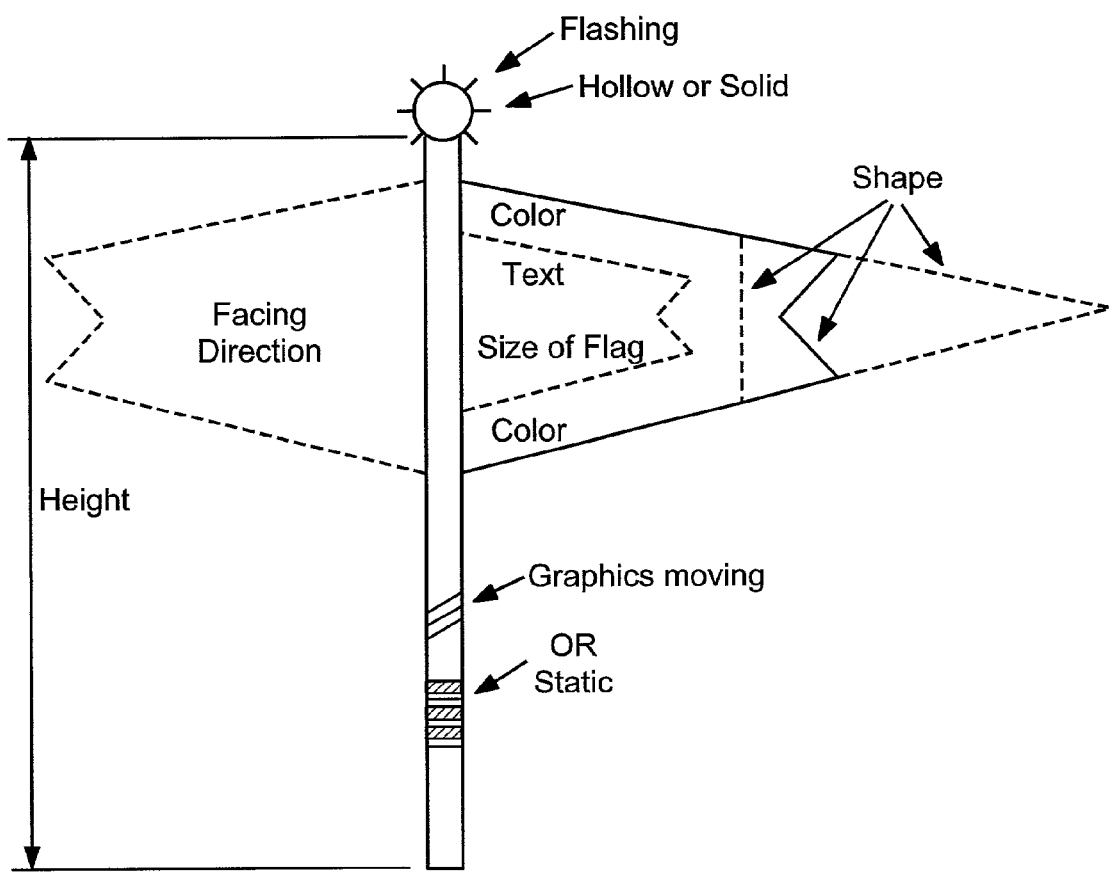
FIG. 14 is a graphic in the form of a flag to represent a business and certain information in respect of the business in accordance with a preferred embodiment of the present invention.

According to another embodiment of the present invention, there is provided a client-side application with an adbin (stores ads) that displays advertisements in the form a map showing a community of a user. The map for the user displays URLs that match the user's areas of interest. Each URL is also represented as a flag on the map. A flag is illustrated in FIG. 14. When an ad is available for a URL, the URL indicates that as a flag having a solid masthead versus a hollow masthead, with some marking to show that there is also a coupon. The graphics of the flag convey information about the business, for example, height indicating popularity of site in pageviews or unique visitors; colour indicating classification of business; facing indicating the user been there before or not; flashing head indicating new content since last login (solid indicating no changes in last x days); size of flag indicating size of web site; style of flag indicating privacy policy (uses cookies, requires login, does not track, or the like); text indicating category or name; and flag pole indicating user definable options. Where there is no advertisements for a particular business, the available information on that business is provided through a created URL, the client-side application is operating as a directory in this event.

Figure 15:
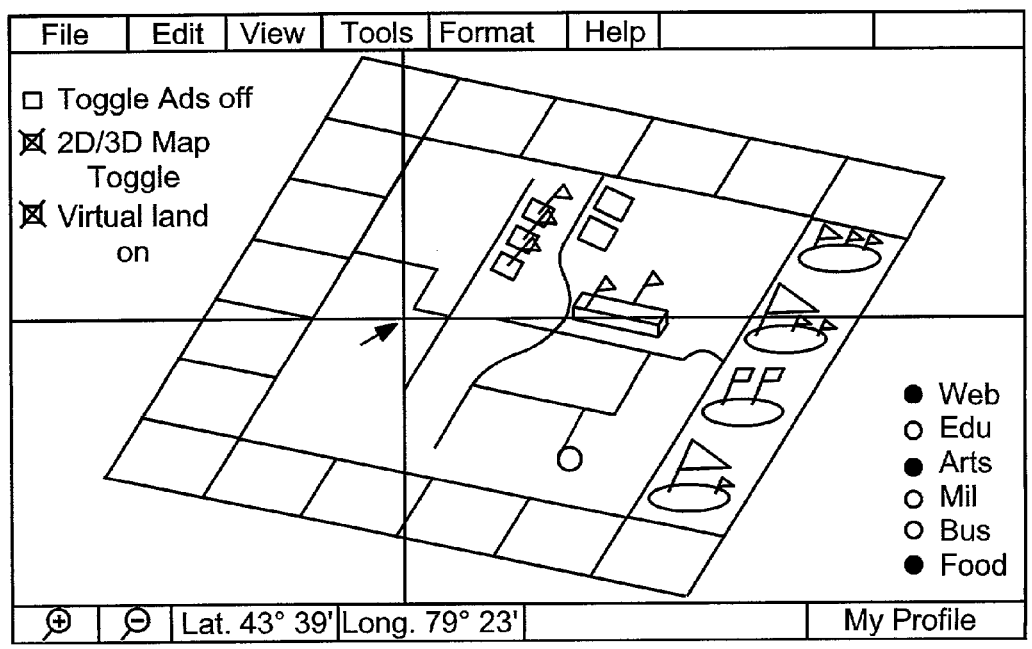
FIG. 15 is a display showing a map, where advertisement space on the border of the display has not been selected, in accordance with an embodiment of the present invention.
Figure 16:
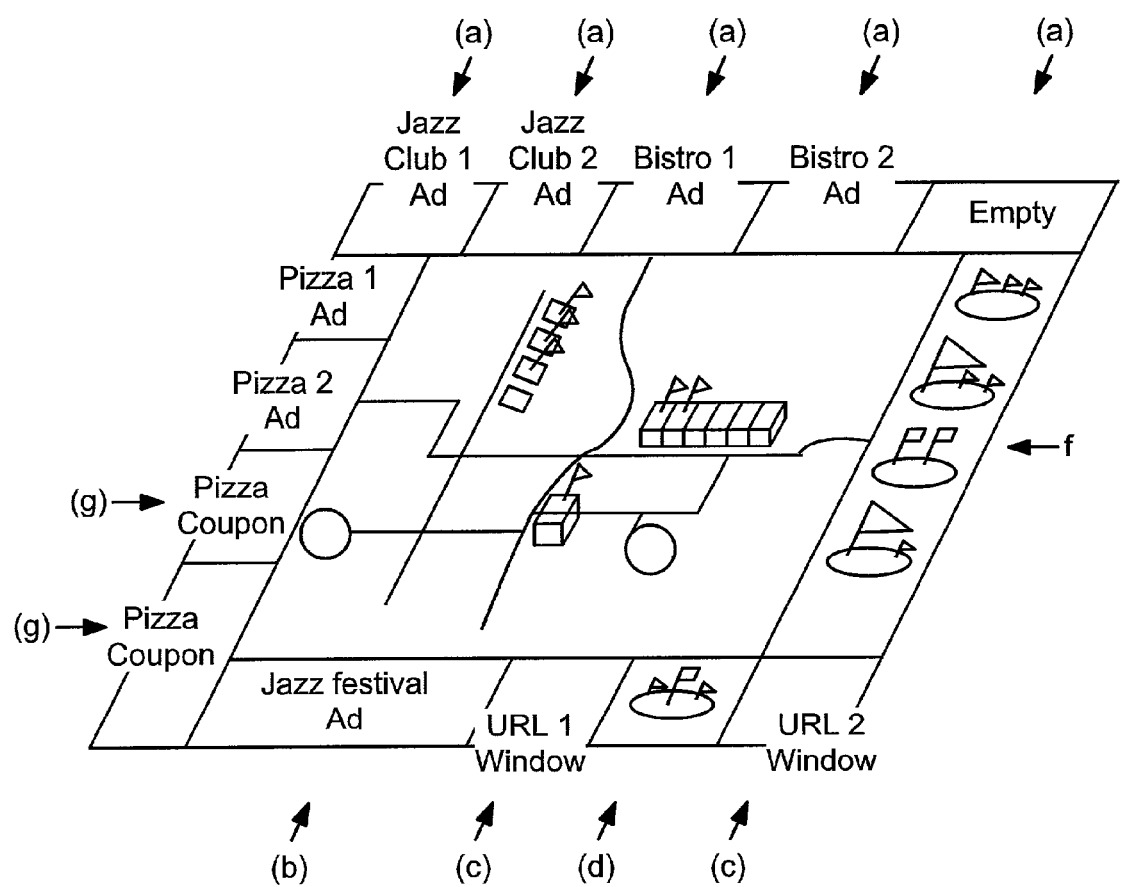
FIG. 16 is a display showing a map, where advertisement space on the border of the display has been selected, in accordance with an embodiment of the present invention.

Referring to FIG. 15, there is illustrated a display showing a map, where advertisement space on the border of the display has not been selected, in accordance with an embodiment of the present invention. Referring to FIG. 16, there is illustrated a display showing a map, where advertisement space on the border of the display has been selected, in accordance with an embodiment of the present invention. When the user clicks on a URL for a business the user is either provided with a view of an ad or is connected to a web site of the business or a central server created URL/web site with information on the business, depending what is available for the business. If the user has the outside panes visible (advertisement spaces), the ads in the adbin appear in the outside panes, and are highlighted when a user hovers over a URL matching an ad in a pane. If there are more ads in the adbin than panes, then a choice of methods to display ads is used including rotating ads, ranking of ads (last viewed stays on, as new URLs are hovered over, old ads drop off).

The size of the adbin is settable by the user. Alternately, it can be a fixed size or can be as large as the local storage. The ads may also be compressed to save storage space. As new ads are received by the client-side application, they are placed into the adbin, according to the following rules. If storage space is full then old ads are removed to allow new ads in. An ad from a vendor replaces an old ad from the same vendor, the old ad is discarded (if a coupon, it can be electronically clipped in which case it stays in adbin, and is not erased unless the user chooses to erase it manually). Ads that have expiry dates and have expired are removed.

When an ad is displayed, a counter is incremented to indicate that the ad has been viewed. This general counter can only be increased once per day per user. Another counter also collects the number of times an ad is actually clicked on, whether it has been clipped, and other demographics about how it interacts with the user. This counter is used for the time sensitive ads.

In the case when a business sends an ad that has an expiry date and the ad has not been seen by the user after the date the ad/coupon expires, and when the expiry has occurred, or during, a "times viewed" counter is sent back to a central server which rebates the business as necessary.

When a user enters a query into a query box that is provided in a display, the matches to that query are displayed on the map, and all the panes are changed to show the matches to the query as well. This view remains until another query is done. Alternately, the query results may disappear after a period of time and as other advertisements rotate into the panes. The user is able to set the display to show only coupons, only ads, keep fixed coupons, and other variables.

According to another embodiment of the present invention, there is provided a client-side application with a Do Not Discard Toggle. There are situations where a user may have set a region to a certain value, which inhibits receiving any ads due to a poor selection of size of the bounded region. In the first instance for a user when they are sent an ad which is within the senders bounded region, but not the receivers bounded region, the receiver is still sent the ad, but a display box appears telling the user that they have received an ad from a vendor outside the region specified for this category. The user has the option to change the setting to discard these ads in the future, change their bounded region, and always be notified but not displayed (thus storing the ad on the receivers system). If the user is happy with their bounded region, then the 'Do Not Discard' toggle is flagged to off, and the user never receives ads outside their region. If the user wants to be notified when these ads appear, then the 'Do not discard' is toggled on. In these cases, the business may be charged or may not be charged depending on pricing policy of the operator of the system, but the user appears in the count.

Businesses in many cases are geographically centered in that the majority of their customers are found within a certain physical distance of their retail location. There is a science behind picking franchise locations based on this fact. Franchises require a certain population within a certain distance to allow a store to open. A business only desires to advertise to their customers only. As the business advertises further and further away from their location the percentage of people that could become customers declines.

According to an embodiment of the present invention, there is provided a server-side application for connecting with businesses. A business connects to the server-side application enters their business name and address. In an alternate embodiment, a third party authenticates the business address in order to ensure the business is not spoofing the system and verifies keywords of the business in the industry. An authentication service may be used. If the business does not have a URL, a URL may be created on the fly for the business.

Once the address of the business is identified, the business then enters the server-side application. A map of their region centered on their location is displayed for the business with the available user or customer information. When the business has multiple locations, then one location is picked to start with or, alternately, the map is centered on the center of the group of locations. There are also several business settable variables including a scale setting.

The business then picks a keyword or keywords representing words that represent their business. For example, a pizza shop that also serves wings may choose "Pizza, wings, fast food, delivery" as keywords. There are further procedures to convert such keywords into the various synonyms and to prevent bad matches and abuse. For example, a pizza store can not enter "nude, burgers, software" in an attempt to get more matches.

The business also selects a target region that they want to advertise to. As with users, the same methods for defining a shape or defined bounded region are available to businesses.

Once the keywords and region are selected, the server-side application matches all the keywords with all the users in the specified region and displays them as dots on the map. According to one embodiment, a price for each dot is determined based on the keyword. For example, a dot representing a user who expressed an interest in fast food, costs less than a dot representing a user who expressed an interest in Porsche automobiles. Different colored dots are used for different keywords or groups of keywords. The server-side application then displays the price to the business by multiplying all the dots by the appropriate prices, to determine a total. The business owner is able to then expand, or shrink their bounded region or cancel the operation or go ahead. Once the potential users are selected, an advertisement is chosen by the business.

The advertisement is in any of text, graphic, video, audio or other format as may be defined. Prices may also depend on the type of advertisement.

Once the advertisement is selected, the server-side application cross-references each of the users represented by a dot with the keyword to see if the user's circle of influence for that keyword extends to include the location of the business advertising. If not, the dot is removed; the business owner is notified of the new totals for final approved matches.

As well as geographic matches, the profile of the business is also matched with customized user filters, such as only businesses that belong to BBB, or only businesses accepting credit cards. This calculation is done before displaying the map to the business and, further, the difference between two maps, raw matches and modified matches, are optionally displayable to indicate the effect of changes in criteria like credit cards, handicapped washroom and association membership Advertisements are delivered via known message technologies so that the advertisements are, in the client-side application, delivered as the user selects. The business is credited back if the advertisement is not delivered. Alternately, other known billing schemes are also available.

According to another embodiment of the present invention, there is provided a system and a method to further control advertising costs for a business. The business is able to specify a dollar amount and a region, and a time interval, so that an advertisement is served to a specific region over and over until the specified dollar amount is reached. Each of the client-side applications receives the advertisement, and stores it in a buffer. The users request to see the advertisements when it is convenient for them. A user also has the option of having the advertisements delivered by email, or having them only displayed when the user requests advertisements on that topic. Where the advertisements are time sensitive, such as 50% off until a certain date, the advertisements that are not viewed by that point in time are deemed not to have been delivered. This is analogous to having your mailbox stuffed with flyers that are there whenever you look for them, but do not show up when you are looking for your mail. Old flyers disappear automatically even if you do not read them.

According to another embodiment of the present invention, a client-side application displays advertisements in the form of a map. The map indicates the relative location of streets and geographical features. The locations of businesses are indicated on the map at their approximate location in graphic forms. The graphic forms include icons, flags, color, and flash. Further, a user is able to set and allow advertisements to appear on the outer edges (border) of the map. The graphic forms are also links to web sites and advertisements of the businesses. A user is linked to a business' web site and advertisements if the user selects the graphic form. Since the user's map has their community displayed, by definition, if a business qualifies within a user's circle of influence, then their graphic form is displayed on the map in their approximate street location. Virtual businesses are displayed on separate spaces on the map defined by the user representing virtual land.

Virtual businesses exist in this system except that their physical location is replaced by their zones of service for matching purposes. Users are able to choose not to accept virtual listings as a filter. The user selects the graphic form on the map to display the advertisement for the business or jump to their URL, and the user has the advertisement spaces around the map turned on, the display also has advertisements for the topics of interest. In the event where there are more advertisements than spaces to be displayed, a ranking system based on the user's selections is used to determine which advertisements stay on the borders, and which do not. Alternately, the advertisements may be rotated.

The present invention is advantageous in view of the four modifiers that influence an advertisement's acceptance. First, the advertisement only appears when a user is looking for such advertisements. When a client-side application is opened, a user sees a map of their community. If the user has advertising space turned on, then these spaces display advertisements for businesses in their community based on their profile and interests. If the user then chooses to search the map, then any advertisements in the buffer matching the search criteria are also displayed in the advertisement spaces. It is a function of the client-side application to turn off the graphic forms expect those matching the search criteria.

The second modifier is serving advertisements for locations that are within the user's travelling distance. Clearly each user has different areas of comfort. Some people never leave a small area around their home. Other people drive long distances to save five dollars on a pair of shoes or to see more variety. Yellow pages therefore being a fixed paper medium often display unnecessary ads for some people since they would never travel that far, while others do not contain enough ads. The advertisements, which are of no interest, are excluded by the circles of influence for each category or keyword, or by a global setting. The present invention provides users with the ability to expand, contract or modify the zones of influence on the fly. The client-side application is also provided with the intelligence to adjust the size of default category settings based on past records or past activities of the users of the application according to known methods. Advertisement selection is tracked by the client-side application to determine which advertisements a user seems to prefer and then reports back to a central server on these trends, but again, it is anonymous. The geographic information of the businesses is authenticated so that spoofing is reduced.

The third modifier is serving advertisements that contain useful information to the users. All advertisements are passed through the user's filters, so that the advertisements at least do not contain excluded matches. If handicapped washrooms are a must for a user, then the user is only displayed matches that have a handicapped washroom. In this way, many phone calls are saved during a user's search to see if they have that service or not (in this case handicapped washrooms). Secondly, all advertisements are only accepted from businesses having a URL, so the URL is therefore always known. Over time, the URL will become an extension of a business, so their URL will represent the best source of information on the business and certainly more than yellow page listings that only have address and phone number. As advertising is being served, users are able to select on an advertisement to go directly to the business' web site. The web site is provided with the information of where that the user came from by the client-side application or other known means.

The fourth modifier is privacy. Unlike web sites that insert cookies in browsers, or push pages knowing user names or other personal identifiers, the present invention provides complete autonomy to users, while still providing businesses with a method of marketing to particular users. Email advertising which is permission mailings involve the user giving permission to receive emails from vendors they like, and the products they want, but this has no privacy since the users email address is used to deliver the message. Email advertising also is not timely in that you may receive or read the email at a time when you are not interested in the product in question. In an email environment, in order to cover all of a user's interests, the user may get inundated with emails or else keep opt'ing in and out of lists as the interest peaks and wanes. Currently, many businesses do not have URLs or web sites, and therefore do not exist in cyberspace. According to an embodiment of the present invention, there is provided a server-side application that, on the fly, creates a URL for a business without a URL. The URL generation includes a random number based on a business's identifier in the system with a fixed prefix. For each URL, the server-side application creates a web site according to known methods using a template with information and advertisements provided by the business.

According to another embodiment of the present invention, there is provided a map where all the entries are URLs themselves, which are mapped to the physical ground based on their physical location in the cases where a physical location exists, and for virtual businesses can reside in virtual land that are displayed as a border around or layer on top of a ground map, where the virtual location is really a zone of service. Where a virtual business legally or practically services the physical space represented by the map, the virtual business is displayed in that map's virtual ground, or virtual cloud.

According to another embodiment of the present invention, there is provided a peer to peer ("P2P") implementation where a server-side application for a business collects information about bounded region by pinging a community, and determining the potential size, so that the business has an online now and online maximum number of users. The business communicates with a central server to process a VISA/MC/AMEX transaction, which issues each a code, and this code is required to send anything into the network.

Figure 17A:
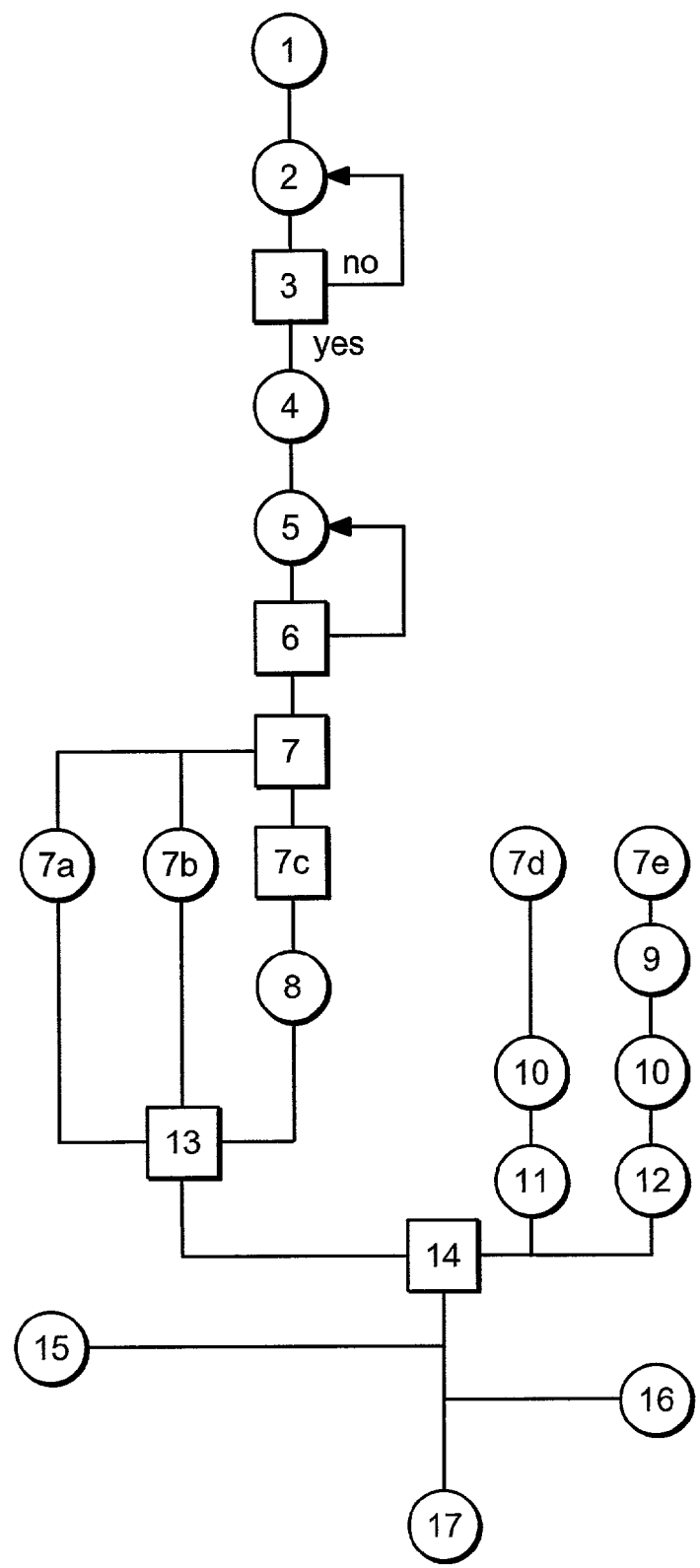
FIGS. 17a and 17b are a flowchart of steps for a business to select matches in accordance with an embodiment of the present invention.
Figure 17B:
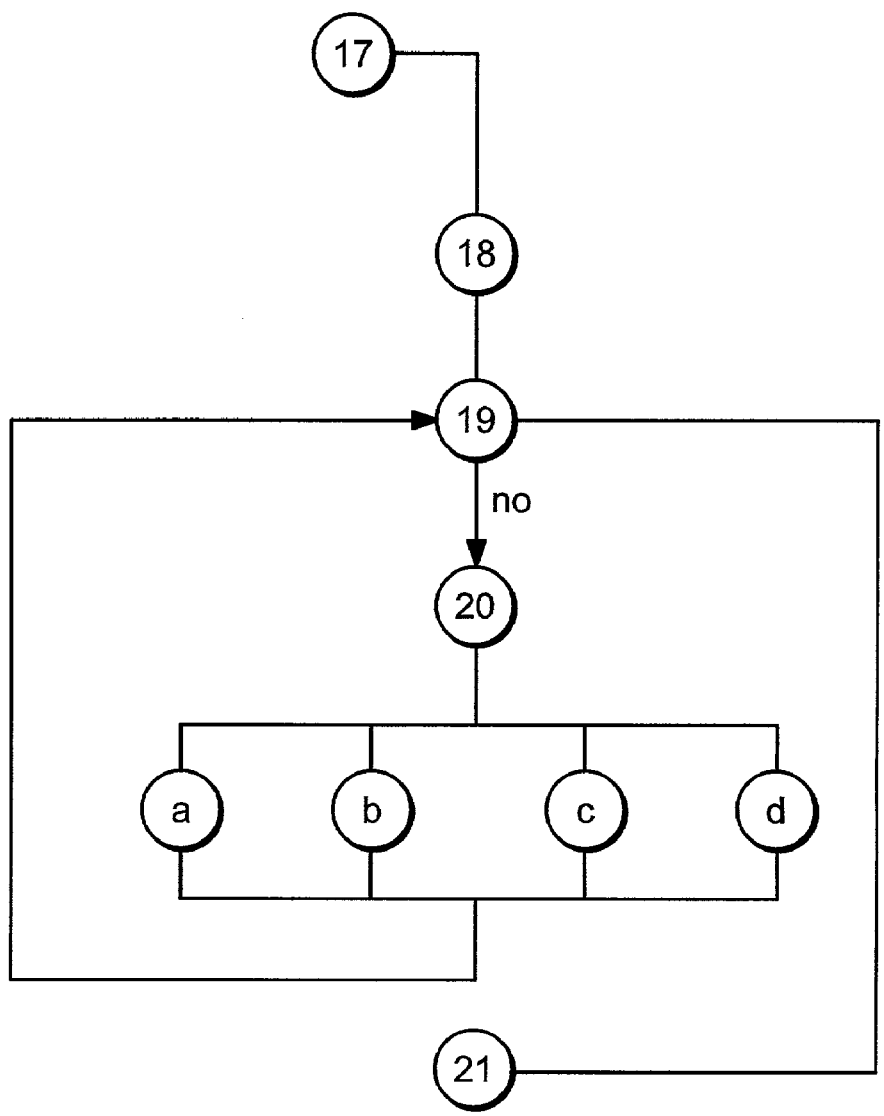
Figure 18:
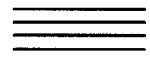
FIG. 18 is an illustration of a user interface configured according to an embodiment of the present invention.
Figure 18:
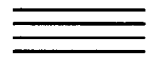
Figure 18:
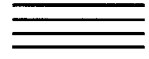
Figure 18:
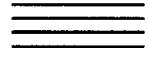
Figure 18:
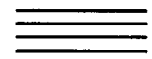
Figure 18:
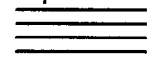
Figure 19:
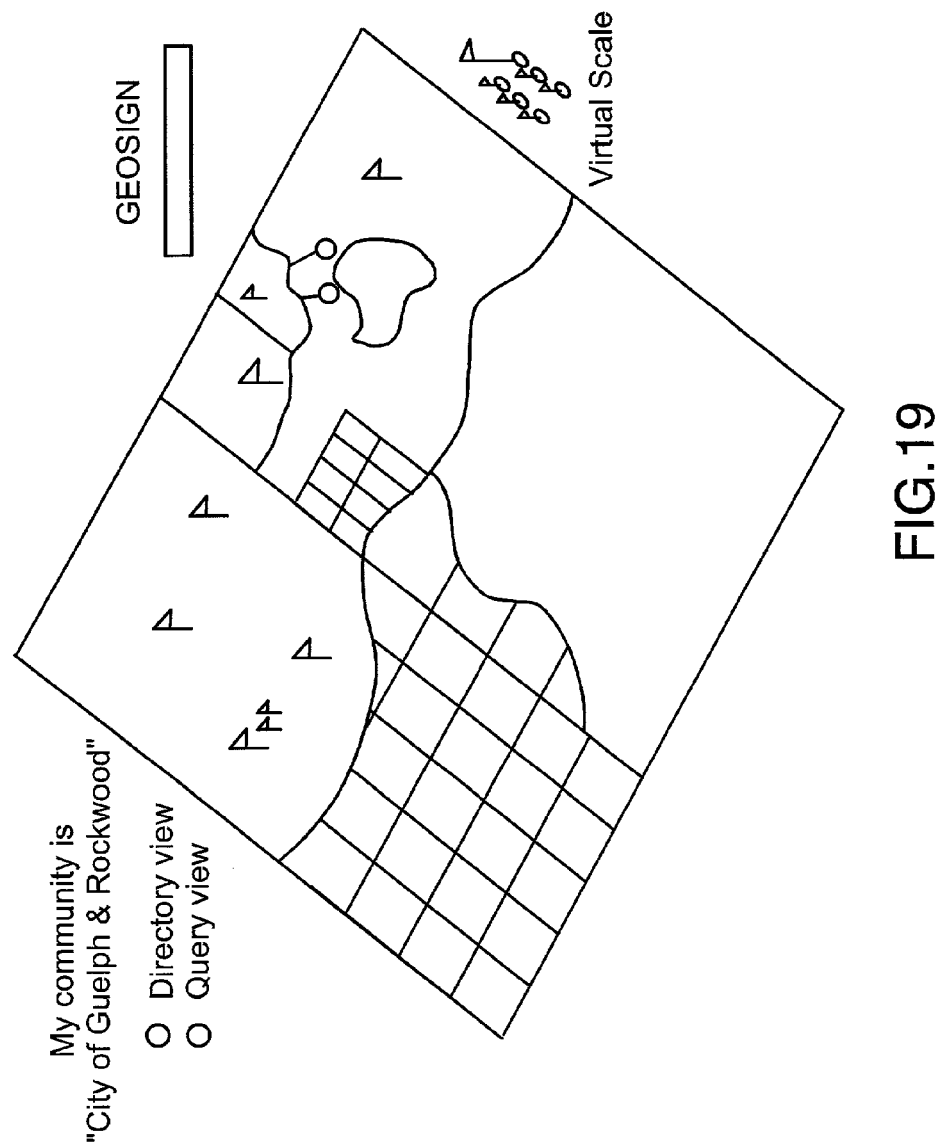
FIG. 19 is an illustration of an alternate user interface configured according to an embodiment of the present invention.

Prior to the code being issued a business sends out ping with keyword and geographic boundary and receives pongs to determine the list of potential user clients. Once a code has been issued, the business application sends out wrapped advertisement into the network to the pongs. The wrapper contains geographical information to allow a client-side application to determine who to pass it on to, and to prevent it from circulating into the entire network. When a user's client-side application receives this data, it also follows the procedures as disclosed above in the non-P2P implementation. According to another embodiment of the present invention, there is provided a method for selection of the matches by businesses where the steps are described in Table A and a flowchart of the steps is illustrated in FIGS. 17a and 17b. Additional steps for time sensitive advertisements are described in Table B.

According to another embodiment of the present invention, there is provided a method of enhancing advertisement viewing where users are told how many ads they are missing and the users are paid for every ad viewed, as a percentage of what are paid by the businesses. If a business pays $10/M, each user is paid a penny per qualified viewing, so when that ad appears on each user's screen, a counter increments by 0.01, and the users see the amounts being earned. Limits on how much per ad per day, as well as how large a region a user can view are settable. The money is earned anonymously and is used for purchasing from an online catalogue so that no one knows who earned the money, subject to any applicable taxes.

TABLE A

| | |
|---|---|
| Program connects to central server | 1 |
| Enter Business Name | 2 |
| Account Number | |
| Password | |
| Verify location of Business | 3 |
| [Level of Authentication Variable] | |

TABLE A-continued

| | |
|---|---|
| Business selects Category | 4 |
| For Ad | |
| (repeat for multiple categories) | |
| Enter ad text/graphics/video/audio | 5 |
| Or combination thereof | |
| [Optional] | 6 |
| Approval of ad by system | |
| [filter by content, image size, other parameters] | |
| User selects method of selecting | 7 |
| Bounded region | |
| (a) Radius Out from center | |
| (b) Free flow region on map | |
| (c) Match address(es) | |
| (d) Number of leads | |
| (e) Budget of set amount | |
| If 'c' then display map and user | 8 |
| Defines bounded region by | |
| Defining one or more closed shapes | |
| to define a bounded region | |
| If 'e', lookup cost per lead for category | 9 |
| Selected from a database and divide cost per lead | |
| Into budget to determine number of leads. | |
| For cases 'd' and 'e' start a search of database | 10 |
| Using an algorithm (several known methods) | |
| to sort all users by proximity to central business. | |
| If 'd' return first requested number of matches | 11 |
| If 'e' return calculated number of matches | 12 |
| Case of 'a', 'b', 'c', match database with all users | 13 |
| That are in the bounded region and have | |
| Indicated an interest in the category requested. | |
| Check other user filters and code all matches | |
| that are eliminated | |
| OPEN | 14 |
| [optional step] | 15 |
| Display all users in region regardless of category on map or as text number | |
| And color code matches on map (or show count as text) as they are matched | |
| As either no match, category match but eliminated for filter reasons, or category match | |
| But eliminated for zone of interest reasons, or a match. | |
| [this step can be performed now or at a later stage] | 16 |
| Calculate the distance from user to business, and | |
| Determine if this distance exceeds the zone of interest | |
| For the category in question. If the distance does | |
| Exceed the zone of interest, discard the record. | |
| [see note at end re: Do Not Discard Toggle] | |
| Display the list of matches on a map or as a text. | 17 |
| Display using coding scheme (color, shape etc.) the entries that were eliminated due to filters, and [if above step performed], a list of all entries that were outside the zone of interest | |
| Display cost per lead and final project cost | 18 |
| If approved jump to delivery | 19 |
| If not approved, allow business to | 20 |
| (a) shrink or expand bounded region radius | |
| (b) Change region | |
| (c) Add/delete to address(es) | |
| (d) Change budget or number of leads | |
| Go back to bounded region determination | |
| [delivery] | |
| ad is stored at central server and coded with ID # of users | 21 |
| and next time user connects to server it is delivered. | |
| [Delivery can also be by email or SMS etc. at the users request.] | |

TABLE B (Applies To Time Sensitive Method).

If a business wants to pay only for ads read and not ads delivered, then
The ad is flagged as time sensitive.
The ad is sent to the user but is stored on their system until they perform an action
Which would involve seeing the advertisement.
If toggle ads on map is set to ON, then the ad would display immediately on the map
And the server would be sent a 'I've seen it' message TABLE B-continued (Applies To Time Sensitive Method).

If the 'When requested' toggle is set to ON, then the ad would not be served until
The user asked for ads [of coupons] on that category. If the user does not request the ad, before the expiry date of the ad/coupon then the 'I've seen it' message is not sent,
and the
Server is notified that the ad was not viewed (assumed since message not received).
If the ad is viewed or sent by any method where the user cannot verify that they have read it (email, sms) then the ad is toggled as viewed.
At the end of the period, the business is sent a report of the ads viewed and not viewed.

Attribute Bounded Network Providing a Collection Of Electronic Document Addresses (Virtual Portal) Representing a Geographically Bounded Region There exists a problem in the market place relating to the current state of information on the Internet. Often when indexing internet pages, Yahoo, or another search engine captures a page that discusses or describes an event that has already passed. This happens for several reasons. One being that Yahoo/OSE does not have the ability to remove pages from its index based on the age of the content since it cannot determine when a page expires. Also, many web sites may leave pages on their site that have expired since it is easier than taking the page down, and often, the firms to not have the resource to monitor the stale data. Sometimes they may leave data on their web page so that surfers can see what events have taken place. However, as the web gets more and more web pages online, the Internet starts to become a very accurate source of information about what is on, and when in a community. The whole definition of the web is based on this information being stored distributed on local individual pages, as opposed to stored at one central location. While there are many sites such as ticketmaster, and festivals.com that have events listings, but no single service can ever have every event. This is especially true of one time or first time events where tickets are not sold. In a community, the common ways of promoting events include telephone poles, bulletin boards in community centres, flyers taped in variety store windows, flyers delivered door to door, radio, local newspapers, and word of mouth. Only the larger events get listed on the large national services. Events such as garage sales, small theatre groups, Rotary or other service club events, or school plays, or charitable events often get missed.

The present invention involves a collection of electronic addresses (URL's) that represent a bounded region. The bounded region refers to that one person's local community. Every bounded region is a community. From these URL's, the user can identify which URL's are of interest to them selected individually, by category, by type of business, by web site size, by association rating or other means. URL's can be omitted as well. Everyday, the user can access a central database which contains indexes of all the URLS in their community, and check to see if anything has changed. If the new community is not large in size, the user can download the changes to their local machine.

There are several levels of usage of the present invention. There is the user, the contributor, the member, and the abusers. They could be many other categories. The user accesses the database but never adds anything to it. The contributor is a person who allows the application to use their computing CPU time to index pages in the community and upload it to the central database, or store it on the local machine. They are contributing to the local community.

A software program resides on a local machine, and accesses a central database where a list if URLS is stored that represents the URLS contained in the bounded region and areas of interest selected by the user. In this list, each URL will have a number associated with it representing the number of other people that have this URL in their region and area of interest, so more popular sites will have higher numbers, while obscure sites will have lower numbers. The user is assigned a list URLs, or a single URL, to index. This list can be a fixed length controlled by the system by the user, or can vary depending on how many resources the user's system has made available. It could be done on a one at a time basis, returning to the system after each index is completed. When the system goes to a URL, it may index that URL only or other sub-URLs of that site, and indexes all the components including graphics, text, audio. Indexing can be set to turn text, graphics, audio, jscript etc. off. When the site has been spidered, the data spidered is indexed, and the index, or other data, is submitted to the central database.

The user can then perform various functions on the database. They can query the database for changes in respect to the URLS being tracked by the user. In this case, the database can determine which of the URL's have been updated and then report back to the user with the URLS that have changed. The user can then choose to visit any of these as they desire. I envision a system whereby the date could be displayed on each URL indicating the staleness of the site, which could be color coded so that as sites got older they got lighter and lighter or darker and darker. Various systems could be introduced to represent this effect. Date stamping is critical as it provides a method for users to immediately determine whether a site is likely to contain recent information. Obviously, if the date stamp is before an event becoming public knowledge (example—celebrity wedding), then there is no chance it has any information on this event. As well, in relation of which sites/URLS a user wants displayed, this could be done using the users personal profile of likes and dislikes, and the URLS data (contained in their GEOSIGN possibly) to determine the sites that might be of interest, or using this to score each site as a percentile.

Using the percentile rating system the system could intelligent learn from the actions of the user so that future ratings could be determined from past experiences. Whenever a user found a page they liked, they simply entered a keystroke which recorded this content, and then used an analysis of this page to rank future sites either higher or lower.

When assigning pages to index to the user's spidering program, the system takes the most popular pages in bounded region (with the highest number of matches) and assigns that to multiple people. The number of people could be one of more, but is designed to have multiple people index the same page to ensure that if one of them is offline for extended periods of time, that the page gets indexed. After assigning the most popular URLS, the second most popular URLS are indexed, then third and so on. Another method is to actually assign pages based on the least popular URLS and work backwards based on the assumption that the most popular sites will still get spidered because they have so many matches, and in this method, the least popular pages do not get missed.

The URLs could be assigned sequentially, with the user program visiting the server each time to get a new URL, or the same machine would keep a URL list. If the pages assigned are given to the same machine, that machine can process an index faster by quickly determining that the site has no changes. Also, by assigning the pages in this fashion, you have less calculations for a community when new pages come on line. Otherwise, on a daily basis, every user program has to get assigned new pages filling up trashcans and temporary file buffers every day.

There is also the method of having the user spider pages whenever they are surfing using the argument that every URL is inside someone's bounded region. This however would slow down surfing speed, unless the caches were analyzed later when the user is not there. Using this distributed resource of users personal surfing and spidering pages whenever it is on a site it can identify, allows a large number of users to perform a massive amount of spidering.

The result is that a community can have a central database which represents a very recent snapshot of events taking place in its community, current to within hours for any given URL. Thus when someone posts a Web site, or changes an existing one, everyone instantly will have that information in their database, assuming that the new Web site is known to the network.

Indexes could be done as a delta of a previous index, so that the entire index does not have to be recalculated. The old data is removed from the index, while the new data is added. This supports the model of having machines generally spider the same sites or same pages.

The present invention is a methodology for restricting, or filtering a large number of URLS to a geographic region based on the location of these URLS or the areas of service of these URLS. The resulting subset of URLS represents a virtual community bounded by a finite geographical border or set of borders. This method of creating a bounded region of URLS provides the ability for a user to perform various actions including deep searching, spidering, indexing, display, organization that would not otherwise be possible with a large unbounded set of URLS. The present invention also uses a distributed model of resource sharing, to allow multiple users with overlapping bounded regions to share each other efforts to achieve nearly real time updated indices of web content within a bounded region.

In addition, the bounded URLS are not limited to set geographical regions such as cities, or towns, so that each individual user can be as focused as they chose. This resolves many of the problems created by search engines missing results that may be located very close to a customer but with an address in another city, as well as making it significantly easier to find items using traditional search engines. The present invention also allows for portions of the web to be downloaded to a storage device that may or may not have an internet connection. The present invention may use authenticated certificates to ensure that the web sites actually have physical locations in the bounded region and not just hosted in the bounded region, otherwise a large number of false positives results may be indicated. There are three main areas of the invention.

Collect URL'S by specified region:
Ways of describing region (distance, time, address matches, freeflow on map, AND/OR of all of the previous)
Mechanism for creating a bounded region (lookup from geosign or other database, also use whois, or other r-DNS lookup if geosign not available)
Allow sites to be added or excluded from list (discuss error handling)
Allow regions will be filtered by type or category, keyword etc.
Storage of URL'S and updating of URL'S:
Download all urls or indexes with or without sound/graphics. Deep downloading allowed. Index data. Store local, at server, or on device, or on dvd etc.
Query url for changes and update records. Indicate to user which sites have changed. Use of color, graphics, size of images etc.
Distributed nature of URL'S:
Use of people within each bounded region to index selected URLS (define different methods)
Upload indexes to central server or store locally The present invention is a method of improving the search ability for a user on a disparate network such as the Internet by allowing the user to define their own bounded geographic region of interest using many methods with options to filter within this region and add exclusions outside this region, and to collect all the electronic addresses within this bounded region displaying them on a map, in a directory, or stored for repeat access. The invention does not discriminate between virtual and physical entities, and includes methods to represent multiple attributes of an electronic address in a single scalable icon.

This patent involves looking up from a table a set or URLS identified to be within a geographic boundary based on authenticated geographic location information and building a virtual subset of the Internet that can then be accessed using any other current tools to analyze the web except that it cannot go outside the bounded area. The patent would describe the process for identifying the URLS by authenticated location and this authentication can be very soft or very secure as in a GEOSIGN. The URLs would then be stored in an indexed database, that would become similar to a local DNS server, in that any request for a URL not in this database would return a "404 error page not found". Of course, we would be able to control this error message. As far as the user is concerned, this is a mini-Internet.

As the web gets larger and larger, since the planet is not expanding, the Internet is getting more dense in terms of number of web sites matching physical locations. The ability to create virtual worlds will become more and more important, and this could actually be hard coded into a browser for countries like China, that do not want users to view files outside a certain region. For most users, it would be a great way to find specific local data as by default all the other outside sites do not exist. A user may want to add ebay.com, and mtv.com to their virtual world, so it is geographically bounded with favorites added on top. Whenever a '404' error occurs, the user can always choose to add the page to their world. At anytime, they can go global and then have full access to the web for tasks which are not local.

Products like Geosearch attempt to provide a list of results based on geography but they use a different method of spidering pages that is not accurate or similar to the table lookup.

The virtual portal is a critical part of the whole Internet problem of finding data. It is the sister patent of the data sorting by geography patent and the displaying of URL's on a map, and a foundation for the GEO-Community patent (GEOMAP) patent. This would also be the foundation for the tablet devices that would contain subsets of the web for travelers etc.

The present invention provides a way for users to selectively limit the scope of searches, selections, or directory listings to a geographic region based on the physical locations of URL's. In current systems, one can limit a search or selection by a geographic region based on the physical location of businesses. These searches work by comparing a physical address to a bounded region. For example, you could ask for all the shoe stores in Guelph, or all the restaurants in San Francisco. In both these cases, a list would be returned with matches from a physical location database. In neither case do the URL's enter into the equation or search criteria at all. There is no way to ask for all the URL's located in San Francisco. Using reverse DNS lookup tables, it would be possible to list all the URLS hosted by equipment that was located in San Francisco, but in many cases, these URLS may represent businesses in other cities or parts of the world. AOL hosts all their users in Maryland even though they are dispersed across North America. There is no mechanism for displaying all the URLS that represent entities located in a region, since many of these URLS may be hosted at location outside region. For example, a URL for a restaurant located in the Fisherman's wharf may be hosted by AOL in Maryland, while a URL for a restaurant in New York may be hosted in San Francisco. A directory listing of restaurants in San Francisco may include many listings that do not have URL's as well as miss many URLS of sites that are not businesses or sites not willing to pay to be in a directory.

Other services may have a database of restaurants, or a database of hotels where they have specific information about these sites and provide this information to queries by users. However this information is not necessarily provided by the hotel or restaurant directly and certainly is not the information contained on the actual web page of that business. It is impossible for any service that provides information to automatically have the updated information from every web page of every business they list. Therefore at any given time, the information is always inaccurate, and the degree of inaccuracies varies accordingly. Over time the data becomes more and more inaccurate to the point of actually being counter productive, in that they are listing incorrect phone numbers, reporting on businesses that no longer exist or have moved locations, or even simple things such as reporting show times for events that are now over, or incorrect pricing for products that were on sale, but are no longer.

The present invention provides a mechanism to provide immediate concurrent information that improves in accuracy and depth as more people access the information. A user may download a browser plug in or stand alone program (GEO-MAP). This application program has several components. One component allows the user to specify a bounded region which they want to consider their community. This region can be specified as a radius from a preset point, a city name, an area code, a driving distance from a central point, a freeform bounded shape drawn on a map, or any combination Boolean or otherwise of these or other methods of describing a geographic region. This bounded region is converted into latitude and longitude format or other standard format to represent a fixed bounded region on the ground. This region becomes the users community. The user can also specify particular interests within the community by a variety of choices. They can choose by classification, such as arts, education, business, web based, etc. or they could choose by category (SIC or otherwise)—Shoes Retail, shoe stores, sports wear, restaurants—Italian, etc. A user can also choose interests by keywords such as Nike, Pizza, Porsche etc. A user can also choose to extend their community definition for selected keywords or categories, such that they have a general community of one size, but another bounded region for selected keywords. For example, someone may specify Chicago as their community as defined by city address, but for Pizza, they are only interested in a five mile radius, and for Porsche they set their region to all of Illinois, Michigan and Indiana. In this example, the region would be restricted for any Pizza related results, and thus matches striped out, and expanded for searches involving Porsches, where matches would exist outside the community. Another way to think of this example is that the user's community is Illinois, Michigan, and Indiana, with everything but Porsche restricted to Chicago, and Pizza further restricted to a five mile radius from user's position. This has different meanings in the term of the PI relating to the initial number of URL's stored, and is addressed differently. If bandwidth and processing time is unlimited, then these two definitions are essentially identical, but as the PI outlines, the process treats them differently at the user's choice.

A bounded region is selected, and the application then connects to a central database where URLS are stored containing a link to the physical world. All the URLs that exist within the bounded region or community, are downloaded into a local database of URLs, or the list could be stored on a central server. From this database, a list of databases of interest are further filtered based on the user's interests. For this example, the user wants all arts sites, business sites with the keyword Nike, all the local fast food restaurants serving Pizza within five miles of the users house, and his local school. This smaller list of URLS is the active or visible community URLs. A map which may be a flat 2D map (aka mapquest) or a 3D scaled map, or a not to scale map which may be 2D, 2.5D, or 3D. The display interface is the user's choice. On this map, the urls stored in the active database are displayed, with various categories displayed in different colors, shapes, sizes and graphics to differentiate the urls from each other, and also to display other information such as the last time updated, size of site etc. Note that the user may prefer to view this data in a simply directory listing, or search portal interface discussed later on. The map is only one way of displaying the active or community URLs.

The present invention ("PI") is very aware of the last time a site was updated, as information can become very stale very quickly. If a movie theatre web site has not changed for a month, it does not have listings or is not showing the recent block buster that came out last week, and if it is showing these movies, then it is not the place to find out the show times. One embodiment is to use colors and shades of colors to represent the most current sites.

The user now has a map with all the urls displayed that they are interested in. They can pan, zoom, turn off (exclude sites etc.). As well, if the user has some sites that may be remotely located on the map, or too dense, the user can display a map within a map so that URLS can be easily seen. The user can also create strips of virtual land where they can stick virtual sites that are not located within the community but of particular interest.

The application now offers the user several choices. If the region (or active list) is small enough that the bandwidth is not an issue, then the user could choose to download all the sites in their active list (or even their community list if practical) and index them, and store them in compressed format locally on their hard drive, CD, DVD or other format. The information can then be viewed by a variety of methods (search portal, yellow pages, map). In this embodiment, the user would download the sites each day/hour/week to check for changes, and display in their preferred interface.

If the region or active list is large enough that it is not practical to download all these sites on a regular basis, which is likely the case for most user currently based on current technological limitations, the user would access a central server where they would join a virtual community. At the server, the user would upload their personal community data and their active list of urls. With a plurality of users connected to the server, many users would have overlapping community definitions, and overlapping active lists. As the number of users increased, the overlapping would increase to a point where the entire world would be represented as a union of all the community definitions, and the entire web would be a union of all the active and/or community lists. The average number of overlaps per site would be the number of active users times the average size of the active lists divided by the number of unique urls, which is a factor of distribution and density. Suffice it to say that the number of sites in any given users active list will always be equal or greater than the number of sites not overlapped in that same list. If a user's active list was reduced by the number of overlapping urls, then the remainder of active urls may fall below a threshold of being able to be downloaded and indexed by the user. If there are X URLS, and Y users, and a random distribution of active lists, then when Y=X, the number of URLS per person equals one. Thus if every user downloaded one site each, then collectively, they have downloaded all X sites. If X=the number of URLS currently registered (25 Million), and Y equals the number of Internet users (300 million), then one sees how each URL could be indexed or downloaded twelve times. In reality, the distribution is anything from random, and certain areas are more popular than others.

The present invention provides for the application to upload the active list to a central server. The user's active list if compared to the list of all the other users connected to the server (online or offline), and a list of all the urls that are not overlapped is created and called the unique active list. Over time this list will be a null set. The server then picks a url from the active unique list that an algorithm determines is the most likely to be selected based on geographic and keyword factors, and orders the urls accordingly. The user's application then downloads this list, and the application starts to download these pages starting with the first one of the list and continuing. The user can specify that this downloading takes place while they are using the computer, or in the background in the case of always on devices. The user can also specify the maximum number of urls (or pages for large urls) that they are willing to spider/download. If the number is zero, then the user is considered a non-contributing user, otherwise they are a contributing user. If the number of unique active urls is less than the number of sites willing to be spidered, then the application connects back to the server to be assigned additional urls. The server assigns a new URL based on a number of factors. The server determines the community size (the number of users sharing that geographic region or parts thereof), and the average number of urls willing to be downloaded and actually downloaded to create a daily throughput (20,000 web pages per day). By dividing this number into the total number of urls in the community, the spider can determine how often each url should be spidered within a given range. The results are skewered so that popular sites are spidered more often than less popular sites. A minimum and maximum must be in place. For example, a given community has 2,000 urls and 5,000 users, who spider 2 urls a day or 10,000 urls a day in total, or an average of five times per day per url. One url may be a local theater or department store or fast food restaurant that is in 4,000 users community list, while the url for a local tattoo parlor is only in 100 user's lists. The range is set at minimum 10 minutes, and maximum one day. The average time between spidering for a url is four hours and 48 minutes (24 hours divided by five times per day). The theater would be spidered every 10 minutes, while the tattoo parlor would be spidered daily. The theater would require 144 users to spider that site, so for every popular site spidered this often, you would sacrifice 36 sites to being spidered once a day. In order to avoid situations where someone may be offline for several days, each url would be given out at least three times and must be spidered at least once in order for other sites to be spidered more frequently. No user would spider sites that were not in their active or community list unless they requested this. Another influencing factor would be the active nature of the site being spidered. If a site changes daily, then it should be spidered more often than a site than changes monthly. The risk here is however, that the sites that change infrequently may contain very topical information such as a small local arts group that puts on a show once a year. If they post an event coming up this weekend, the information is far more time sensitive than a chat room that archives its daily chats. For this reason, the minimum and maximum ranges must be respected, although they could be 1 hour to one week, or one minute to one hour. It depends on the number of users. The reason a minimum is needed is that if you have 200,000 users and 1,000 sites, then you may not need to spider a site every 30 seconds. A certain minimum staleness is acceptable. This must be determined by the community itself based on the level of information. For non financial, or time sensitive data etc, hourly is likely more than adequate.

At any given point the server will contain large volumes of indexes from all the urls that have been spidered. The term spidered/downloaded/indexed refers to the act of a local machine reading the data from a page, storing it locally, and running an indexing routine provided by the application and uploading the index to the server. The url may contain many pages underneath it, and may contain database served data. It is intended that the subpages are also indexed by the local machine, and the database data may or may not be indexed depending on the value of this data, and scope of the data.

The user has several options for viewing the data on the server. They can view the url's on a map as described above. They can view the data in the form of a directory, where the url's can be organized by category such as SIC code, or alphabetically, or by size, or product, or classification or a variety of these options (alphabetically by category, sorted by classification). This is likely the most common form for viewing large number of urls in a community and emulates the concept of the yellow pages except that it provides urls in 100% of the cases, provides for unlimited variety of sorting and categorization with the ability to sort using data or attributes from the page referenced by the URL, and also includes non business listings, such as government, and educational sites. Personal sites could be included as well, although privacy concerns would make this less likely. It is critical to understand that yellow pages, offline or online, or city pages have no way to access the data underlying their listings, so it is impossible to sort a list of businesses based on the best return policies, or hours of operation, or number of web pages, or most recent web site updated. These are all methods that a consumer may want to use to view a large number of web sites, and sort through businesses. Having a list of stores that sell Nike shoes, ordered by price (using a shopbot), or by return policy would be of extreme value. Current shopping bots do not restrict by geography, so a user finds a really cheap pair of Nike shoes, only to find out they are coming from Malaysia.

The other method of accessing the data is a search engine interface like Google or Altavista, where you can simply type in a search criteria and it searches the local active url indexes from the server, and returns the matches, and then the user can connect to the web site directly to view the match. Since the indexed data is likely to be very current (and the interface would always display the last time accessed), the user could be assured of the accuracy of not missing something.

One preferred embodiment of the PI is to have the entire bounded region (content and index) downloaded to a local device, such as a hard drive, DVD, CD, tape ram etc. and this device could be wireline, or wireless. The device would likely have a gps and a internet connection but these are not required. If the bounded region was larger and contained a lot of urls such that the entire region was too large to be downloaded for storage or bandwidth reasons, the user could restrict the results to only hotels or restaurants or casinos, or businesses. Pre-set templates would be designed for use. Thus a user could select several preset downloaded sets of bounded URL's such as Las Vegas Casinos on 1 DVD, and Las Vegas—Restaurants and Hotels on another DVD. If the user did not have a device, a device would be provided to allow the data to be viewed. The user could then view the data offline with richness of bandwidth, and full 24×7 immediate access. If the device had internet access, it could check to see if the data had changed, and also be used to book online reservations etc. where a real-time connection was needed. The data downloaded would be compressed and indexed to maximize storage capacity.

One embodiment of this would be a touch screen device which was primarily just a screen (like an etch-a-sketch but slightly smaller and no knobs), which contained a map of a city, and a legend on the top or side. The user could speak into the device, or touch a category, and the various urls would show up on the map, and the user could touch the url, and immediately connect to that site. The GPS device would always sink the map, and the user could zoom in and out. Because the map is stored on the storage device, and not downloaded, except to get changes, the detail can be rich, as well as the graphics. The device would carry display list power, and could have coupons delivered to it when it is near a vendor, that are not possible in wireless devices with limited bandwidth. As well, a little bluetooth or similar style beeper, would reside in your pocket, so if you ever left the device on the table, or it was stolen, you would hear a beep from the smaller beeper. This would be a great add on for a Palm.

Locating anything on the Internet is challenging due to the massive number of results from traditional search engines. Simple searches can return hundreds if not thousands of results and the correct match may be located several hundred matches deep and as such may never been seen by the user, as users often do not examine all the matches, out of frustration, lack of time, or else getting side tracked with another one of the links followed. One method to restrict searches is language. A person speaking English can easily determine that they do not want any matches returned that are not also in English, and many search engines are able to provide this service. This however does not help much as the English language is too broad a category to filter out the majority of matches. An excellent method of restricting data is geography, especially when someone is looking for a physical location or information about a physical location. Many people use the Internet to research products before they buy them, with the intent of buying them locally. Once they determine what product they want to buy, they often want to know where they can get it offline. Usually they are looking for the closest location or certainly a location within a reasonable distance of them. Logically, when one wants to do a search on a geographic region they type the region as a keyword such as "running shoes Chicago" instead of "running shoes". There are several problems that exist when searching for data. Some are a problem with all searches geographic or non-geographic, while others are a problem only relating to geographic searches. For all types of searches, there are two types of incorrect results. There are incorrect results that are unintentional and due to the design of the system, and those that are intentional and based on a person using the design in order to provide incorrect results.

An example of the intentional actions to return inaccurate results involves a user inserting text or meta-tags into their web page that have no relationship to the actual content of the page. This can be done in meta-tags or in very tiny print, so the user does not see this text. For example, an adult entertainment site may use words such as "shoes, food, beer, clothing, running, fun, Madonna, Nike" to attract viewers to a site that features pornographic material. Except where trademarks such as Nike or Madonna are used, this is not illegal (but unethical), but leads to a lot of matches that are irrelevant.

Unintentional inaccurate results occur due to two reasons. One is the double meaning of words, and one is the independent use of the keywords in no relation to each other. Both examples also have direct examples in the geographic searches as well. For example, when someone searches for "Bermuda Shorts", they see results for beaches in Bermuda as well. Another example would be someone looking for "Bananas" would see matches for the fruit bananas, the movie Bananas, and any web site using the word bananas often used colloquially as "I'm going bananas" to mean going crazy. An example of unintentional results from independent use of words could be someone who is searching for "Nike running shoe stores in Boston", which is very specific. However, a news article talking about "John Doe finished first in the Boston Marathon last year and attributed his success to his Nike running shoes. I wonder what he has in store for us next year!" would show up as a match, as would a narrative on somebody's home page such as "Last Summer I was working at my dad's beer store, drinking beer and eating Boston cream pies and got so drunk that my dad chased me. I threw up all over my Nike shoes from the running."

Another problem that occurs in geographic searches is that the results are accurate but not in the correct geographic region. For example, someone searching for "Book stores in Chicago" would be shown bookstores selling books on Chicago, or books on the Chicago bears, or reviews of books written by someone living in Chicago. Unintentional matches occur because of city words being used in web pages when the store is not located in that city such as " . . . only 3 hours west of Toronto, 30 minutes from New York". Also there are common names such as Springfield that exists in fifteen different states. Therefore, the user is presented with multiple matches that are not practical geographically.

Another problem is that search engines often include all the matches for a site and not just the main page, so one site could have three hundred matches which clutters up the ability to find other matches from other sites. Some search engines have addressed this issue, but not all of them. Ideally the main page is the best place to navigate a web site, so being linked deep down in a site is often counterproductive to the user if the site has no clear way to navigate from there.

In order to address some of these problems they have been two approaches. One approach is to create city pages or web sites with particular focus on certain geographic regions such as Bostonpages.com or Toronto.com which focus on the Boston and Toronto regions respectively. City pages do a very good job of focusing the search for information to a geographic region. However, where city pages fall down is that they are not search engines, and because they do not actively spider the web in any way, you can only search for businesses that have listings on the site. In order to find a business, you often have to know what you are looking for in advance, as the city page interfaces vary are often not intuitive and only have basic information such as name, address, phone number, and sometimes a map and directions. If the user wants more information as would be obtained from reading a web site on that business as provided by an electronic address (url) linking the that business's web site, they are stick as the URL is often not provided, or is provided but does not link to the website of the business, but a self generated web page hosted on that site, which in itself is not bad, but the data is often stale. The user has no way of knowing if the business has a website, or if the web page that has been self generated is all the information available. Some city pages may have web links, but in some cases these links are dead links and no longer work. City pages do not provide a method where a user can be guaranteed of being returned an electronic address to a search, nor do they provide the ability to search the electronic addresses of businesses in a geographic region for keywords. City pages and city portals are basically glorified Yellow pages and suffer many of the same problems. Yellow pages are available online as basically electronic version of their print based products. The online yellow pages often includes maps and directions, but otherwise allow a user to search the yellow page databases by city and by category. Yellow pages are not indexes of web pages, but simply a list of businesses that in most cases pay to have a listing of some kind usually predicated by owning a phone in a region serviced by that yellow page provider. When a user uses the Yellow pages to search for a local business such as "running shoes stores in Boston" they avoid all irrelevant matches described above from either intentional or unintentional actions and avoid all the correct matches that are in different geographic regions, and in this way yellow pages are very good. However, they have five large weaknesses in providing a complete solution. Firstly, they rarely provide electronic addresses of the matches found, so if a user wants anything more than address, or phone number, they must pick up the phone and call the company or try and guess at the companies web address. This may involve long distance charges or may not be possible if the store is closed. While some yellow pages have urls, none provide urls in all of the cases. Secondly, the business listings exclude non-business entities such as schools or government buildings or personal web pages, so many local entities are excluded. A third problem is that virtual businesses that are not physically located in an city but may service the industry are not listed unless they pay for a listing. Since the Internet is made up of many virtual entities, of which many have restricted areas of business or zones of service, the yellow page list is fairly very exclusionary. The fourth problem relates to inaccurate results due to yellow page companies circumventing the search criteria specified by a user in order to collect money from the businesses who want to advertise in other regions. The Yellowpages.ca web site lists Runners Choice show store first when asked for stores in Guelph, while the rest of the list is Alphabetical. This is because Runners choice paid for a listing in the online directory. This is not so bad if not for the fact that Runners choice is located in Kitchener about 20 miles away. Clearly a user cannot rely on data that has been modified to return accurate results. The fifth problem that yellow pages presents is that the categories that businesses have been listed in are not always intuitive. In the above example, when one searches for "running shoes", one is first presented with the "NO MATCH FOUND". Reducing the search to shoes, one is presented with many categories to choose from, which have the word shoe in it. The two obvious choices for retail stores are "shoes—retail" and "shoes stores". These return many shoe stores, but few running shoe stores. The majority of running shoe stores are found under "sportswear—retail". This applies to many common categories such as "theatres vs cinemas", "lawyer vs attorney vs solicitor vs barrister". The user must know the alternate names or risk finding no matches when there are clearly matches.

Both city pages and Yellow pages have many problems the largest being that they are not url based, and therefore cannot guarantee an electronic address. The Present Invention is a URL only searching environment.

The other method of addressing geographic searching is a patent pending technology from Vicinity Corporation that uses technology to read content from each web page to look for addresses or data that could imply addresses such as phone numbers. It likely solves problems such as "Boston cream pies" being confused with "Boston Mass.". However, the main weaknesses of the GEOSEARCH technology is that if a business lacks any address data is does not show up in the search, and because computers are not as smart as human operators, many addresses get improperly assigned. Fro example, when searching for pizza in Guelph, a dehumidifier company showed up as the fourth listing, because the business was in Guelph, and the url was canadian-pizza.com/dehum. Because the url had the word pizza in it, it ranked very high, with the logic that the web site has something to do with pizza. However, in this case, the domain was dormant, and was being used by a portal company to attract traffic. Of the top 10 listings for pizza in Guelph, one was the local university about how to make pizza, one was a Christian book store, one was an Austin healey association, one was a plowing match link, one was a guestbook of conversations, one was a national food safety site, one was a local blues listing, one was a set of business listings for Kitchener, a nearby city, and one was a national franchise page. Not one was a pizza store, and only one was related to pizza. Similar results occur with any search terms due to the lack of computers to know when the keywords are being used in relation to each other, or when the address is relevant to the page in question. Over time, the GEOSEARCH method will improve and computers will become smarter at recognizing patterns and address data. When this occurs, the result will be a map of the content of Internet pages with the ground, which is very different from mapping the location of the owner of the url on the ground. For example, using the GEOSEARCH method, a local travel agency, which had its address on its main page, and had five sub pages promoting five popular hotels in Hawaii, Paris, Berlin Rio De Janeiro, and Las Vegas, would have six geo codes attached to it, and the travel agency would appear in searches for any of the other five cities. In a search using a method of url to ground connection, the travel agency would only show up in the home city. Note also, that if the travel agency did not have its address on the page, it would not show up at all in the GEOSEARCH program.

There are also several programs that exist that allow one to load a map of an area and display all the businesses in a particular area on the map. One product from Microsoft is called "Streets and Trips". Another product is from Rand McNally is "Trip maker deluxe". Both these products are offline products that do not connect to the internet as part of their operation. The user can specify an area on a map using a box or a window, and zoom into that area. By highlighting categories such as gas stations, hotels, atm machines, icons appear on the map. These icons differ by category by the color and design, but have no way of indicating any additional attributes about each entity other than its location on the map. When one clicks on an icon, the icon displays the address and phone number, and name of the establishment. There are no Internet links in this product connected to the icon, except in the Microsoft product, if you were connected to the Internet, the Microsoft search engine would load and perform a search on the town specified by the town of the icon in which you have selected if you picked the "connect to Internet" option. This search is very poor and certainly does not get the user any closer to being able to find the web site of the business in question for all the reasons discussed in above.

The Present Invention involves allowing the user to define a bounded geographic region. This region can be selected in a number of ways. One way includes selecting any address field such as a city, zip code, state, province country or other regional address code. Another way would be to specify an area code. Another way would be to pick a point and a radius out from that point either in straight line miles, or in driving distance. In the case of driving distance the radius would not be circular. Another selection method would be to draw a closed free form region on a map. Any combination of methods including additions or subtractions would be acceptable including having two closed regions independent of each other. An example could be Niagara Falls, Canada, and everything with a 25 mile radius excluding the US, and excluding the city of Toronto.

The user can optionally further define this bounded region by filters directed to reduce the potential matches when the bounded region is analyzed. This can be done at the bounded region selection stage or at any point of the process. Examples of filters are categories such as arts, entertainment, businesses, educational or sub categories such as restaurants, or shoe stores. Filtering by privacy policy, such that only matches that meet the E-trust standard are accepted.

At this time, the user can also indicate a keyword or phrase. This text string is used later on to query the matching database records. Once the bounded region has been defined, the requested region is translated into a set of latitude and longitude ranges or other internal proprietary format. A central database is accessed containing a list of urls and their locations to obtain a matching set of urls. In a preferred embodiment, this database is authenticated and would include both virtual and physical location associated with the region.

The matching list of urls may be downloaded to the local client or may be stored at the central server under a name associated and unique to the user. These urls may each individually have categories, sub categories or other attributes attached to them that would be applied against any filters to eliminate non matching urls from a final set of urls which become the bounded region of urls or the user's community.

At this point, if any keywords have been specified, the user's computer or the server performs a search on the community urls using the keyword by either accessing the indexed files of each url which may be stored on a central server, or having the user's computer spider each and every url in the community on to the local computers storage device or ram memory where is would either be discarded if there is not match, or saved in indexed format for later searches. In the preferred embodiment, the user would likely save results as this bounded region would be used for other searches, but there will be instances where the user prefers to do one search only. Once all the urls were searched, any matching results would be displayed. For large number of urls, where a central server had not indexed the files, and it would likely take a long time to download or spider all the urls, a search engine such as Yahoo or AltaVista would be used, and a search performed using the keyword, and the matches returned would be filtered out by the matching set of urls to provide an similar set of results, excepting that the search engine data may not be as fresh as reading it directly from a central server or spidering it directly. If read directly, the system would report the progress as it completed sites, and the option could be set to only read the main url page, or a fixed level deep in the web site, and graphics and other formats not textual would be ignored. Non textual searches could be performed using this method as well, as is the case when images are examined for human flesh tones to identify pornographic images.

If there is no keyword specified at the time of region selection, the user has three choices on how to view the data. They can view the data using a very simple search box as in exhibit A (see google's interface). When the user performs a search using this search box, the url's are searched in the same way as if a keyword was selected in the above example, expect the program would first check the local storage device for content after checking the central server, but before spidering the pages. This way if any pages had already been read, and were significantly fresh as determined by the user, the local data would be used. As a user may pause the search once a match is found, there is no guarantee that all the community url are read each time, but over time, the local data will become a larger subset of the total data until at some point it may equal the total data. In a preferred embodiment, the indexes for the community urls are stored on a central server and collected by users accessing this central server using a P2P model described in a related patent application.

The second choice is to display the data in text form where each url would be displayed in some order that could be organized by category, sub category, alphabetically, in order of size, or freshness, or in order of degree of privacy policy or any combination thereof. Headings could be provided from a standard template stored on a central server or created by the user. Beside each listing symbols, text, or numbers could be used to indicate if a change had occurred since last being viewed and to show all the attributes of the site. A key could represent a site that had online commerce, with a V underneath the key to indicate Verisign e-commerce seal etc. A (13) could be used to represent the number of pages on the web site, and a flashing number could indicate new content. A person of genreral skill and knowledge in this art could develop other display methods or combinations.

The third way of displaying the community urls is on a map. In the preferred embodiment, the map would be a 2½ D map (see appendix B). Each url would be represented by a graphic symbol on the map based on its physical location or its virtual association. In the preferred embodiment a parcel of land would be placed along the side of one of the axis and would represent a virtual map, and urls of businesses that have zones of service relating to the map would be placed in the virtual land based on virtual plots so that book stores could be stored in a virtual book store plot, and adult sites would be in a virtual adult section or they could be stored free form. Virtual sites could also be stored in clouds that float above the map in categories. Virtual sites could be toggled off and on at the user's choice, in a similar way as categories or other headings can be controlled.

In the Preferred embodiment, the graphical symbol would be a flag, and would be scalable and able to represent several different attributes of a website, whether Boolean (new content or not), variable (popularity or size), or fixed step (categories). In the flag model, the flag pole height represents the popularity of the site, the color of the flag represents the category, the masthead flashes if new content is available on that site, the size of the flag represents the number of page of the website, the shape of the flag can represent other attributes such as membership required, or deep data, and striping on the flag pole could represent that other people are currently chatting at that site's virtual location.

In the map view as in the directory view, whenever a user connects to the map by loading the application or refreshing it, it checks with a central server and updates the urls to see if any of the urls have changed. If no central server is available, then the user's machine may spider the sites on a continuous basis in the background or foreground on a set pattern or time period as determined by the user.

When the user first defines their virtual portal, they may choose a standard template rather than define their own portal, or choose a template of another user who has similar interests. An example would be a template of restaurants and bars and pubs. An example of a user's template might be a list of what they consider to be popular eating places, popular night clubs, best stores for books, clothes etc. If this person is trusted, or appears to have similar interests then a new user may choose to borrow the users community definition, and use it exactly as it is, or refine it.

A user can turn off categories globally, or only in certain regions on the map. They can turn off or turn on specific web sites, and they can add urls to their community definition that are outside the community definition and stick them on their map wherever they like. A user may have a favorite online book store that they choose to stick on the map on top of a physical bookstore to remind them of its existence as opposed to having it appear on the virtual land/cloud.

One embodiment involves virtual urls not showing up until one is pointing at a physical building with some connection to the category that the virtual site may exist in. An example would be when a user is pointing at a bank, the virtual land would show online banks and financial institutions. When a user points at a restaurant, the virtual land shows restaurant review sites, or delivery services. This makes it easier to find virtual sites that could otherwise be extremely dense in any given community. Filtering of websites can also be done by freshness, size, ratings by other users etc.

An embodiment of the present invention comprises a method of using geographic data and other business attributes to isolate a select number of domains which are then spidered in a variety of options user a plurality of users and within certain parameters to create an indexed subset of data from the Internet providing significant concurrency of data and which can then be accessed via a graphical or non graphical interface or stored offline to be accessed later in a tablet or other wireless device without the requirement of access to the Internet.

An embodiment of the present invention comprises a method of using distributed computer resources to index a plurality of electronic addresses in parallel within a bounded region to generate a concurrent set of indexed data for a bounded region accessible by a network of users.

The present invention provides a method to restrict a users access to the Internet to a smaller subset of the Internet by eliminating portions of the Internet outside a geographic boundary. The Internet has a large amount of data which can accessed using various methods including using a search engine, a directory, a link page, or other methods. Search engines are the most popular method of finding information because they contain the largest amount of indexed data to access. Google advertises over one billion pages accessed. The problem is that when one wants to find information which is geographically sensitive, such as the nearest store that sells Nike shoes, or an Italian restaurant within an one hour drive, or a list of all the hotels in Hamilton, it becomes extremely difficult as the search engine has no way of determining where the web sites in its index are located. The search engines use various different techniques to affect the order of pages displayed including page ranking, and keyword preferences to rank pages higher than others, but in the end, they basically match the keywords in the search to their index, and return the results in some order, which varies from search engine to search engine. A search on Nike running shoes in Hamilton using Google, the most widely accessed search engine, returned 623 results, of which none of the first three screens (30 matches) were shoe stores in Hamilton. Most users get frustrated after reading thirty matches and finding nothing of relevance. Many do not go past the first screen. The problem is that the search engines have no way of connecting a URL with a geographic location. They can restrict results by country using the website extension (www.websitename.ca or www.websitename.us) or by language, but this is not very limiting. The present invention relies on a database being available that links the URLS with a physical location of the website's business not the location of the server hosting the website. This database is discussed in a patent filed by GEO-SIGN Corporation.

Another problem that search engines have aside from the geographical relevance is that many words have dual meanings or dual locations, and this can cause many false positives. For example, the word Hamilton can mean Hamilton, Ontario, Canada or Hamilton Bermuda, or George Hamilton or Admiral Hamilton. A search engine does not recognize the difference. The present invention recognizes this fact and using intelligent parsing technology to strip out false matches, and otherwise prompts the user for clarity. The database of URLS contain the latitude an longitude so once the intended search is known, the results fed back are very accurate geographically speaking.

Search engines are an ineffective way to find geographically sensitive information. As a result of he frustration of using search engines, many users turn to city portals such as www.bostonpages.com or www.toronto.com. These city portals vary in quality, but are generally not available for smaller cities, and therefore only applicable for large metropolitan areas. There are several problems in general relating to city portals. First off, none of them contain URL links for all their matches, so when you find a shoe store, restaurant, hotel, you have no idea if the information is current, and the only way to find out for sure s to call the place of business. If a URL link is provided you can of course immediately verify the accuracy of the data by jumping to the entities web page. If the URL is not there, you have no idea what the URL is, so you cannot verify the data. Also since no city portals verify the URLS on a constant basis, if the link goes dead, the city portal does not update it unless notified, so the user ends up with an error message when clicking on a link. Another problem with city portal pages is that they generally provide fixed format options of data, so the user who is searching must work within the confines of the city portals system. If someone lives in one town but in an area where they may be closer to another town or towns, they may be forced to look at two or three different lists of search results to see all the relevant choices. There is no ability to limit a search to a set bounded region that is not hard coded by the city portal. Once you find a site, you can ask for a map of all the places of interest near to it with some search engines, and this can be tricked to provide similar results. This requires a user to pick a known place near where they want to look, and then ask for all the places of interest near to this known place. Many users, especially tourists, do not know a place to start with. Secondly, this type of geographic mapping is again hard coded into categories, so you cannot perform a keyword search. City portals provide a far better geographic restrictive tool than search engines, but lack URL links in most cases creating data integrity concerns, and do not provide much functionality even for advanced skilled users to perform a search on a geographic region using keywords. The present invention provides URL links for all its entities, and verifies the links are accurate.

Yellow page or other Internet directories are another way to find geographic results, but also suffer from similar problems to the city portals. Information is hard coded into categories (SIC codes or headings), so that stores of certain types cannot easily be found using the present embodiment of these directories. For example, running shoe stores are listed under Sportswear, and not retail shoe stores. Casinos are listed under gambling establishments, movie theaters are listed under cinemas, attorneys are lawyers etc. Many of these directories have few tools to help the user navigate these hard coded issues, and involve many mouse clicks to try to find the interest data. Again as in city portals, most results lack URL's making the information useless for someone who wants to immediately connect to the website. If the phone number is provided, the user must rely on the store being open, the phone line being available, and an operator being able to answer the question. The call may also be long distance to the user involving a cost. The present invention involves all businesses having URL'S, and if a business does not have a URL one can be created for them. Also, when the URLS are provided they are not verified, so often the link is dead (connection error) or even connects to the wrong website. Directory listings also generally follow the lead of Yellow pages and exclude non-business entities such as schools, or government buildings. Yellow pages and directory listings are also hard coded by region so someone wanting to see results from multiple regions may have to view additional lists. Some directory listings are advertising supported and skewer their results based on who paid them. For example, in www.Yellowpages.ca a search on shoe stores in Guelph returns as its first match, a running shoe company in Kitchener, over 25 km away, because they paid for that service. This type of deception leads to a mistrust of data.

The present invention provides a way for a user to search for results using keywords based on a bounded region and to return results that all contain URLS. The bounded region can be specified by an address match (city, street, postal code), phone area code, state, driving distance from a central point, a bounded region drawn on a map, a radius from a central point, or a Boolean add/subtract/or the above (region equals state of California excluding Los Angeles and San Diego, or within 10 miles of my address).

Another problem is that the information provided by search engines is not spidered on a daily basis, so often when you look for results on events, you only find events that have already occurred. If someone puts up a website on Tuesday for an event that weekend, it is virtually guaranteed that the popular search engines will not have added it to their index until after the event is over. This leads to a huge problem is the usefulness of the web in promoting community events, especially on short order. There are sites that maintain lists of events going on around the world, and are organized by region, but the central site has many disadvantages. It relies on the person knowing that the site exists in order to submit its information. No one site can contain all the events of one community since not all members of a community will submit to the site. The concept of the Internet is a distributed one. It was not designed fro everyone to send all their pages to a central server, as this is impractical. The Internet is huge and new web pages are being added to the Internet at an alarming rate. Just as no search engine can read all these web pages everyday, no one portal site can collect all the activities. It is very likely that there are web pages with events on them that are not on a central server. The second problem with events pages is that they are event pages, and do not allow for search functionalities. A user cannot ask for all rock concerts in Guelph that feature Bobby Smith, since the events pages do not spider the pages that contained the original data, but simply provide a listing base don user input. They may contain a URL to link to for more information, but this is not spidered, so the user must first find rock concerts in Guelph, and then go to each one to see if Bobby Smith is playing there. This above problem of events applies to anything where data may change which is virtually anything. Any website accessed by a user has a degree of staleness which may or may not be affect the accuracy of the results. For example, a list of weekly lotteries numbers posted on a website has a staleness of 7 days, since every seven days the numbers are no longer current. A grocery store listing specials is only accurate while the specials are still running. If the special is stopped, the web site immediately becomes stale. This is a reality of any web page or any published piece of data. However, since web pages are spidered on an infrequent basis, the user does not know if the search being performed is accessing pages which are stale or all the current pages. For example, Google may have indexed a page for a local grocery store for the week of January 10th, where peaches were on special. If in February, I ask Google for all the stores in Guelph with peaches on special, I find the local grocery store from January 10th with a match. When I go there I find out that the page does not mention peaches, but rather now features a different product. Since the results are weekly, I cannot trust the search engine to find the results, and I cannot trust the results it does find.

The user can add specific URL's not located in the region to the database. Error messages can be replaced or controlled. Bookmarks from different Internet spaces can be shared or transferred. Storage of datasets offline with online links. Reformatting pages for compression. Lots more with further research.

A method for providing a virtual portal with immediate freshness (recursive):
1. Send bounded region to geographically verified URL server
2. Server returns Set(URLs)
3. If no query, spider Set(URLs)
4. If query, send query to search engine(s) or central server
5. Combine results of Step 4 with Set(URLs) to create matches Set3(URLs). These are likely sites to spider first.
6. Spider Set3(URLs).
7. Compare query to Database X to generate List2 where List2 is synonmys, homonyms and brands associated with the query and related together in Database X.
8. Send List2 to search engine(s) or central server
9. Compare URL result to Set(URLs), subtract Set3 (URLs) to create new Set4(URLs)
10. Spider Set4(URLs)
11. If user chooses, spider remaining URLs=Set(URLs)–(Set3(URLs) U Set4(URLs))

A method for providing a virtual portal with improved freshness:
1. Send bounded region to geographically verified URL server
2. Server returns Set(URLs)
3. Regardless of query, client sends Set(URLs) to central server
4. Central server returns list of URLs that are on its set of indexed files among with date that each URL was indexed
5. Client matches index date with freshness factor to create list of acceptable URLs.
6. Client creates Set2(URLs) which are list of all URLs not on central server -or- are on central and stale
7. If query, send query ti central server 8. Display central server results on CUI
9. Client spiders Set2(URLs) by either going to the site or downloading the index from another source (e.g., Google cached pages)
10. Client indexes pages as spidered and stores index locally and uploads index to server
11. Perform query on spidered URLs as indexed
12. Display results of query on CUI
13. If no query, display URLs on CUI A method for providing a virtual portal using a search engine (no freshness):
1. Collect bounded region and user choice of UI
2. Send bounded region to server, get Set(URLs)\
3. If query, send query to search engine or central server
4. URL matches to query are returned
5. Compare to Set(URLs)
6. Discard or identify non-matching URLs
7. Display results on user choice of UI (map, directory, query)
8. If no query, display Set(URLs) on chosen UI (CUI) geographically verified URL server While this invention has been particularly shown and described with references to preferred embodiments thereof, it will be understood by those skilled in the art that various changes in form and details may be made therein without departing from the scope of the invention encompassed by the appended claims.

Particularly, a person of ordinary skill in the art will recognize that referring to an electronic document, electronic document address and a URL can sometimes be done synonymously. The use of these terms is in no way intended to limit the invention to a particular implementation and one of ordinary skill in the art will be able to distinguish among them based upon context.

What is claimed is:

1. A method for creating a geographically bounded network of computers that use distributed processing to implement a geographically bounded searchable index of webpages comprising the computer implemented steps of:
  creating a geographically bounded network of computers that use distributed processing to implement a geographically bounded searchable index of webpages by:
    creating and maintaining a list of attribute bounded electronic addresses representing a plurality of indexable electronic documents, on a computer network, that are associated with a geographically bounded region, where the computer network is the Internet and the electronic documents are webpages on the Internet;
    identifying a plurality of peer computers associated with the geographically bounded region, the peer computers to perform distributed processing tasks to enable creation of a geographically bounded searchable index of webpages, where the geographically bounded searchable index of webpages is created by the peer computers spidering the geographically bounded webpages; and
    in response to receiving a geographically bounded request from one of the peer computers, assigning one or more geographically bounded electronic addresses from the geographically bounded list, where the requesting peer computer processes the assigned geographically bounded electronic address to index one or more geographically bounded webpages that are obtained through the assigned geographically bounded electronic address;
  storing the geographically bounded searchable index of webpages locally on a local hard drive of a tablet device, where the geographically bounded searchable index of webpages is accessible offline from the local hard drive of the tablet device without accessing the Internet; and
  enabling, from the tablet device, access to one or more of the geographically bounded webpages without connecting to the Internet.

2. A method as in claim 1 further comprising receiving the processed result from the requesting peer computer.

3. A method as in claim 1 wherein the geographically bounded region is automatically generated based upon a physical address selected from at least one of a group consisting of: a city, a zip code, a longitude, a latitude, an altitude, a telephone area code, an informal designation and an area relative to a location.

4. A method as in claim 1 wherein the geographically bounded region is based upon a physical location of one or more of the peer computers.

5. A method as in claim 1 wherein the geographically bounded region is a topical boundary.

6. A method as in claim 1 wherein the electronic addresses are represented as Uniform Resource Locators.

7. A method as in claim 1 wherein the step of assigning further includes overlapping the assignment of geographically bounded electronic addresses to multiple peer computers.

8. A method as in claim 1 wherein assigning one or more geographically bounded electronic addresses from the geographically bounded list further includes:
  determining whether at least one of the electronic addresses in the geographically bounded list matches at least one attribute from the geographically bounded request; and
  in response to determining that no electronic addresses in the geographically bounded list matches any attribute from the geographically bounded request, assigning an electronic address from the geographically bounded list that does not match the geographically bounded request from the requesting peer computer.

9. A method as in claim 1 wherein processing step further comprises spidering, by the requesting peer computer, the assigned geographically bounded electronic address.

10. A method as in claim 1 wherein the plurality of peer computers uses peer-to-peer technology to form a virtual community associated with the geographically bounded region.

11. A method as in claim 1 wherein the geographically bounded searchable index of webpages creates a virtual subset of the Internet that is stored offline, to be accessed from the tablet device without accessing the Internet.

12. A computer implemented method for creating a geographically bounded network of computers that use distributed processing to implement a geographically bounded searchable index of webpages, the method comprising:
  creating a geographically bounded network of computers that use distributed processing to implement a geographically bounded searchable index of webpages by:
    identifying a plurality of peer computers associated with a geographically bounded attribute to create the geographically bounded network of computers, the computers to perform distributed processing tasks to enable the creation of a geographically bounded searchable index of electronic documents;
    maintaining a list of geographically bounded electronic addresses representing a plurality of indexable electronic documents that are associated with the geographically bounded attribute, the indexable electronic documents being webpages on the Internet, where the geographically bounded searchable index is created by the peer computers spidering the webpages;

in response to a request, assigning one or more electronic addresses from the geographically bounded list to one or more of the peer computers in the geographically bounded network of computers; and in response to receiving the assigned electronic addresses from the geographically bounded list, indexing by one or more of the peer computers in the geographically bounded network of computers, one or more webpages having geographically bounded electronic addresses;

storing the geographically bounded searchable index of webpages on a tablet device, where the geographically bounded searchable index of webpages is accessible offline without accessing the Internet; and enabling, from the tablet device, access to one or more of the geographically bounded webpages without accessing the Internet.

13. A computer implemented method as in claim 12 further comprising receiving the processed result from the requesting peer computer.

14. A computer implemented method as in claim 12 wherein the geographically bounded region is automatically generated based upon a physical address selected from at least one of a group consisting of: a city, a zip code, a longitude, a latitude, an altitude, a telephone area code, an informal designation and an area relative to a location.

15. A computer implemented method as in claim 12 wherein the geographically bounded region is based upon a physical location of one or more of the peer computers.

16. A computer implemented method as in claim 12 wherein the geographically bounded region is a topical boundary.

17. A computer implemented method as in claim 12 wherein the electronic addresses are represented as Uniform Resource Locators.

18. A computer implemented method as in claim 12 wherein the step of assigning further includes overlapping the assignment of geographically bounded electronic addresses to multiple peer computers.

19. A computer implemented method as in claim 12 wherein assigning one or more geographically bounded electronic addresses from the geographically bounded list further includes:

determining whether at least one of the electronic addresses in the geographically bounded list matches at least one attribute from the geographically bounded request; and in response to determining that no electronic addresses in the geographically bounded list matches any attribute from the geographically bounded request, assigning an electronic address from the geographically bounded list that does not match the geographically bounded request from the requesting peer computer.

20. A computer implemented method as in claim 12 wherein processing step further comprises spidering, by the requesting peer computer, the assigned geographically bounded electronic address.

21. A computer implemented method as in claim 12 wherein the plurality of computers uses peer-to-peer technology to form a virtual community associated with the geographically bounded region.

22. A computer implemented method as in claim 12 wherein the geographically bounded searchable index of webpages creates a virtual subset of the Internet that is stored offline, to be accessed from the tablet device without accessing the Internet.

23. A computer system for creating a geographically bounded network of computers that use distributed processing to implement a geographically bounded searchable index of webpages comprising:

one or more computer processors creating a geographically bounded network of computers that use distributed processing to implement a geographically bounded searchable index of webpages by:

identifying a plurality of peer computers associated with a geographically bounded attribute to create a geographically bounded network of computers, the computers to perform distributed processing tasks to enable the creation of a geographically bounded searchable index of electronic documents;

maintaining a list of geographically bounded electronic addresses representing a plurality of indexable electronic documents that are associated with the geographically bounded attribute, the indexable electronic documents being webpages on the Internet, where the geographically bounded searchable index is created by the peer computers spidering the webpages;

in response to a request, assigning one or more electronic addresses from the geographically bounded list to one or more of the peer computers in the geographically bounded network of computers; and in response to receiving the assigned electronic addresses from the geographically bounded list, indexing by one or more of the peer computers in the geographically bounded network of computers, one or more webpages having geographically bounded electronic addresses;

a tablet device storing the geographically bounded searchable index of webpages, where the geographically bounded searchable index of webpages is accessible offline without accessing the Internet; and the tablet device enabling access to one or more of the geographically bounded webpages without accessing the Internet.

* * * * *